United States Patent
Hosoda et al.

(10) Patent No.: US 7,466,871 B2
(45) Date of Patent: Dec. 16, 2008

(54) EDGE GENERATION METHOD, EDGE GENERATION DEVICE, MEDIUM RECORDING EDGE GENERATION PROGRAM, AND IMAGE PROCESSING METHOD

(75) Inventors: Tatsuya Hosoda, Nagano-ken (JP); Naoki Kuwata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 705 days.

(21) Appl. No.: 11/014,450

(22) Filed: Dec. 15, 2004

(65) Prior Publication Data
US 2005/0157940 A1 Jul. 21, 2005

(30) Foreign Application Priority Data
Dec. 16, 2003 (JP) ............................. 2003-418554

(51) Int. Cl.
G06K 9/40 (2006.01)
G06K 9/32 (2006.01)

(52) U.S. Cl. ........................................ 382/266; 382/298

(58) Field of Classification Search ................ 382/199, 382/266–269, 274–275, 298–300; 358/3.24, 358/1.2, 463, 521, 525
See application file for complete search history.

(56) References Cited
U.S. PATENT DOCUMENTS
5,257,116 A * 10/1993 Suzuki ....................... 358/465

| | | | |
|---|---|---|---|
| 6,631,207 B2 * | 10/2003 | Hirota et al. ................ 382/167 |
| 6,978,045 B1 * | 12/2005 | Hashimoto et al. .......... 382/199 |
| 7,054,507 B1 * | 5/2006 | Bradley et al. .............. 382/300 |
| 2004/0081355 A1 * | 4/2004 | Takahashi .................... 382/165 |

FOREIGN PATENT DOCUMENTS
JP 3045134 3/2000

OTHER PUBLICATIONS
Abstract of Japanese Patent Publication 11-298721, Pub. Date: Oct. 29, 1999, Patent Abstracts of Japan.

* cited by examiner

Primary Examiner—Kanji Patel
(74) Attorney, Agent, or Firm—Martine Penilla & Gencarella LLP

(57) ABSTRACT

A direction of an intended edge is determined, and a position of the intended edge is corrected to a position that brings a direction that connects a position of the intended edge and a position of an adjacent edge closer to the determined direction of the intended edge, and edge information representative of an area of the edge of an enlarged image is generated by using the corrected position of the edge. Gradation data before and after filtering are synthesized at a rate corresponding to a feature quantity representative of the amount of pixels within a predetermined color area. The gradation data of the plural pixels within a predetermined region including the position of the intended edge to be sharpened among the interpolated gradation data of the respective pixels on the interpolated image is sharpened at a degree corresponding to the number of pixels of the uninterpolated image.

7 Claims, 31 Drawing Sheets

FIG. 5

OPERATION SETTING DATA 14a

| THE NUMBER OF PIXELS Nxy | | 100,000 PIXELS | 100,000 - 300,000 PIXELS | 300,000 - 1,000,000 PIXELS | 1,000,000 PIXELS - |
|---|---|---|---|---|---|
| FEATURE-BY-FEATURE FILTERING | EXECUTION p1 | NO | YES | YES | YES |
| EDGE SHARPENING | INCLINATION VALUE a1 | 0.75 | 0.65 | 0.5 | 0.5 |
| | INCLINATION VALUE a2 | 1.1 | 1.25 | 1.25 | 1.5 |
| SHARPENED IMAGE SYSTHESIS | SYNTHESIS RATIO A3 (%) | 50 | 60 | 70 | 80 |

FIG. 8

FEATURE-BY-FEATURE FILTER DATA 14b

| COLOR AREA | FILTER |
|---|---|
| FRESH COLOR AREA | $F1 = \begin{pmatrix} 1 & 2 & 1 \\ 2 & 8 & 2 \\ 1 & 2 & 1 \end{pmatrix}$ |
| GREEN AREA | F2 |
| ⋮ | ⋮ |

FILTER SYNTHESIS SETTING DATA 14c

| COLOR AREA | FILTER RATIO B1 (%) |
|---|---|
| FRESH COLOR AREA | B1 rising linearly from 0 to 70 as FEATURE QUANTITY goes from 0 to 9 |
| GREEN AREA | B1 flat at 0 over FEATURE QUANTITY 0 to 9 |
| ⋮ | ⋮ |

$$|sl3-sl0| < |sl1-sl0|$$

OR $$|sl3-sl0| < |sl2-sl0|$$

MOVE INTENDED EDGE ONTO LINE 3

FIG. 11

- FOR 90 DEGREES

90-1
| -1 | 1 | 0 |
|----|---|---|
| -1 | 1 | 0 |
| -1 | 1 | 0 |

90-2
| 0 | 1 | -1 |
|---|---|----|
| 0 | 1 | -1 |
| 0 | 1 | -1 |

90-3
| 1 | -1 | 0 |
|---|----|---|
| 1 | -1 | 0 |
| 1 | -1 | 0 |

90-4
| 0 | -1 | 1 |
|---|----|---|
| 0 | -1 | 1 |
| 0 | -1 | 1 |

90-5
| -1 | -1 | 1 |
|----|----|---|
| -1 | -1 | 1 |
| 1  | 1  | 1 |

90-6
| 1 | -1 | -1 |
|---|----|----|
| 1 | -1 | -1 |
| 1 | 1  | 1  |

90-7
| 1  | 1  | 1 |
|----|----|---|
| -1 | -1 | 1 |
| -1 | -1 | 1 |

90-8
| 1 | 1  | 1  |
|---|----|----|
| 1 | -1 | -1 |
| 1 | -1 | -1 |

90-9
| 1  | 1  | -1 |
|----|----|----|
| 1  | 1  | -1 |
| -1 | -1 | -1 |

90-10
| -1 | 1  | 1  |
|----|----|----|
| -1 | 1  | 1  |
| -1 | -1 | -1 |

90-11
| -1 | -1 | -1 |
|----|----|----|
| 1  | 1  | -1 |
| 1  | 1  | -1 |

90-12
| -1 | -1 | -1 |
|----|----|----|
| -1 | 1  | 1  |
| -1 | 1  | 1  |

- FOR 30 DEGREES

30-1
| 0  | -1 | -1 |
|----|----|----|
| -1 | 1  | 1  |
| 1  | 0  | 0  |

30-2
| 0  | 0  | 1 |
|----|----|---|
| 1  | 1  | -1 |
| -1 | -1 | 0 |

30-3
| 1  | 0  | 0  |
|----|----|----|
| -1 | 1  | 1  |
| 0  | -1 | -1 |

30-4
| -1 | -1 | 0 |
|----|----|---|
| 1  | 1  | -1 |
| 0  | 0  | 1 |

30-5
| 0  | 1  | 1  |
|----|----|----|
| 1  | -1 | -1 |
| -1 | 0  | 0  |

30-6
| 0  | 0  | -1 |
|----|----|----|
| -1 | -1 | 1  |
| 1  | 1  | 0  |

30-7
| -1 | 0  | 0  |
|----|----|----|
| 1  | -1 | -1 |
| 0  | 1  | 1  |

30-8
| 1  | 1  | 0  |
|----|----|----|
| -1 | -1 | 1  |
| 0  | 0  | -1 |

30-9
| -1 | -1 | 1 |
|----|----|---|
| 1  | 1  | 0 |
| 0  | 0  | 0 |

30-10
| 1  | -1 | -1 |
|----|----|----|
| 0  | 1  | 1  |
| 0  | 0  | 0  |

30-11
| 0  | 0  | 0 |
|----|----|---|
| 1  | 1  | 0 |
| -1 | -1 | 1 |

30-12
| 0 | 0  | 0  |
|---|----|----|
| 0 | 1  | 1  |
| 1 | -1 | -1 |

30-13
| 1  | 1  | -1 |
|----|----|----|
| -1 | -1 | 0  |
| 0  | 0  | 0  |

30-14
| -1 | 1  | 1  |
|----|----|----|
| 0  | -1 | -1 |
| 0  | 0  | 0  |

30-15
| 0  | 0  | 0 |
|----|----|---|
| -1 | -1 | 0 |
| 1  | 1  | -1 |

30-16
| 0  | 0  | 0  |
|----|----|----|
| 0  | -1 | -1 |
| -1 | 1  | 1  |

- FOR 45 DEGREES

45-1
| -1 | -1 | 1 |
|----|----|---|
| -1 | 1  | 0 |
| 1  | 0  | 0 |

45-2
| 0 | 0  | 1  |
|---|----|----|
| 0 | 1  | -1 |
| 1 | -1 | -1 |

45-3
| 1  | 1  | -1 |
|----|----|----|
| 1  | -1 | 0  |
| -1 | 0  | 0  |

45-4
| 0  | 0  | -1 |
|----|----|----|
| 0  | -1 | 1  |
| -1 | 1  | 1  |

45-5
| 1 | 1  | 1 |
|---|----|---|
| 1 | 1  | -1 |
| 1 | -1 | 1 |

46-6
| 1  | -1 | 1 |
|----|----|---|
| 1  | 1  | 1 |
| 1  | 1  | 1 |

45-7
| -1 | -1 | -1 |
|----|----|----|
| -1 | -1 | 1  |
| -1 | 1  | -1 |

45-8
| -1 | 1  | -1 |
|----|----|----|
| 1  | -1 | -1 |
| -1 | -1 | -1 |

EDGE SHARPENING PROCESSOR U6

$$g11 = \frac{(1-a1) \times \min - (1-a2) \times ave}{a2-a1}$$

$$g12 = \frac{(1-a1) \times \max - (1-a2) \times ave}{a2-a1}$$

(A) Where $g1 < g11$ ($g1 \leq g11$)
    $g2 = a1 \times g1 + (1-a1) \times \min$ (B) Where $g11 \leq g1 < g12$ ($g11 < g1 \leq g12$)
    $g2 = a2 \times g1 + (1-a2) \times ave$ (C) Where $g12 \leq g1$ ($g12 < g1$)
    $g2 = a1 \times g1 + (1-a1) \times \max$ SHARPENED GRADATION VALUE $g5 \leftarrow a3 \times g4 + (1-a3) \times g3$ $a3 \cdots$ COEFFICIENT CORRESPONDING TO THE NUMBER OF PIXELS OF UNINTERPOLATED IMAGE $(0 < a3 < 1)$

CONNECTION INFORMATION D15

| EDGE | POSITION | ANOTHER EDGE | | |
|---|---|---|---|---|
| | | | BLOCK | POSITION |
| ⋮ | ⋮ | ⋮ | ⋮ | ⋮ |
| EDGE i | $(X_i, Y_i)$ | CONNNECTING 1 | (−1,−1) | (−2,−2) |
| | | CONNECTING 2 | ABSENCE | |
| | | CONNECTED 1 | (+1, 0) | (+3,+1) |
| | | CONNECTED 2 | ABSENCE | |
| ⋮ | ⋮ | ⋮ | ⋮ | ⋮ |

EDGE GENERATION METHOD, EDGE GENERATION DEVICE, MEDIUM RECORDING EDGE GENERATION PROGRAM, AND IMAGE PROCESSING METHOD

BACKGROUND OF THE INVENTION

1. Field of the Invention

The present invention relates to an edge generation method, an edge generation device, a medium recording edge generation program, and an image processing method.

2. Description of the Related Art

Heretofore, in generation of an enlarged image that results from increasing the number of structural pixels of an image that is not yet subjected to expansion in size (hereinafter referred to also as "unenlarged image"), a position of an edge is detected in a pixel of the unenlarged image. Then, the detected position of the edge is made to correspond to a pixel of the enlarged image to form an area of the edge of the enlarged image. Also, gradation data of each pixel of the enlarged image (hereinafter referred to also as "gradation data of enlarged image") is generated through predetermined interpolation. In the interpolation using a bi-linear method, a bi-cubic method or the like, the gradation data of the enlarged image is generated by using image data of plural pixels within a predetermined area in the unenlarged image that is positioned in proximity to an intended pixel on the enlarged image. Then, the interpolation is conducted in blocks that sectionalize the pixels of the enlarged image in correspondence with the pixels of the unenlarged image to generate the gradation data of the enlarged image. Also, the edge is emphasized and sharpened on the basis of the image data of the unenlarged image so that the edge portion becomes sharpened.

Also, when it is judged that any one of an extent of variation of a gradation value of the intended pixel and an extent of variation of a gradation value of a pixel that is in proximity to the intended pixel meets a predetermined condition, the degree of variation is evaluated assuming that the intended pixel meets that condition, and one interpolation is selected from plural kinds of interpolations on the basis of the evaluation to execute pixel interpolation (for example, refer to Japanese Patent No. 3045134).

In the case where the position of the edge is detected in the pixel of the unenlarged image, a precision in the edge position of the enlarged image is not high, and a zigzag pattern that is so-called "jaggy" is highly visible on the edge of the enlarged image. Under the above circumstances, it is desired that the precision in the edge position is improved, and the edge of the enlarged image is formed with high precision and a thin line to facilitate sharpening or the like.

Also, it is desired that a characteristic portion such as a flesh color is excellently expressed while the image quality of other portions is maintained, and the edge portion is more excellently sharpened to make the processed image high in quality.

In addition, when interpolation is conducted by using the image data of plural pixels that straddle the area of the edge, the image data of a pixel that is at an opposite side of the area of the edge with respect to the intended pixel is reflected by the gradation data that has been subjected to interpolation. As a result, there arises such a problem that the edge portion is smoothed and blurred. In particular, in the case where interpolation is conducted in the block, when the blocks having the edge are sharpened, there arises such a problem that a color difference occurs between blocks where the area of the edge exists (hereinafter referred to also as "edge block" and blocks where no area of the edge exists (hereinafter referred to as "non-edge block"). In Japanese Patent No. 3045134, when cubic convolution interpolation is conducted by using the image data of plural pixels that straddle the area of the edge, the edge portion is smoothed. Under the above circumstances, it is desired that the sharpness of the edge portion is maintained to improve the image quality.

SUMMARY OF THE INVENTION

The present invention has been made in view of the above problem, and therefore an object of the present invention is to improve an image quality after an image has been processed.

Another object of the present invention is to facilitate processing such as sharpening by forming an edge of an enlarged image with high precision and a thin line.

Still another object of the present invention is to express a color area more excellently while the image quality of portions except for the color area is maintained.

Yet still another object of the present invention is to sharpen an edge portion more excellently.

Yet still another object of the present invention is to improve the image quality of the image that has been processed by forming the edge of the enlarged image with high precision and a thin line.

In achieve the above object, according to one aspect of the present invention, there is provided an edge generation method that generates edge information which expresses an area of an edge of an enlarged image resulting from enlarging a unenlarged image on the basis of image data that represents the unenlarged image with gradation data of each pixel, the method comprising the steps of:

acquiring a position of an edge in correspondence with a position of each pixel of the enlarged image on the basis of the image data;

determining a direction of an intended edge according to the gradation data of plural pixels within a predetermined region including the position of the intended edge which determines the direction among the gradation data of each pixel on the enlarged image;

correcting the position of the intended edge to a position that brings a direction connecting a position of the intended edge and a position of an edge that is in proximity to the intended edge closer to the determined direction of the intended edge in the enlarged image; and generating the edge information representative of the area of the edge of the enlarged image in correspondence with the position of each pixel of the enlarged image.

Also, according to another aspect of the present invention, there is provided an edge generation device that generates edge information which expresses an area of an edge of an enlarged image resulting from enlarging a unenlarged image according to image data that expresses the unenlarged image, the device comprising:

an enlarged position acquiring processor, a direction determining processor; a position correcting processor; and an edge generation processor.

When the position of the edge in correspondence with the position of each pixel of the enlarged image is acquired by the enlarged position acquiring processor, the direction of the intended edge is determined by the direction determining processor according to gradation data of plural pixels within a predetermined region including the position of the intended edge which determines the direction among gradation data of each pixel on the unenlarged image. In this example, the position of the intended edge can be corrected to a position that brings a direction connecting a position of the intended edge and a position of an edge (referred to also as "adjacent edge") that is in proximity to the intended edge closer to the determined direction of the intended edge on the enlarged image by the position correcting processor. Then, the edge information representative of the area of the edge of the enlarged image in correspondence with the position of each pixel of the enlarged image is generated by using the position of the edge which has been corrected by the edge generating processor.

That is, since the position of the intended edge is corrected so that the direction connecting the position of the intended edge and the position of the adjacent edge is brought closer to the determined direction of the intended edge, a precision in the edge position is improved. Accordingly, it is possible that the edge of the enlarged image is formed with high precision and a thin line to facilitate processing such as sharpening. This makes it possible to improve the quality of the image that has been processed.

The above image data can be in various data formats such as bit map data or compressed data, and also be various data such as YCbCr data, RGB data, CMYeG data or Lab data consisting of component data of a CIE Lab color space. The image that is expressed by the image data can be made up of a plurality of pixels, and may express a small image such as 4×4 pixels or 8×8 pixels.

The pixels within the predetermined region may be adjacent to or may not be adjacent to the intended edge.

The enlarged position acquiring processor may calculate a difference between the image data of the intended pixel and the image data of the pixel that is positioned in proximity to the intended pixel, and then acquire the position of the edge that exists in proximity to the intended pixel on the basis of the calculation result. With a simple structure by which the difference in the image data is calculated, the position of the edge can be acquired. In this situation, the position of the edge can be acquired on the basis of the strength of the edge and the calculation result.

The enlarged position acquiring processor may be constituted as follows: That is, the enlarged position acquiring processor generates intermediate data that is expressed in gradation in correspondence with each pixel of the unenlarged image by conducting calculation on the gradation data of the plural pixels within the predetermined region including the intended pixel by means of a predetermined differential filter on the unenlarged image. Then, the enlarged position acquiring processor determines a position at which the intermediate data is set to a predetermined value by using the intermediate data of the plural pixels within the predetermined region including the intended pixel on the plurality of pixels that correspond to the intermediate data. Then, the enlarged position acquiring processor acquires the position of the edge that makes the determined position correspond to the position of each pixel of the enlarged image. Since the position of the edge is detected by using the differential filter, the position of the edge can be determined with a simple structure and with high precision, thereby making it possible to generate information representative of the area of the edge of the enlarged image with high precision.

The plurality of pixels within the predetermined region where the gradation data is used for determination of the direction of the intended edge, the plurality of pixels within the predetermined region where the gradation data is used for generating the intermediate data, and the plurality of pixels within the predetermined region where the gradation data is used for generating the position at which the intermediate data is set to the predetermined value may be made up of pixels within the same region, or may be made up of pixels within different regions. The pixels within the predetermined region including the intended pixel may be adjacent to the intended pixel or may not be adjacent to the intended pixel. The same is applied to the following cases. The above-mentioned predetermined value may be a fixed value or an extended value.

The differential filter may be formed of a Laplacian filter, and the above-mentioned predetermined value may be set to substantially zero. Then, the enlarged position acquiring processor may determine a position at which the intermediate data is set to substantially zero on the basis of the positions of the plural pixels within the predetermined region including the intended pixel and the intermediate data on the plural pixels which correspond to the intermediate data, and acquire the position of the edge which makes the determined position correspond to the position of each pixel of the enlarged image. With detection of the position of the edge by using the known Laplacian filter, the position of the edge can be acquired with a simple structure and high precision, and information representative of the area of the edge of the enlarged image can be generated with high precision.

The Laplacian filter can be formed of an 8-directional Laplacian filter, a 4-directional Laplacian filter or the like. The use of the Laplacian filter is useful in that the edge position can be acquired with high precision. However, the Laplacian filter may be formed of a differential filter such as a primary space differential filter.

The direction determining processor may binarize the gradation data of the plural pixels within the predetermined region including the intended pixel to generate binary data on the unenlarged image, and determine the direction of the edge according to the binary data and a plurality of predetermined matching patterns that correspond to the direction of the edge. The direction of the edge can be determined with a simple structure and surely, and the edge of the enlarged image can be surely formed with high precision and with a thin line through high-speed processing.

When a direction connecting positions of two edges that are in proximity to the intended edge to each other are closer to the determined direction of the intended edge than the direction that connects the position of the intended edge and the position of the edge that is in proximity to the intended edge on the enlarged image, the position correcting processor may correct the position of the intended edge to the position that brings the direction connecting the position of the intended edge and the position of the edge that is in proximity to the intended edge closer to the determined direction of the intended edge. That is, the position of the intended edge is corrected in the case where the direction connecting the positions of those two adjacent edges together is closer to the determined direction of the intended edge than the direction connecting the position of the intended edge and the position of the adjacent edge. As a result, the precision in the edge position is more surely improved. Accordingly, it is possible to more surely form the edge of the enlarged image more smoothly with high precision and with a thin line to more facilitate processing such as sharpening. As a result, the quality of the image that has been processed can be made more excellent.

In this situation, when the position of the intended edge is corrected to the position that brings the intended edge closer to the line that connects the positions of the two edges to each other, the precision in the edge position is further surely improved. Accordingly, it is possible to further surely form the edge of the enlarged image more smoothly with high precision and with a thin line to further facilitate processing such as sharpening. As a result, the quality of the image that has been processed can be made further excellent.

When the position of the edge of the enlarged image is set as the pixel unit of the enlarged image, the area of the edge is formed in the pixel unit of the enlarge image. As a result, it is possible to more surely form the edge of the enlarged image with high precision and with a thin line to facilitate processing such as sharpening. Also, it is possible to reduce the jaggy of the edge. In this situation, since it is unnecessary to generate the enlarged image for detection of the edge in order to acquire the edge position, the information representative of the area of the edge of the enlarged image can be generated in a memory region that is small in the capacity.

When the edge generating processor connects the adjacent edges of the enlarged image to each other to generate the edge information representative of the area of the edge of the enlarged image, it is possible to form the edges of the enlarged image with high precision and with a thin line because the edges of the enlarged image are connected to each other.

The enlarged position acquiring processor may acquire the position of the edge on the basis of the image data pertaining to the brightness of the unenlarged image. As a result, the position of the edge can be more surely acquired with high precision, and information representative of the area of the edge of the enlarged image can be generated with high precision. The image data pertaining to the brightness may include various data such as luminance data, lightness data, or the average of respective data for RBG.

The enlarged position acquiring processor may execute calculation for conducting Gaussian blurring on the gradation data of plural pixels within a predetermined region including the intended pixel, and acquire the position of the edge on the basis of the image data that has been subjected to Gaussian blurring. Since a noise is removed by conducting Gaussian blurring, the precision is further improved, and the information representative of the position of the more smoothed edge can be generated.

Also, according to another aspect of the present invention, there is provided an image processor that corrects image data, comprising a feature quantity acquiring processor, a filter processor, and a synthesizing processor.

The feature quantity acquiring processor obtains, from the gradation data of the plural pixels, a feature quantity that expresses the amount of pixels within a predetermined color region from a plurality of pixels within a predetermined region including the intended pixel to be corrected. Also, the filter processor conducts predetermined filtering operation on the gradation data of the plural pixels within the predetermined region including the intended pixel, and obtains the gradation data of the intended pixel which has been subjected to filtering. Then, the synthesizing processor synthesizes the gradation data of the intended pixel and the gradation data that has been subjected to filtering at a rate corresponding to the feature quantity as the gradation data of the intended pixel which has been corrected.

That is, since the gradation data that has been filtered is synthesized at the rate corresponding to the feature quantity that expresses the amount of pixels within the predetermined color region, the color region is appropriately processed. Accordingly, the color region can be more excellently expressed while the image quality of portions other than the color region is maintained. As a result, the quantity of the image which has been processed can be improved.

The color region may include various regions in the image such as a predetermined flesh color region that expresses the flesh color, a predetermined blue region that expresses blue sky, a predetermined red region that expresses sunset, or a predetermined green region that expresses a forest in the image. The predetermined filter operation may be conducted according to the kind of color regions. For example, in the case of the fresh color region, when the filter operation is conducted by using a smoothing filter that smoothes the gradation data of the plural pixels within the predetermined region, it is possible to express the important fresh color with a more preferable color as a color. Thus, the image having the more excellent quality can be obtained. Also, when the filtering operation that conducts the Gaussian blurring is conducted, the expression of the fresh color region is more surely improved, and the image of the high quality can be more surely obtained. Obviously, in the case of the color region that prefers sharpening, when the filter operation that sharpens the gradation data of the plural pixels within the predetermined region is conducted, it is possible to express the more preferable color in the color region, and also it is possible to obtain the image with the more excellent quality.

As a simple structure, the synthesizing processor may obtain the gradation data of the intended pixel which has been corrected through an operational expression of $b1 \times h2 + (1-b1) \times h1$ assuming that the gradation value of the intended pixel is h1, the gradation value of the intended pixel which has been filtered is h2 and a coefficient corresponding to the feature quantity is b1 ($0 \leq b1 \leq 1$). Obviously, a mutual relation between the gradation value h1 of the intended pixel and the gradation value of the intended pixel which has been corrected may be not linear but non-linear.

Assuming that a pixel that meets not only $0.1<[1.732(G-B)/(2R-G-B)]<0.9$ but also $G>B$ is a pixel within the predetermined color region, only a portion having the excellent color as the fresh color is regarded as the pixel within the color region. Accordingly, it is possible to surely obtain the feature quantity that expresses the amount of pixels within the excellent fresh color region and further excellently express the excellent fresh color region while the image quality other than the above region is maintained. As a result, the image that has been processed can be further enhanced in quality.

Assuming that the RGB color space is an RGB color space in a CIE 1931 color specification system that is also defined by sRGB standard, the color region can be further excellently expressed, and the quality of the image that has been processed can be further improved.

The feature quantity that expresses a rate of the pixels within the predetermined color region to the number of pixels within the predetermined region including the intended pixel to be corrected is obtained from the gradation data of the plural pixels. Then, the gradation data of the intended pixel and the gradation data that has been filtered are synthesized while the rate of the gradation data that has been filtered increases more with the larger feature quantity, thereby providing the gradation data of the intended pixel which has been corrected. As a result, with a simple structure where the rate of the pixels within the color region is set as the feature quantity, the color region can be more excellently expressed while the image quality of portions except for the color region is maintained. In the case where the fresh color region is set as the predetermined color region, the gradation data that has been filtered is synthesized while the rate of the gradation data that has been filtered increases more with the larger feature quantity thus obtained. As a result, the fresh color region can be further excellently expressed, and the image that has been processed can be further enhanced in the quality.

Further, according to the present invention, there is provided an image processor that generates gradation data corresponding to the respective pixels of an image that has been subjected to interpolation by conducting a process that sharpens the edge portion through interpolation of the image data that expresses the uninterpolated image in gradation, the image processing comprising: an interpolated position acquiring processor, an interpolating processor and a sharpening processor.

When the position of the edge corresponding to the position of each pixel of the interpolated image is acquired by the interpolated position acquiring processor, the image data of the plural pixels in the uninterpolated image which are positioned in proximity to the intended pixel to be interpolated on the interpolated image by the interpolating processor is used to generate the gradation data that has been interpolated by interpolating the intended pixel. Then, the sharpening processor sharpens the gradation data of the plural pixels within the predetermined region including the position of the intended edge to be sharpened among the gradation data of the respective pixels which has been interpolated on the interpolated image at a degree corresponding to the number of pixels of the uninterpolated image.

That is, since the gradation data of the plural pixels within the predetermined region including the position of the intended edge is sharpened at the degree corresponding to the number of pixels of the uninterpolated image, the gradation data of the plural pixels is appropriately sharpened. Accordingly, the edge portion can be more excellently sharpened, and the quality of the image that has been processed can be improved.

The pixel that is positioned in proximity to the intended pixel may be adjacent to the intended pixel or may not be adjacent to the intended pixel.

The sharpening processor may set the degree of sharpness of the uninterpolated image having a first pixel number to be larger than the degree of sharpness of the uninterpolated image having a second pixel number that is smaller than the first pixel number. Since the edge portion that has been interpolated is more appropriately sharpened, the image that has been processed can be more enhanced in the quality.

As a simple structure where the image is sharpened at the degree corresponding to the number of pixels, the sharpening processor may conduct predetermined sharpening operation on the gradation data of the plural pixels within the predetermined region, and obtain the gradation data that has been subjected to the sharpening operation. Then, the sharpening processor may synthesize the gradation data that has not yet been subjected to the sharpening operation and the gradation data that has been subjected to the sharpening operation with respect to the plural pixels within the predetermined region at the rate corresponding to the number of pixels of the uninterpolated image into the gradation data that has been sharpened. The image that has been processed can be more enhanced in the quality with the simple structure.

As the simpler structure, the sharpening processor may obtain the gradation data that has been sharpened through an operational expression of $a3 \times g4 + (1-a3) \times g3$ assuming that the gradation value of each pixel within the predetermined region is g3, the gradation value that has been sharpened is g4, and a coefficient corresponding to the number of pixels of the uninterpolated image is a3 ($0 \leq a3 \leq 1$). Obviously, a mutual relation between the gradation values g3 before and after being sharpened may be not linear but non-linear.

In addition, the image can be sharpened at the degree corresponding to the number of pixels even by using an operation expression (6) that will be described later, and the image that has been processed can be more enhanced in the quality. Also, the sharpening process can be performed at a high speed as compared with a case that conducts tone curve correction, and an appropriate sharpening process can be performed according to the circumstance of the gradation value at each of the edges. The above predetermined sharpening operation is conducted by using the above operational expression, and the gradation data that has not yet been subjected to the sharpening operation and the gradation data that has been subjected to the sharpening operation are synthesized with respect to the plural pixels within the predetermined region, respectively, at the rate corresponding to the number of pixels of the uninterpolated image into the gradation data that has been sharpened. As a result, the image that has been processed can be more enhanced in the quality.

In the image that has already been subjected to the sharpening operation of the gradation data, the already obtained gradation data that has been subjected to the sharpening operation and the newly obtained gradation data that has been subjected to the sharpening operation are averaged and then sharpened. As a result, the sharpening process can be performed at a high speed while the high quality of the image that has been processed is maintained. The above average includes an arithmetic average (arithmetical means) and a geometric average.

Also, even if the position of the intended edge is set except for the position of the edge that is adjacent to the edge which has already set as the position of the intended edge, the sharpening process can be increased in the speed while the high quality of the image that has been processed is maintained.

The interpolating processor may conduct the above interpolating process by using only the image data of the pixels which is different within a predetermined range from the image data of the pixel corresponding to the intended pixel among the plural pixels in the uninterpolated image that is positioned in vicinity to the intended pixel to generate the gradation data that has been interpolated. The image data of the pixel that is largely different from the image data of the pixel corresponding to the intended pixel is not used in the interpolating process. Accordingly, there is substantially performed the interpolating process using only the image data of the pixel on the intended pixel side from the area of the edge. That is, since the image data of the pixels in the area that exceeds the area of the edge in the predetermined area is not used in the interpolating process, the edge portion is not smoothed, and the image quality can be improved while the sharpness of the edge portion is maintained even after the interpolating process.

In this example, as the interpolating process that refers to the image data of the plural pixels, there are proposed various processing such as interpolation using a bi-cubic method, or interpolation using a bi-linear method. The predetermined area may be appropriately determined according to the kind of interpolation. There may be a case in which one pixel exists on the intended pixel side from the edge area.

The above image data may be data related to the brightness of the image. A difference in the image data may be various differences such as a difference or ratio of the gradation value, or a difference of the second power of the gradation value.

The above predetermined region may include a boundary portion or may exclude the boundary portion. Whether the difference in the image data falls within the predetermined region, or not, can be judged by comparing the difference with a predetermined threshold value. The threshold value may be a fixed value or fluctuate according to the conditions. The same is applied to the following examples.

Further, according to another aspect of the present invention, there is provided an image processor that interpolates image data that expresses an unenlarged image in gradation and sharpens an edge portion to generate gradation data corresponding to each pixel of the enlarged image resulting from enlarging the unenlarged image, the image processor comprising: an enlarged position acquiring processor, an interpolating processor and a sharpening processor.

That is, the sharpening process is conducted at the position of the edge which is a unit smaller than the pixel of the unenlarged image after interpolation has been conducted. As a result, the edge of the enlarged image is formed with high precision and with a thin line, thereby making it possible to improve the quality of the image that has been processed.

The above device includes various embodiments as the concept of the present invention such that the device is implemented with another method in a state where the device is incorporated into some equipment, and can be appropriately modified. Also, since processing can be advanced according to a predetermined procedure corresponding to the above structure, the same actions and effects as the above actions and effects are obtained as a control method. In addition, the same actions and effects as the above actions and effects are obtained as a printing control device that controls the printing operation of a printer that prints on the basis of the image data that has been subjected to the above processing, or a printing system having the printing control device and the printer.

In addition, the same actions and effects as the above actions and effects are obtained in program for allowing a computer to function as the above device, a program product, or a computer readable recording medium recording the program.

BRIEF DESCRIPTION OF THE DRAWINGS

These and other objects, features and advantages of the present invention will become more apparent upon consideration of the following description of the preferred embodiments of the present invention taken in conjunction with the accompanying drawings.

FIG. 5 is a schematic diagram showing the structure of operation setting data 14a;

FIG. 8 is a diagram showing the structures of feature-by-feature filter data and filter synthesis setting data;

FIG. 11 is a schematic diagram showing an example of a matching pattern;

DETAILED DESCRIPTION OF THE PREFERRED EMBODIMENTS

Figure 1:
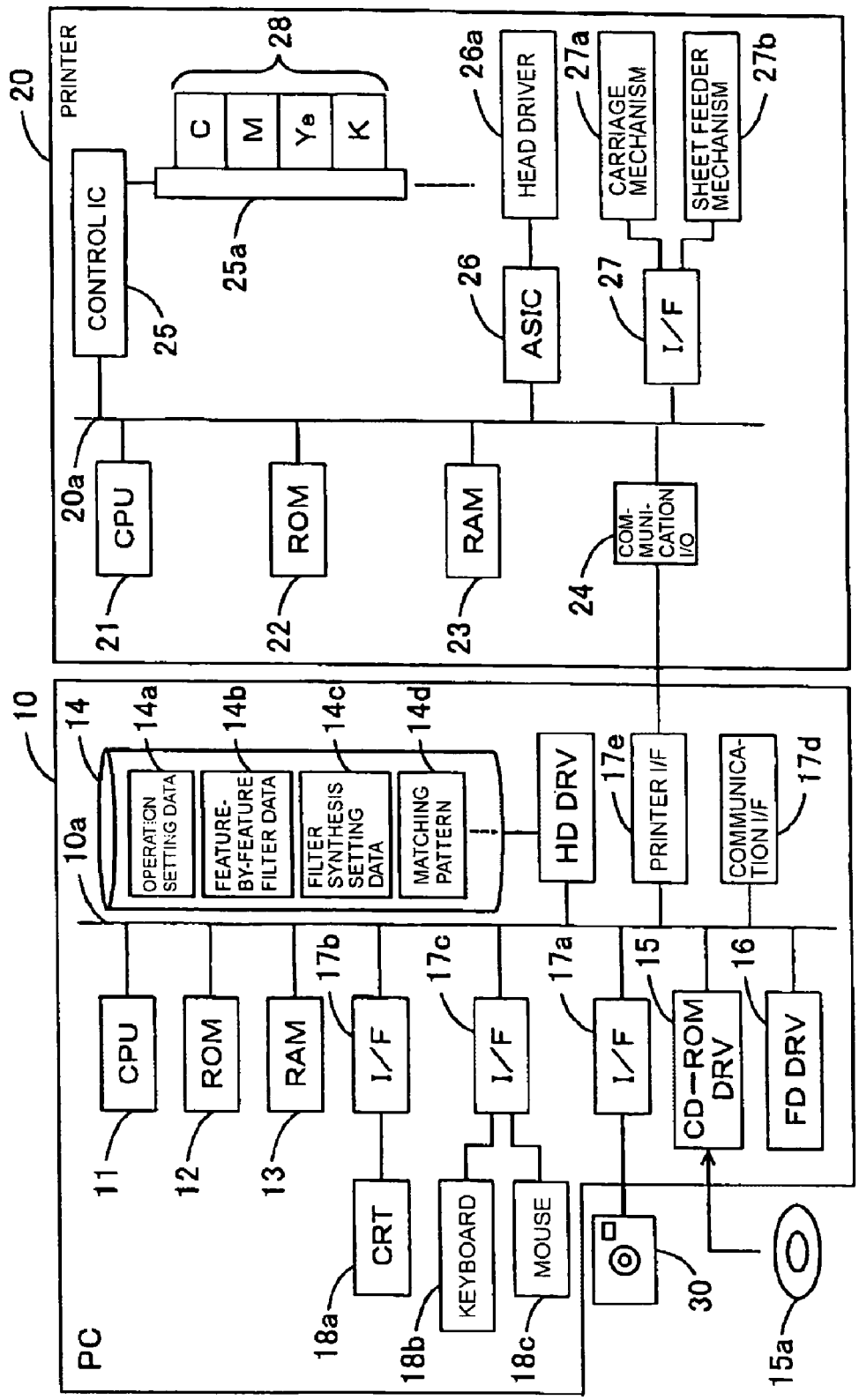
FIG. 1 is a block diagram showing the outline of a hardware structure of a printing system.

Hereinafter, embodiments of the present invention will be described in an order stated below.
(1) Structure of a printing system;
(2) Structural outline of an edge generating device and an image processor;
(3) Details of processing that is conducted by the edge generating device and the image processor;
(3-1) Feature-by-feature filtering process;
(3-2) Smoothing process;
(3-3) Edge information generating process;
(3-4) Interpolating process;
(3-5) Edge sharpening process;
(3-6) Sharpening image synthesizing process; and
(4) Conclusion
(1) Structure of a Printing System FIG. 1 shows a printing system that is made up of a computer (personal computer, PC) 10 which constitutes an edge generating device and a narrow-defined image processor of the present invention, and a color printable ink jet printer 20 which constitutes a printer (printing unit).

In the present invention, a position of an edge is corrected, an image is corrected by a correction quantity corresponding to a feature quantity that expresses the amount of pixels within a predetermined color area, or an edge is sharpened at a degree corresponding to the number of pixels of a before-interpolation image. As a result, there is obtained a high-grade enlarged image that is smooth in the edge and reduced in noises while the sharpness of the image is maintained.

In the PC 10, a CPU 11 that constitutes a seat of arithmetic processing controls the entire PC through a system bus 10a. The bus 10a is connected with a ROM 12 that is an non-rewritable semiconductor memory, a RAM 13 that is a rewritable semiconductor memory, a CD-ROM drive 15, a flexible disc (FD) drive 16, various interfaces (I/F) 17a to 17e, etc. The bus 10a is also connected with a hard disc (HD) 14 that is a magnetic disc. The RAM 13 temporarily stores image data before and after being processed therein.

An operating system (OS) and application program (APL) are stored in the HD 14, and then appropriately transferred to the RAM 13 by the CPU 11 at the time of execution and executed. The HD 14 stores edge generating program and image processing program, operation setting data 14a, feature-by-feature filter data 14b, filter synthesis setting data 14c, and a matching pattern 14d therein. The I/F 17a (for example, USB I/F) is connectable with a digital camera 30 or the like. The CRT I/F 17b is connected with a display 18a that displays an image corresponding to the image data on the basis of color image data. The input I/F 17c is connected with a keyboard 18b or a mouse 18c as an operation input equipment. The printer I/F 17e is connected with a printer 20 through, for example, a parallel I/F cable (or serial I/F cable).

The printer 20 uses ink (recording agent) of C, M, Ye and K (cyan, magenta, yellow and black) loaded in a cartridge 25a. The printer 20 makes the ink adhere to a print sheet (print medium) to form dots, thereby printing a print image corresponding to printing data. Obviously, there may be adopted a printer using light cyan, light magenta, light black, dark yellow, unpigmented ink or the like. Also, a printer not using any ink of C, M, Ye and K may be adopted. Further, there can be adopted various printing devices such as a bubble printer that generates bubbles within an ink passage and discharges an ink, or a laser printer that prints an print image on a print medium by means of a toner ink.

The printer 20 is connected with a CPU 21, a ROM 22, a RAM 23, a communication I/O 24, a control IC 25, an ASIC 26, an I/F 27 and so on through the bus 20. The printer 20 controls the respective units according to program that has been written in the ROM 22.

The communication I/O 24 is connected to the printer I/F 17e, and the printer 20 receives raster data for each color which is transmitted from the PC 10 through the communication I/O 24. The ASIC 26 outputs supply voltage data corresponding to the raster data to a head driver 26a while transmitting and receiving a predetermined signal with respect to the CPU 21. The head driver 26a generates a supply voltage pattern to a piezoelectric element that is incorporated into a print head on the basis of the supply voltage data. The head driver 26a then discharges inks of 6 colors to the print head in dots. A carriage mechanism 27a and a sheet feeder mechanism 27b which are connected to the I/F 27 sequentially feed the print sheet and conduct vertical scanning operation while allowing the print head to conduct horizontal scanning operation and appropriately conducting page feed operation.

In the PC 10, a printer driver that controls the printer I/F 17e is incorporated into an OS, and executes various controls as parts of the OS. The APL exchanges data or the like with the hardware through the OS. The printer driver operates at the time of executing the printing function of the APL, and can conduct two-way communication with the printer 20 through the printer I/F 17e. The printer driver receives the printing data from the APL through the OS, converts the printing data into raster data, and sends the raster data to the printer 20.

The program of the present invention may be made up of any one of OS, APL, OS and the combination of OS and APL. A medium in which the program has been recorded may be formed of an HD14 as well as a CD-ROM, an FD 16a, and a semiconductor memory. Also, the communication I/F 17d may be connected to the Internet to download the program of the present invention from a predetermined server and execute the program.

(2) Structural Outline of an Edge Generating Device and an Image Processor

Figure 2:
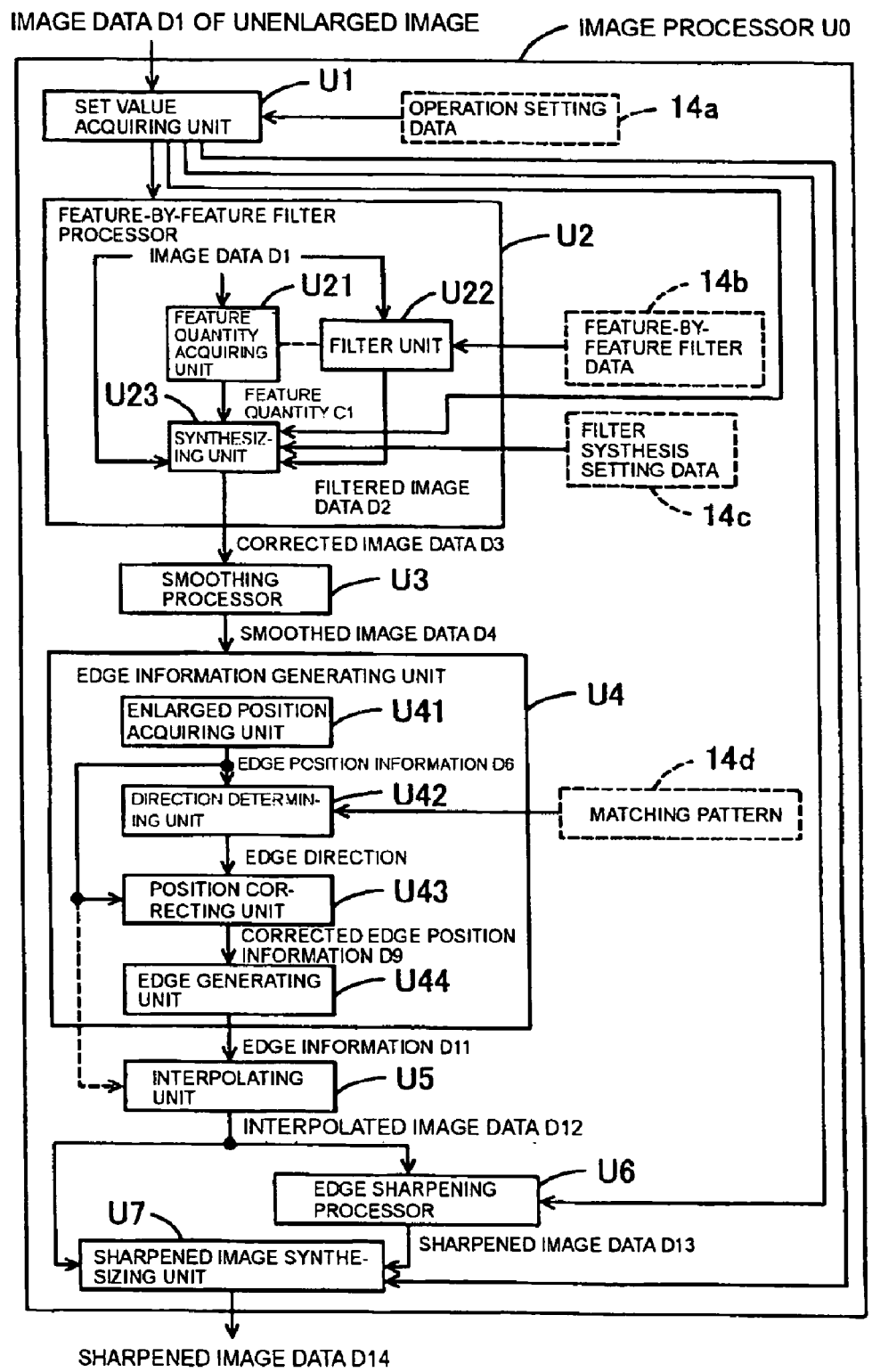
FIG. 2 is a block diagram schematically showing a rough structure of a broad-defined image processor U0.
Figure 3:
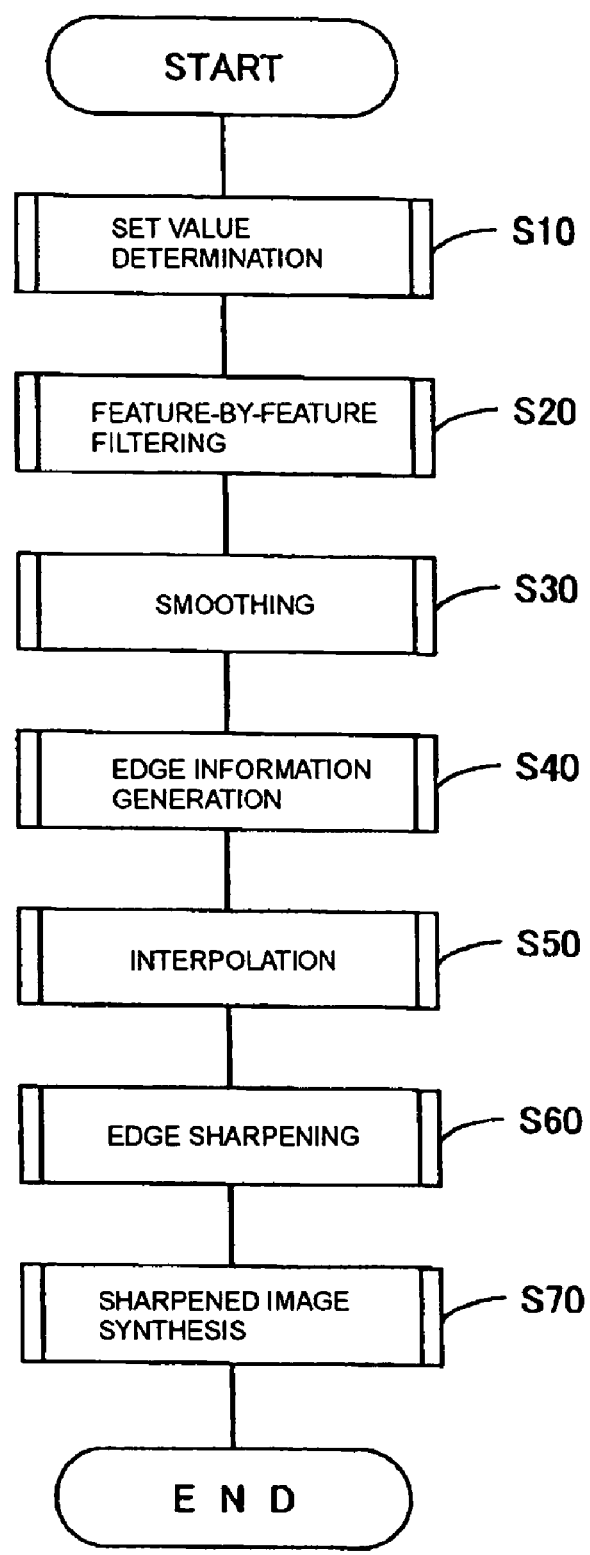
FIG. 3 is a flowchart showing a process that is conducted by the broad-defined image processor.

FIG. 2 is a block diagram schematically showing a rough structure of a broad-defined image processor U0 including the above edge generating device. FIG. 3 is a flowchart showing a process that is conducted by the broad-defined image processor. The image processor U0 includes respective units U1 to U7, and a feature-by-feature filter processor U2 includes further divided respective units U21 to U23. An edge information generating unit U4 includes further divided respective units U41 to U44. The edge generating device according to the present invention is made up of at least an edge information generating unit U4. The image processor for correcting the image data is made up of at least a feature-by-feature filtering processor U2. The image processor for conducting interpolation to sharpen an edge portion is made up of at least respective units U41 and U5 to U7.

When a flow shown in FIG. 3 starts, a set value determining process is conducted by the set value determining unit U1 (Step S10, hereinafter "Step" is omitted).

Figure 4:
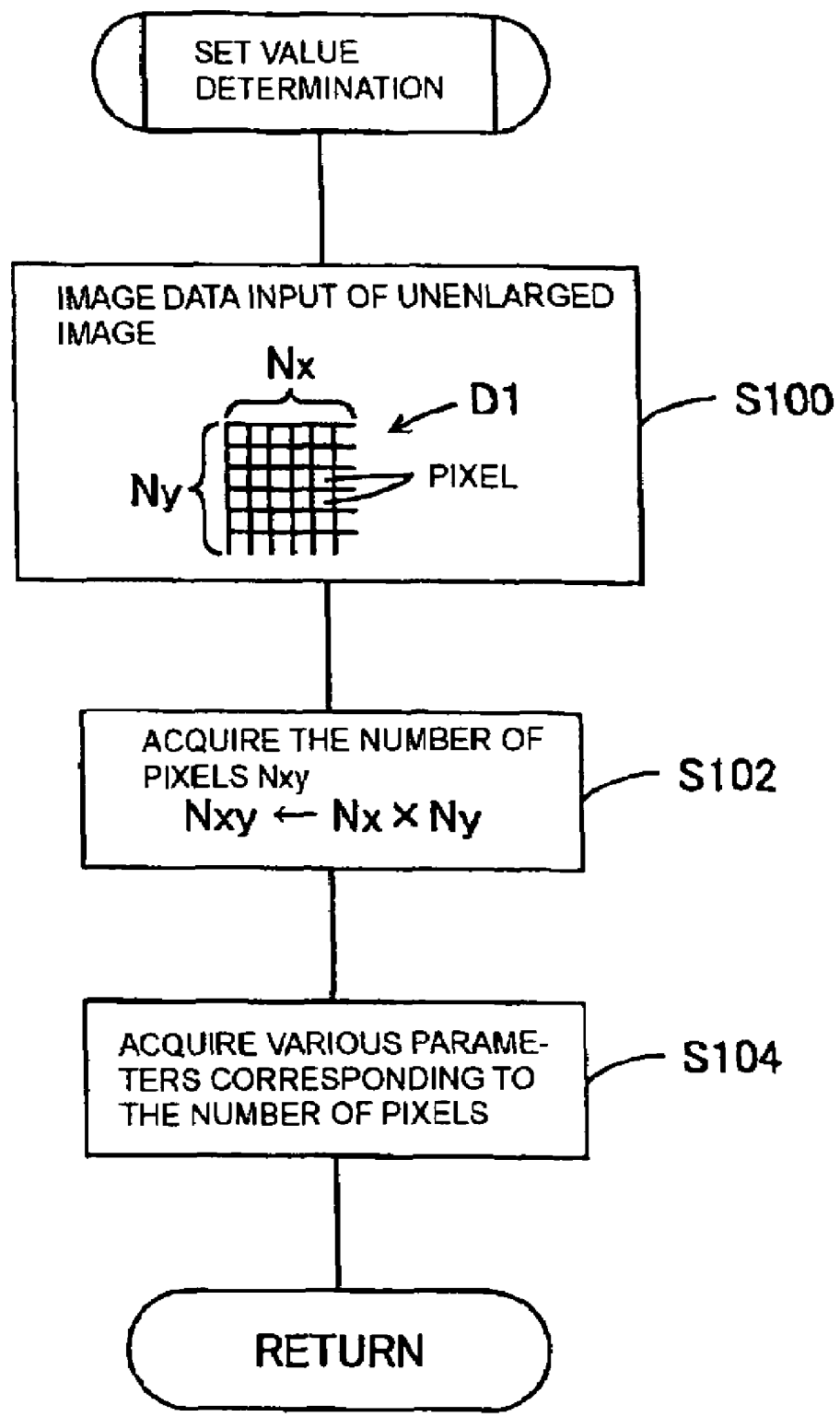
FIG. 4 is a flowchart showing a set value determining process.

FIG. 4 is a flowchart showing the above set value determining process. FIG. 5 is a schematic diagram showing the structure of the operation setting data 14a. When a flow starts, image data D1 of an unenlarged image (uninterpolated image) is inputted (S100). The image data D1 expresses the unenlarged image by a large number of pixels in gradation, and represents the brightness of the unenlarged image. Gradation data for each pixel can be set to, for example, data of 256 gradations. The image data of this embodiment is RGB data consisting of gradation values for each of R (red), G (green) and B (blue) which correspond to component values of the respective RGB of an RGB color space in a CIE 1931 color specification system for each pixel. However, the image data may be YCbCr data consisting of Y (luminance), Cb (color difference of blue) and Cr (color difference of red).

Then, the number of pixels Nxy of the unenlarged image is acquired with reference to image data D1 (S102). Assuming that the number of pixels that constitute the image data D1 in a horizontal direction (x-direction) is Nx, and the number of pixels in a vertical direction (y-direction) is Ny, Nx×Ny can be set to Nxy. Then, various parameters corresponding to the number of pixels Nxy are acquired with reference to the operation setting data 14a (S104), and the flow is completed. The parameters have an execution parameter p1 for executing a feature-by-feature filtering process, inclination values a1 and a2 for executing an edge sharpening process, and a synthesis ratio A3 for executing a sharpened image synthesizing process. Those parameters a1, a2 and A3 are so set as to be gradually larger as the number of pixels of the unenlarged image is larger. In an example of FIG. 5, the degree of sharpness corresponding to the unenlarged image having the number of pixels (an example of a first pixel number) which is equal to or larger than (larger than) million pixels is so set as to be larger than the degree of sharpness corresponding to the unenlarged image having the number of pixels (an example of a second pixel number) which is smaller than (equal to or smaller than) million pixels. The degree of sharpness corresponding to the unenlarged image having the number of pixels (an example of a first pixel number) which is equal to or larger than (larger than) 300,000 pixels is so set as to be larger than the degree of sharpness corresponding to the unenlarged image having the number of pixels (an example of a second pixel number) which is smaller than (equal to or smaller than) 300,000 pixels.

Upon completion of the set value acquiring process, a feature-by-feature filtering process for correcting the image data D1 is conducted by the feature-by-feature filtering processor U2 which will be described later (S20).

Figure 6:
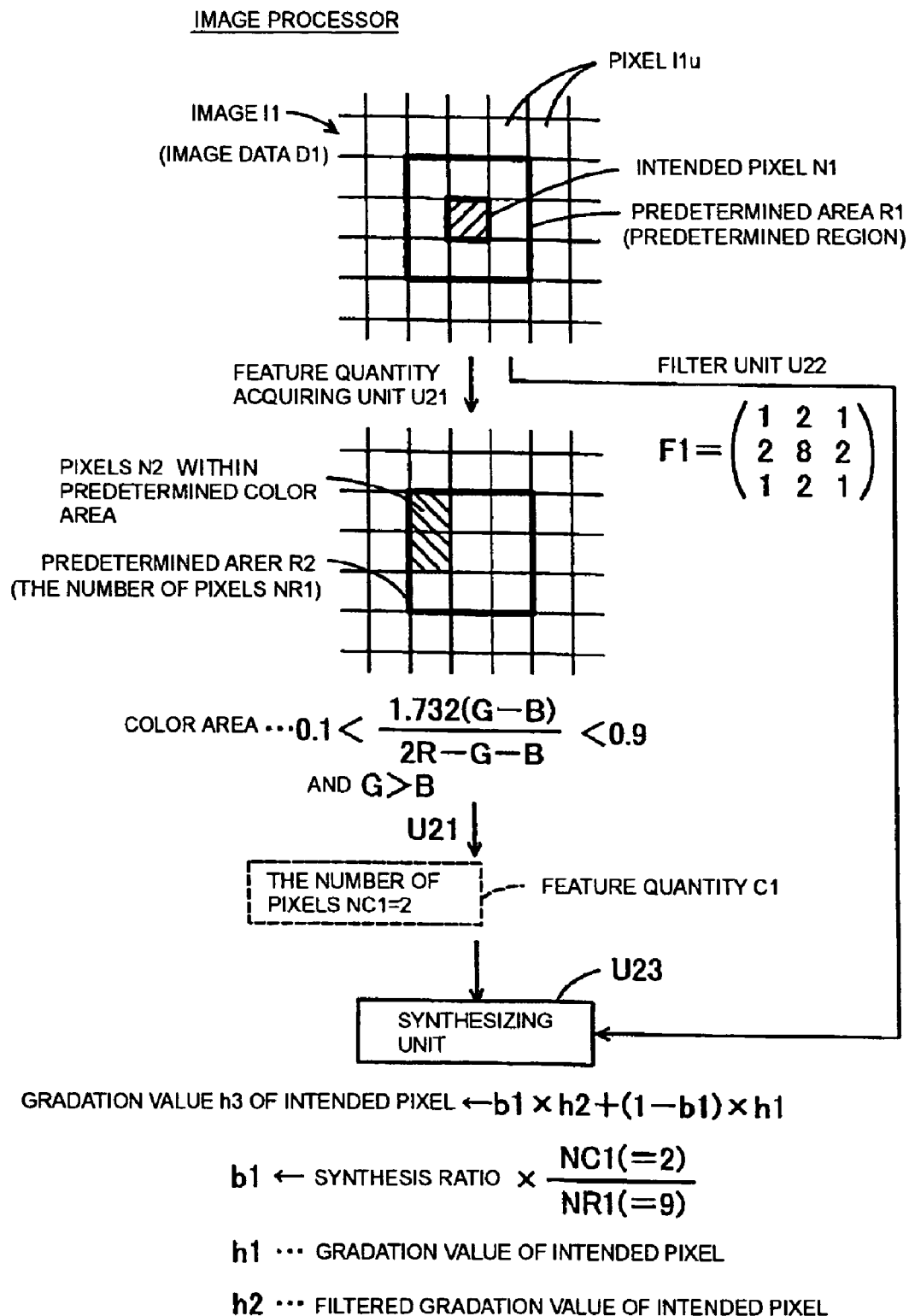
FIG. 6 is a schematic diagram showing a process that is conducted by a feature-by-feature filter processor U2.
Figure 7:
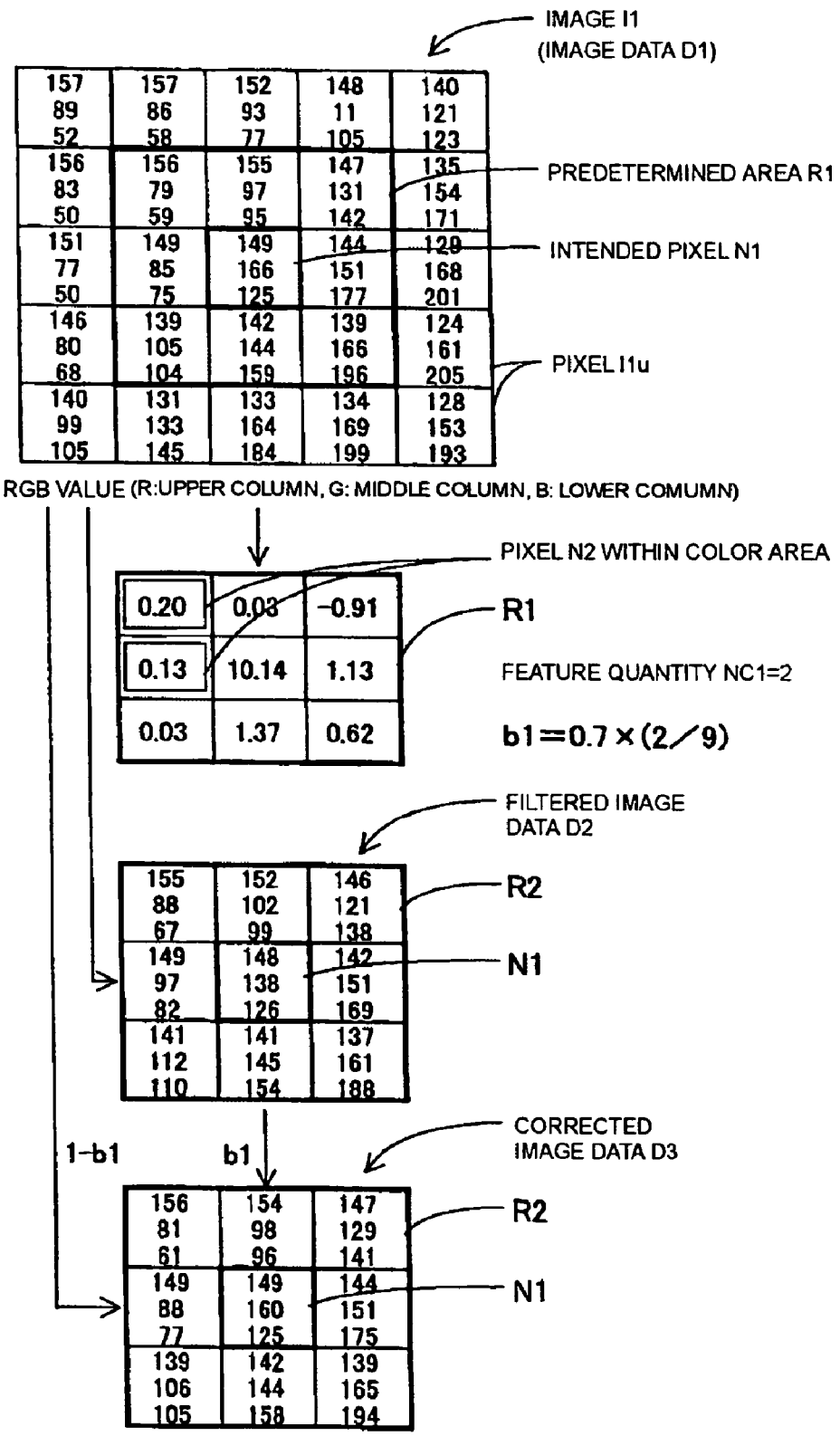
FIG. 7 is a schematic diagram showing a specific example of a process that is conducted by a feature-by-feature filter processor U2.

FIG. 6 is a schematic diagram showing a process that is conducted by the feature-by-feature filter processor U2. FIG. 7 is a schematic diagram showing a specific example of the process. FIG. 8 is a schematic diagram showing the structures of the feature-by-feature filter data 14b and the filter synthesis setting data 14c. The image data D1 that expresses the unenlarged image I1 corresponds to the gradation data consisting of the gradation values of respective RGB for each of pixels I1u that are arranged in a dot matrix. The feature quantity acquiring unit (feature quantity acquiring processor) U21 acquires a feature quantity C1 that expresses the amount of pixels N2 within a predetermined color area from plural pixels within a predetermined area (predetermined region) R1 including the intended pixel N1 to be corrected according to the gradation data of the plural pixels. In this embodiment, 3×3=9 pixels that are centered on the intended pixel N1 is set as a predetermined area R1. Also, with a predetermined fresh color area as the predetermined color area, the number NC1 of pixels N2 that are within the fresh color area in the predetermined area R1 is set as the feature quantity C1.

In this example, when the gradation values of RGB for each of the pixels are r, g and b ($0 \leq r \leq 255$, $0 \leq g \leq 255$, $0 \leq b \leq 255$), and the respective component values of the RGB color space in the CIE 1931 color specification system are R, G and B, and R=r/255, G=g/255, B=b/255 are satisfied, an H value corresponding to a hue of the HSV color specification system is obtained by using the following arithmetic expression.

$$H = [1.732 (G-B)/(2R-G-B)] \quad (1)$$

Then, pixels that meet the following relational expressions (2) and (3) at the same time are set as pixels within the fresh color area.

$$0.1 < H < 0.9 \quad (2)$$

$$G > B \quad (3)$$

An area that meets only the above relational expression (2) can be set as the fresh color area. However, when the area that further meets the above relational expression (3) is set as the fresh color area, only a portion having an excellent color as the fresh color is set as the pixels within the fresh color area. Accordingly, the feature quantity that expresses the amount of pixels within the fresh color area that expresses an excellent fresh color is surely obtained, and the fresh color area that expresses the excellent fresh color can be more excellently expressed while the quantity of image other than the fresh color area is maintained. Then, the image that has been processed can be further enhanced in the quality.

In an example of FIG. 7, a gradation value of R is indicated at an upper column, a gradation value of G is indicated at an intermediate column, and a gradation value of B is indicated at a lower column in the respective pixels of the image I1. Also, the H value that is the arithmetic results of the arithmetic expression (1) is indicated below the image I1. In this example, since the number of pixels N2 that meet both of the relational expressions (2) and (3) is 2, the feature quantity NC1 is set to 2.

A filter unit (filtering processor) U22 conducts predetermined filtering operation corresponding to the color area with respect to the gradation data of plural pixels within a predetermined area R2 including the intended pixel N1. The filter unit U22 then obtains the filtered gradation data of the intended pixel N1, and generates image data D2 that has been filtered. In this example, information on the filters corresponding to the respective plural color areas is stored in the feature-by-feature filter data 14b. In the case of correcting the fresh color area, information on a known Gaussian blurring arithmetic filter F1 is acquired from the feature-by-feature filter data 14b, and operation that conducts Gaussian blurring is conducted on the gradation data of the plural pixels within the predetermined area R2 by means of the filter F1 to generate image data D2 that has been filtered shown in FIG. 7.

The predetermined area R2 may be identical with the predetermined area R1 for obtaining the feature quantity, or may be different from the predetermined area R1. In this example, when the predetermined areas R1 and R2 are identical with each other, the feature quantity appropriately represents the feature of a region that is used in the filtering process. Therefore, it is possible to appropriately express colors in the feature area which is the feature portion in the image.

The synthesizing unit (synthesizing processor) U23 synthesizes the gradation data of the intended pixel N1 and the filtered gradation data of the intended pixel N1 at a rate b1 corresponding to the feature quantity C1 as the corrected gradation data of the intended pixel N1, and generates image data D3 that has been corrected. In this example, a filter ratio B1 ($0 \leq B1 \leq 100$) corresponding to the plural color areas, respectively, is stored in the filter synthesis setting data 14c. In the fresh color area, with B1 as % unit, there is correspondingly stored information on the filter ratio B1 resulting from multiplying a value, which is obtained by dividing the feature quantity NC1 by the number of pixels NR1 in the predetermined area R1, by a predetermined ratio 70%. In the case of correcting the fresh color area, the information on the filter ratio B1 is acquired from the filter synthesis setting data 14c. Then, it is assumed that the gradation value for each of RGB of the intended pixel N1 which has not yet been filtered is h1, the gradation value for each of RGB of the intended pixel N1 which has been filtered is h2, the gradation value for each of RGB of the intended pixel N1 which has been synthesized is h3, and a coefficient corresponding to the feature quantity NC1 is a filter ratio b1(=B1/100, $0 \leq b1 \leq 1$). Then, the gradation value h3 of the intended pixel N1 which has been corrected is obtained from the following arithmetic expression, and the image data D3 that has been corrected as shown in FIG. 7 is generated.

$$h3 = b1 \times h2 + (1-b1) \times h1 \quad (4)$$

The gradation data before and after the filtering process is conducted is synthesized at a rate corresponding to the feature quantity that represents the amount of pixels within the color area of the feature portion such as the fresh color area, and the color area is appropriately filtered. As a result, the feature portion can be more excellently expressed while the image quality of portions other than the feature portion is maintained. Accordingly, the image that has been processed can be enhanced in the quality.

The filter ratio b1 becomes higher as the feature quantity NC1 increases more. Therefore, the ratio b1 of the gradation data which has been filtered becomes higher as the feature quantity NC1 increases more, and the gradation data of the intended pixel before and after filtering is conducted is synthesized as the gradation data that has been corrected. In the case of setting the fresh color area as the feature area, when the rate of the gradation data that has been filtered is made higher as the feature quantity is more, the expression of color in the fresh color area can be further improved. Also, the image that has been processed is further enhanced in the quality.

After the feature-by-feature filtering has been conducted, a smoothing process that smoothes the image data D3 that has been corrected by means of, for example, the Gaussian blurring arithmetic filter and generates the image data D4 that has been smoothed is conducted through the smoothing processor U3 (S30), which will be described in detail later. Thereafter, an edge information generating process that generates edge information which expresses the edge area of an enlarged image obtained by enlarging the unenlarged image from the smoothed image data D4 that expresses the unenlarged image is conducted through the edge information generating unit U4 (S40), which will be described in detail later.

Figure 9:
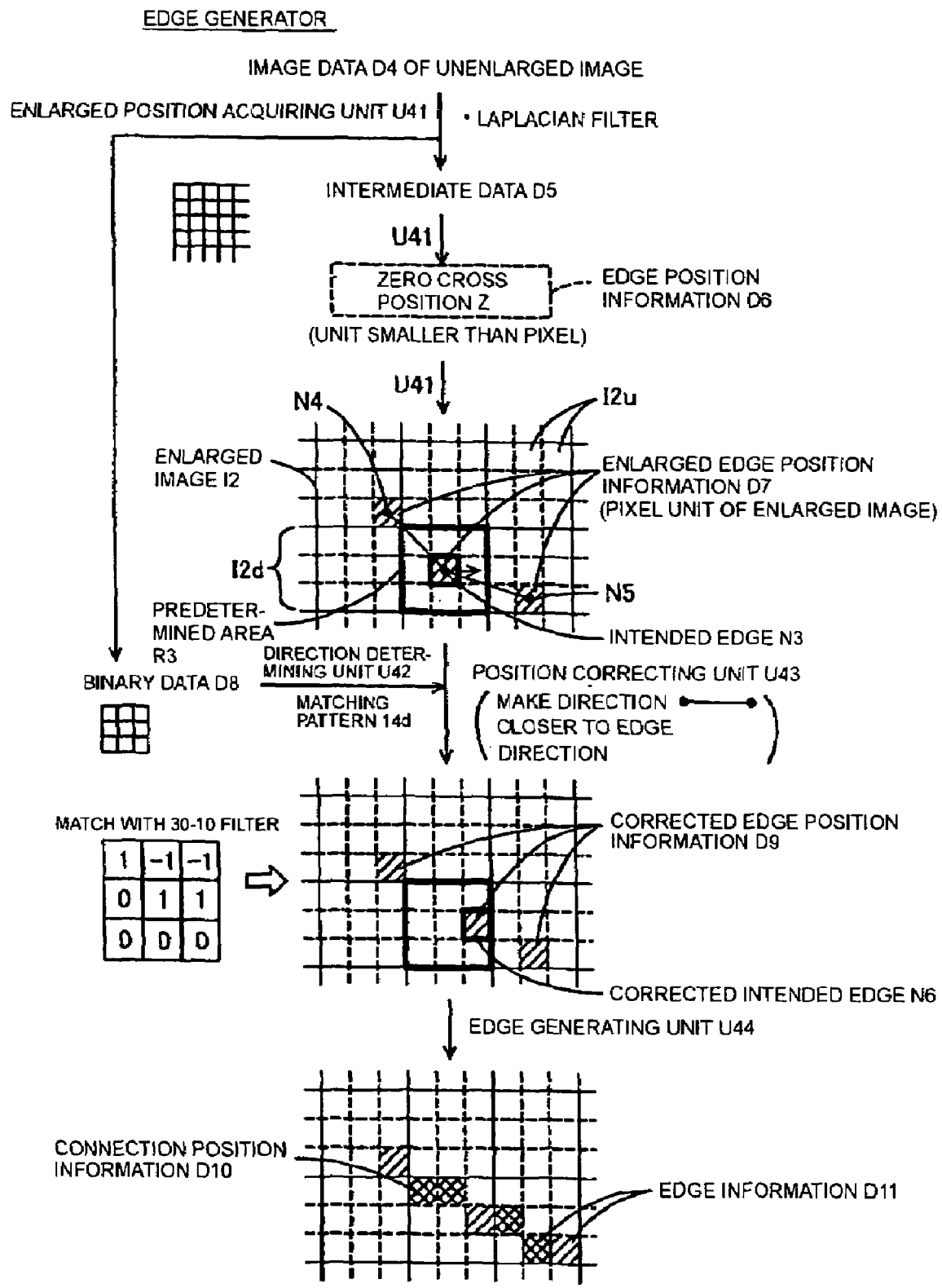
FIG. 9 is a schematic diagram showing a process that is conducted by an edge information generating unit U4.
Figure 10:
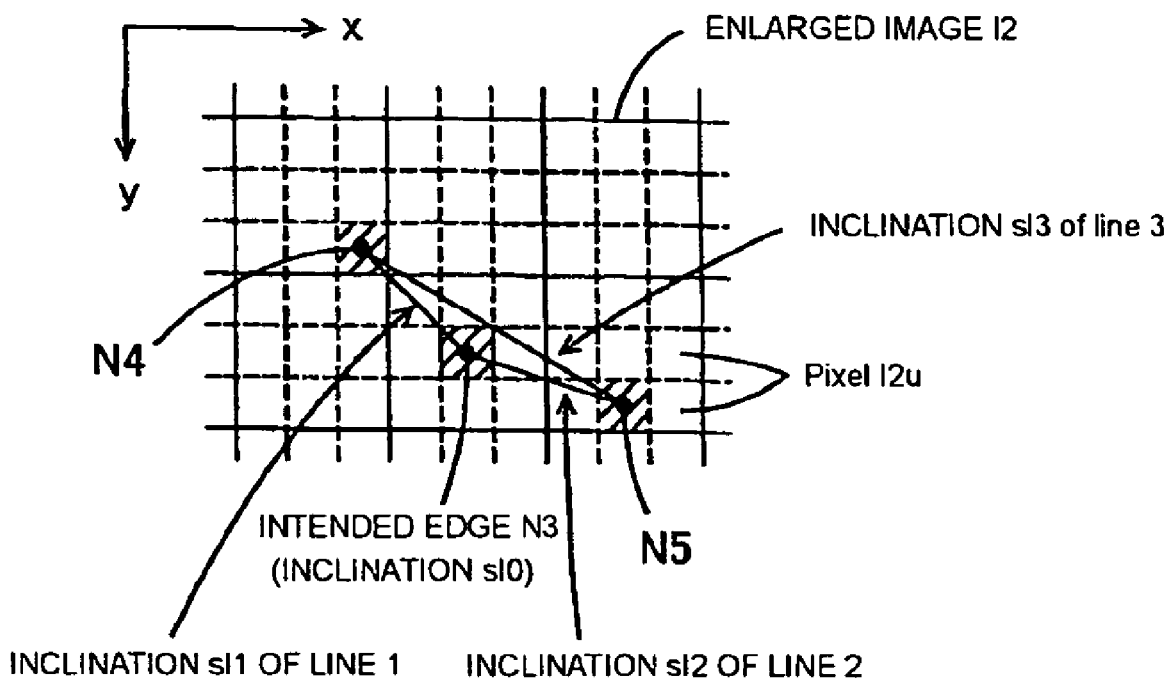
FIG. 10 is a schematic diagram showing a condition in which a position of an intended edge is corrected.
Figure 10:

FIG. 9 is a schematic diagram showing a process that is conducted by an edge information generating unit U4. FIG. 10 is a schematic diagram showing a condition in which a position of an intended edge is corrected. FIG. 11 is a schematic diagram showing an example of the matching pattern 14d (prewitt filter). In FIG. 11, 12 kinds of matching patterns for 90 degrees, 16 kinds of matching patterns for 30 degrees, and 8 kinds of matching patterns for 45 degrees are shown in correspondence with the edge directions of 90 degrees, 30 degrees and 45 degrees, respectively. Also, plural kinds of matching patterns for 60 degrees, 135 degrees and 180 degrees are prepared. It is needless to say that the matching patterns are not limited to those shown in the figures.

When the image is enlarged, the enlarged image look is different from that of the before-enlarged image by processing the edge portion, and preparing the enlarged edge image that is small in the jaggy is very important in the image enlarging process. The present device prepares a clear edge line that is small in the jaggy by means of the respective units U41 to U44.

The image data D4 that has been smoothed also corresponds to the gradation data consisting of the gradation values of the respective RGB for each of the pixels which are arranged in a dot matrix. The enlarged position acquiring unit (enlarge position acquiring processor, interpolated position acquiring processor) U41 acquires enlarged edge position information D7 that expresses the positions of the edges corresponding to the positions of the respective pixels I2u on the basis of the image data D4.

More specifically, the zero cross position Z is calculated and acquired on the basis of the luminance value Y of the image data D4. In this situation, while the intended pixel is sequentially moved on the unenlarged image that has been smoothed, the image data of the intended pixel and the pixels around the intended pixel are subjected to arithmetic operation using the known Laplacian filter to generate intermediate data D5 that expresses the gradation corresponding to the respective pixels of the unenlarged image. In the edge detection by the Laplacian filter, the zero cross position Z can be obtained by a unit of pixel or less. The luminance value Y is calculated by the following arithmetic expression assuming the gradation values of the respective RGB are r, g and b.

$$Y = 0.30r + 0.59g + 0.11b \quad (5)$$

In order to increase the processing speed, the average value (arithmetic average, etc.) of the gradation values of the respective RGB may be set as the luminance value Y.

Then, while the intended pixel is sequentially moved on the matrix-like pixels corresponding to the intermediate data D5, edge position information D6 that expresses a position at which the intermediate data is set to substantially zero, that is, the zero cross position Z is acquired on the basis of the positions of the intended pixel and the pixels that are positioned in proximity to the intended pixel, and the intermediate data. The zero cross position Z is a coordinate value that represents the position of the edge corresponding to the position of each pixel of the unenlarged image by a unit smaller than the pixels of the unenlarged image when the pixel of the unenlarged image is located on an xy plane.

Subsequently, while the intended pixel section is sequentially moved on the enlarged image I2 for each of pixel sections I2d (3×3 pixels in the drawing) obtained by sectionalizing the pixel I2u of the enlarged image I2 in correspondence with the pixels of the unenlarged image, enlarged edge position information D7 that expresses the position of the edge of the intended pixel section is acquired. That is, it is calculated that the zero cross position Z corresponds to which pixel of the enlarge image, and the position thus calculated is set as the zero cross position of the enlarged image (enlarged edge position information D7). The enlarged edge position information D7 is a coordinate value that expresses the position of the edge corresponding to the position of each pixel I2u of the enlarged image by the pixel I2u unit of the enlarged image when the pixel I2u of the enlarged image is located on the xy plane.

A direction determining unit (direction determining processor) U42 determines the direction of the intended edge from the gradation data of the plural pixels within a predetermined area (a predetermined region) including the position of the intended edge (intended edge N3 on the enlarged image I2) which determines the direction among the gradation data of the respective pixels on the unenlarged image. More specifically, first, the gradation data of the 3×3 pixels (plural pixels within the predetermined area R3) that are centered on the intended pixel is binarized to generate binary data D8 while the intended pixel is sequentially moved on the unenlarged image. Subsequently, the direction of the edge is determined according to the binary data D8 and predetermined plural matching patterns 14d of 3×3 patterns corresponding to the directions of the edge.

The position correcting unit (position correcting processor) U43 can correct the position of the intended edge N3 to a position that brings directions which connect a position of the intended edge N3 and the positions of the edges N4 and N5 that are in proximity to the intended edge N3 closer to the determined direction of the intended edge N3 on the enlarged image I2. The example of FIG. 9 shows that the 3×3 pixels within the predetermined area including the intended edge N3 are matched (identical) with the matching pattern of "30-10 filter", and shows that the direction of the edge N3 is determined to be 30° diagonally right down.

As shown in FIG. 10, it is assumed that the determined inclination of the intended edge N3 is sl0, an inclination of a line 1 that connects the position of the intended edge N3 and the position of the adjacent connecting edge N4 that is in proximity to the edge N3 is sl1, an inclination of a line 2 that connects the position of the intended edge N3 and the position of the adjacent connected edge N5 that is in proximity to the edge N3 is sl2, and an inclination of a line 3 that connects the positions of the intended edges N4 and N5 to each other is sl3 on the enlarged image I2. There is a case in which the inclination sl3 of the direction that connects the positions of the adjacent edges to each other is closer to the inclination sl0 of the intended edge than the inclination sl1 of the direction that connects the position of the intended edge and the position of the adjacent edge N4. Also, there is another case in which the inclination sl3 is close to the inclination sl0 of the intended edge than the inclination sl2 of the direction that connects the position of the intended edge and the position of the adjacent edge N5. In those cases, the position of the intended edge is corrected to the line 3 that connects the positions of the adjacent edges to each other. As a result, the position of the intended edge N3 is so corrected as to bring the directions that connect the position of the intended edge N3 and the positions of the adjacent edges N4, N5 closer to the determined direction of the intended edge N3. The example of FIG. 9 shows that the position of the intended edge N3 has moved to the position of the intended edge N6 which has been corrected.

Since the precision in the edge position can be improved as described above, it is possible that the edge of the enlarged image is formed with high precision and with a thin line to facilitate sharpening or the like.

The edge generating unit (edge generating processor) U44 generates edge information D11 that expresses the edge area of the enlarged image I2 in correspondence with the positions of the respective pixels I2u of the enlarged image I2 by using corrected edge position information D9 that expresses the corrected position of the edge. More specifically, there is first acquired connection position information D10 that connects the adjacent edges of the enlarged image I2 to each other so as to be toward the determined direction of the edge. The connection position information D10 expresses the position of the pixel which is the area of the edge in the enlarged image. Only appropriate directions can be connected according to the pattern matching result at the time of connection by using the matching pattern, and the edge in the enlarged edge image can be acquired with a high precise thin line. Then, the edge information D11 is generated by combining the corrected edge position information D9 and the connection position information D10. The edge information D11 is assembly of coordinate values that express the areas of edges in correspondence with the positions of the respective pixels I2u of the enlarged image by the pixel I2u unit of the enlarged image.

After the edge information generating process, there is conducted an interpolating process that interpolates the intended pixel to generate the image data D12 consisting of the gradation data which has been interpolated, by using the image data of the plural pixels in the uninterpolated image which are positioned in proximity to the intended pixel to be interpolated on the enlarged image, which will be described in more detail later (S50). Thereafter, an edge sharpening process is conducted by the edge sharpening processor U6 that is a part of the sharpening processor (S60), a sharpened image synthesizing process is conducted by a sharpened image synthesizing processor U7 (S70), and the flow is completed, which will be described in more detail later.

Figure 12:
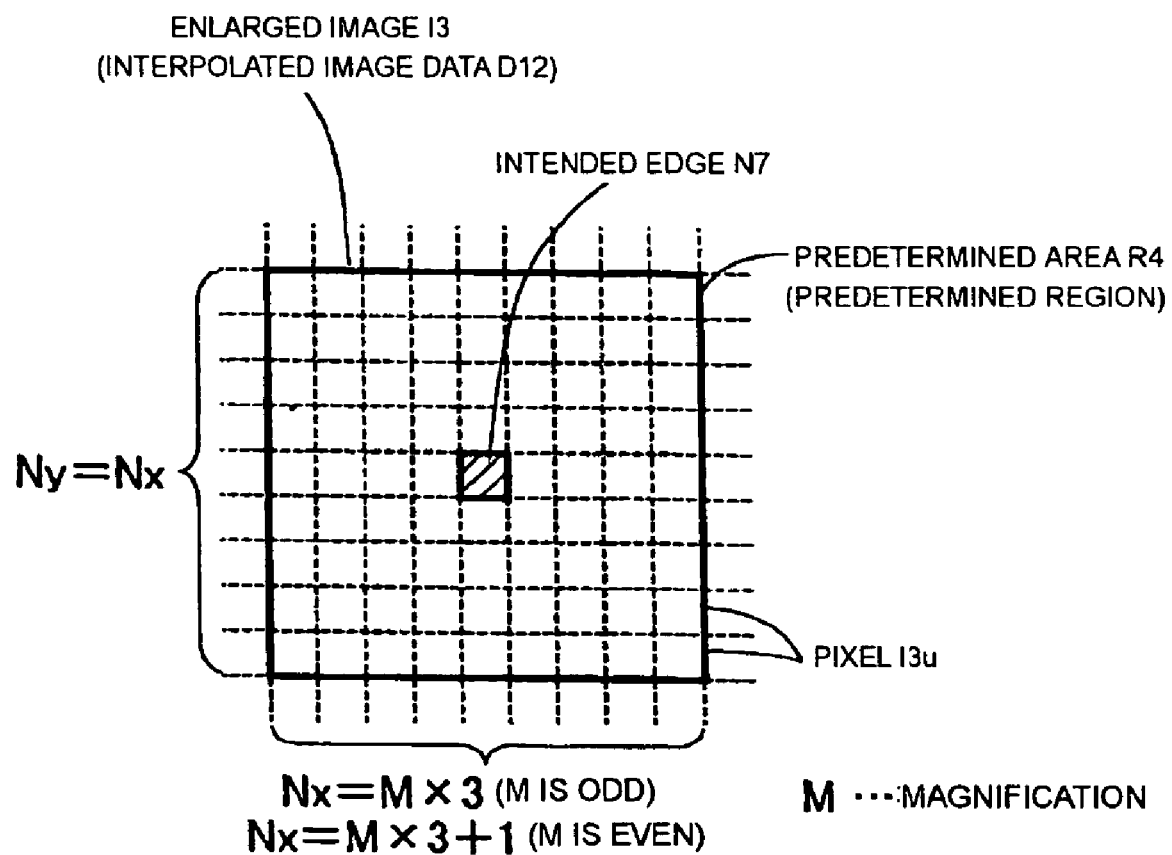
FIG. 12 is a schematic diagram showing a region that is sharpened on an enlarged image I3.
Figure 13:
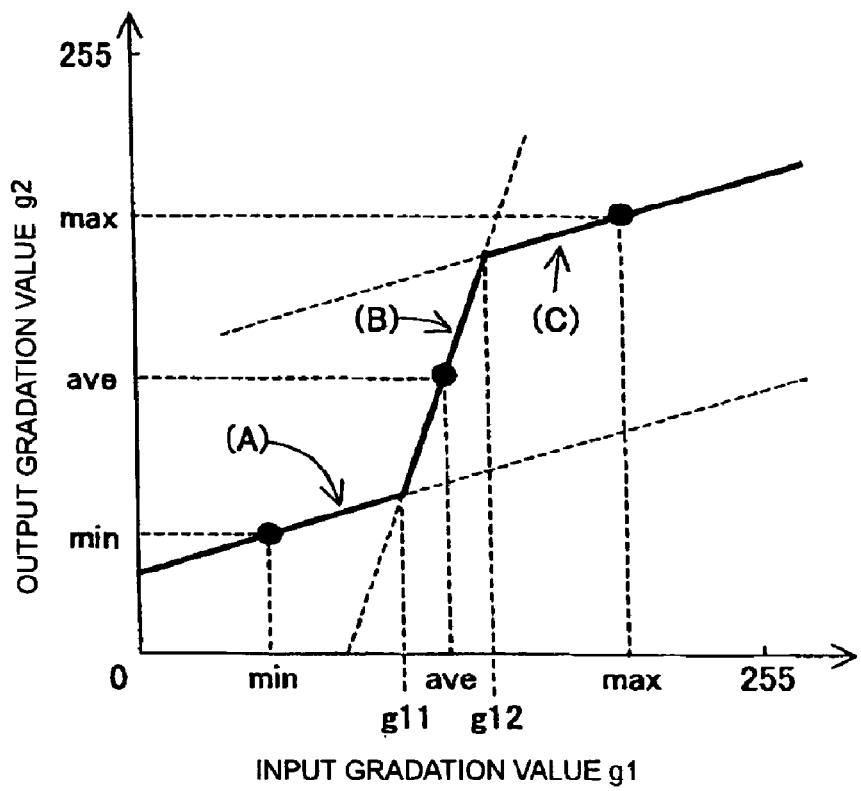
FIG. 13 is a schematic diagram showing a process that is conducted by an edge sharpening processor U6.

FIG. 12 is a schematic diagram showing a region that is sharpened on an enlarged image I3 by the edge sharpening processor U6. FIG. 13 is a schematic diagram showing a process that is conducted by the edge sharpening processor U6. The above set value determining unit U1 acquires inclination values a1 and a2 (0<a1<1<a2) corresponding to the number of pixels Nxy of the unenlarged image from the operation setting data 14a shown in FIG. 5.

It is assumed that, in the interpolated gradation data of the respective pixels I3u on the enlarged image I3, the gradation value of each pixel I3u within the predetermined area (predetermined region) R4 including the position of the intended edge N7 to be sharpened is g1 (each of RGB), the gradation value that has been subjected to sharpening operation is g2 (each of RGB), the minimum of luminance values Y (gradation values) of the plural pixels within the predetermined area R4 is min, the maximum thereof is max, and an average value (arithmetic average) thereof is ave. Then, the edge sharpening processor U6 conducts the sharpening process that sharpens the gradation data of the plural pixels within the predetermined area R4 at a degree corresponding to the number of pixels of the unenlarged image (uninterpolated image) by using the following arithmetic expression.

(A) When g1 is equal to or smaller than g11, $$g2=a1 \times g1+(1-a1) \times min$$

(B) When g1 is equal to or larger than g11, and g1 is equal to or smaller than g12, $$g2=a2 \times g1+(1-a2) \times ave$$

(C) When g1 is equal to or larger than g12, $$g2=a1 \times g1+(1-a1) \times max \qquad (6)$$

where $g11=[(1-a1) \times min-(1-a2) \times ave]/(a2-a1)]$ $g12=[(1-a1) \times max-(1-a2) \times ave]/(a2-a1)]$ The luminance value Y is a gradation value obtained from the gradation values r, g and b of the respective RGB by using the above arithmetic expression (5), but may be an average value of r, g and b. In this example, min, max and ave may be gradation values for each of RGB, or g1 and g2 may be luminance values Y. The image data consisting of the gradation values g2 of the respective RGB in each of the pixels within the predetermined area R4 becomes image data D13 that has been subjected to sharpening operation. As shown in FIG. 13, the above arithmetic expression (6) has g2=g1 when g1=min, ave, max. The arithmetic expression has a gentle inclination (inclination value a1<1 and a1>0) in the vicinity of g1=min and in the vicinity of g1=max, and a steep inclination (inclination value a2>1) in the vicinity of g1=ave.

As a result, the image data can be sharpened at the degree corresponding to the number of pixels of the uninterpolated image, and the image that has been processed can be further improved. Also, because the above arithmetic expression (6) is the assembly of primary expressions, there is useful in that a processing speed can be improved as compared with a case that conducts tone curve correction or γ-correction. In addition, since the above arithmetic expression (6) uses the average value ave of the gradation values of the plural pixels within the predetermined area R4 as an output gradation value as it is, the more appropriate sharpening process can be conducted according to the circumstances of the gradation values of the respective edges.

The predetermined area R4 to be sharpened has a region in which both of the number of pixels Nx in a horizontal direction (x-direction) and the number of pixels Ny in a vertical direction (y-direction) are M×3 with the pixel including the intended edge N7 on the enlarged image I3 as the center when the magnification M is odd. On the other hand, the predetermined area R4 to be sharpened has a region in which both of Nx and Ny are M×3+1 when the magnification M is even.

Figure 14:
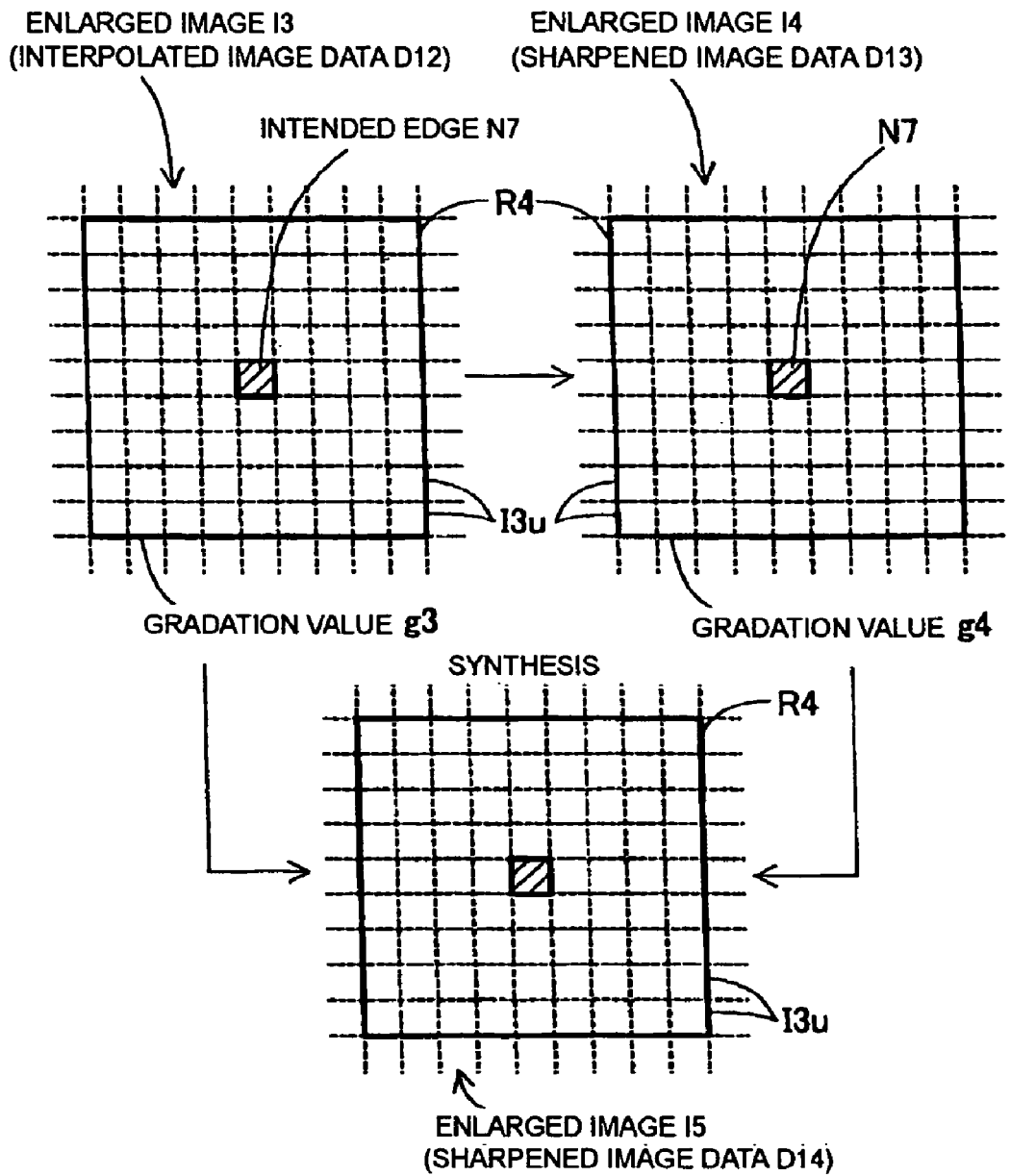
FIG. 14 is a schematic diagram showing a region that is sharpened by a sharpened image synthesizing processor.

FIG. 14 is a schematic diagram showing a region that is sharpened on the enlarged image by the sharpened image synthesizing processor U7. The above set value determining unit U1 acquires a synthesis ratio A3 (% unit, 0≦A3≦100) corresponding to the number of pixels Nxy of the unenlarged image from the operation setting data 14a shown in FIG. 5. The sharpened image synthesizing processor U7 conducts predetermined arithmetic operation that sharpens the gradation data of the plural pixels within the predetermined region R4 and obtains the gradation data that has been subjected to the arithmetic operation to generate the image data D4 (which expresses the enlarged image I4) which has been subjected to sharpening arithmetic operation. Also, the sharpened image synthesizing processor U7 obtains the sharpened gradation data through the following arithmetic expression to finally generate sharpened image data D14 (which expresses the enlarged image I5), and ends the image processing.

$$g5 = a3 \times g4 + (1-a3) \times g3 \qquad (7)$$

where the gradation value of each pixel 13u within the predetermined region R4 is g3, the gradation value that has been subjected to sharpening operation is g4, the sharpened gradation value is g5, and a coefficient corresponding to the number of pixels of the unenlarged image (uninterpolated image) is a3 (=A3/100, $0 \leq a3 \leq 1$)

In this example, the gradation values g3, g4 and g5 are luminance values Y, but may be the gradations r, g and b for each of RGB. The image data D14 results from synthesizing the gradation data that has not yet been sharpened and the gradation data that has been sharpened at a rate corresponding to the number of pixels of the uninterpolated image with respect to the plural pixels within the predetermined region.

The gradation data of the plural pixels within the predetermined region including the position of the intended edge is sharpened at the degree corresponding to the number of pixels of the uninterpolated image, and the gradation data of the plural pixels is subjected to the appropriate sharpening process. As a result, a more excellent sharpening result of the edge portion is obtained. Accordingly, the image that has been processed can be further enhanced in the quality.

(3) Details of Processing that is Conducted by the Edge Generating Device and the Image Processor Hereinafter, processing that is conducted by the present device as well as the operation will be described in more detail.

When the flow of FIG. 3 starts, various parameters corresponding to the number of pixels Nxy of the unenlarged image is acquired from the operation setting data 14a (FIG. 5).

(3-1) Feature-by-Feature Filtering Process (S20 in FIG. 3)

Figure 15:
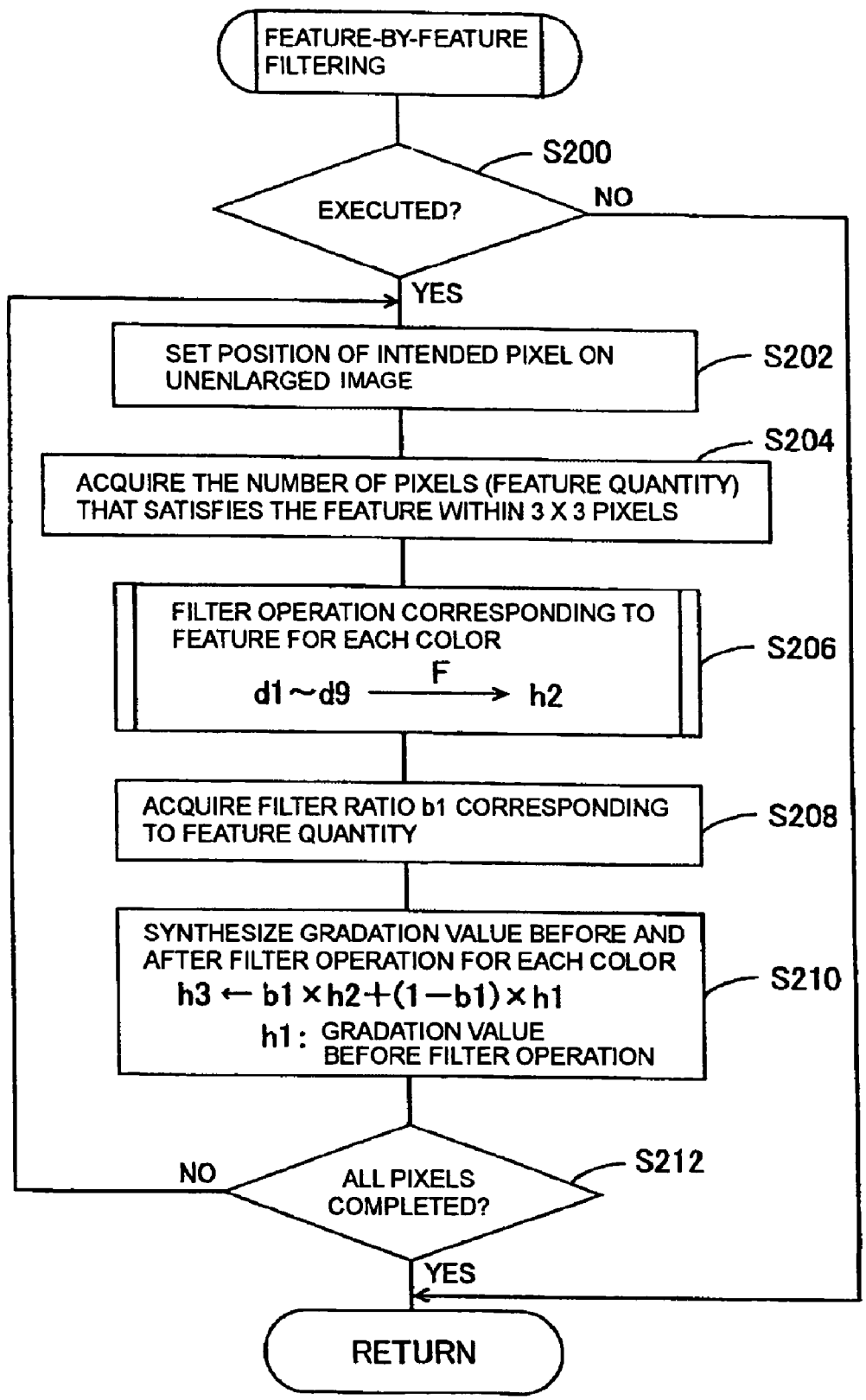
FIG. 15 is a flowchart showing a feature-by-feature filtering process.

When a flow of FIG. 15 starts, processing of S200 to S204 is conducted by the feature quantity acquiring unit U21. Hereinafter, a description will be given with reference to FIGS. 5 to 8. An execution parameter p1 is acquired from the operation setting data 14a through the above set value determining process. If no p1 exists, the flow is completed, and if p1 exists, the processing is advanced to S202 (S200). That is, the substantially feature-by-feature filtering process is conducted only when the number of pixels Nxy of the unenlarged image I1 is equal to or larger than the predetermined threshold value (100,000 pixels in this embodiment). Because an improvement in the image quality by conducting another processing on the feature area of the image is not visible when the number of pixels of the unenlarged image is small, the image processing speed can be increased while the quality of the image is substantially maintained.

In S202, the position of the intended pixel N1 is set on the unenlarged image I1. The order of setting the position of the intended pixel starts from a pixel at upper left toward a pixel at upper right sequentially. Thereafter, the setting order sequentially continues from a pixel at a left end toward a pixel at a right end downwardly column by column, and ends a pixel at lower right. Hereinafter, the same is applied to a case of setting the position of the intended pixel during various processing. The order of setting the position of the intended pixel may be appropriately changeable.

Subsequently, the number of pixels (feature quantity) NC1 that meets the feature among 3×3 pixels within the predetermined area R1 including the intended pixel is acquired from the gradation data of 3×3 pixels (S204). The feature quantity is the amount of pixels within a predetermined color area, and the number of pixels that meet both of the relational expressions (2) and (3) in the above-mentioned fresh color area.

Thereafter, the filter unit U22 acquires information on a filter corresponding to the color area from the above feature-by-feature filter data 14b. Then, the filter unit U22 conducts predetermined filtering arithmetic operation with respect to the gradation data of 3×3 pixels within the predetermined area R2 including the intended pixel N1 for each color of RGB according to the information on the filter corresponding to the color area. Thus, the filter unit U22 obtains the filtered gradation data with respect to the intended pixel N1 (S206).

Figure 16:
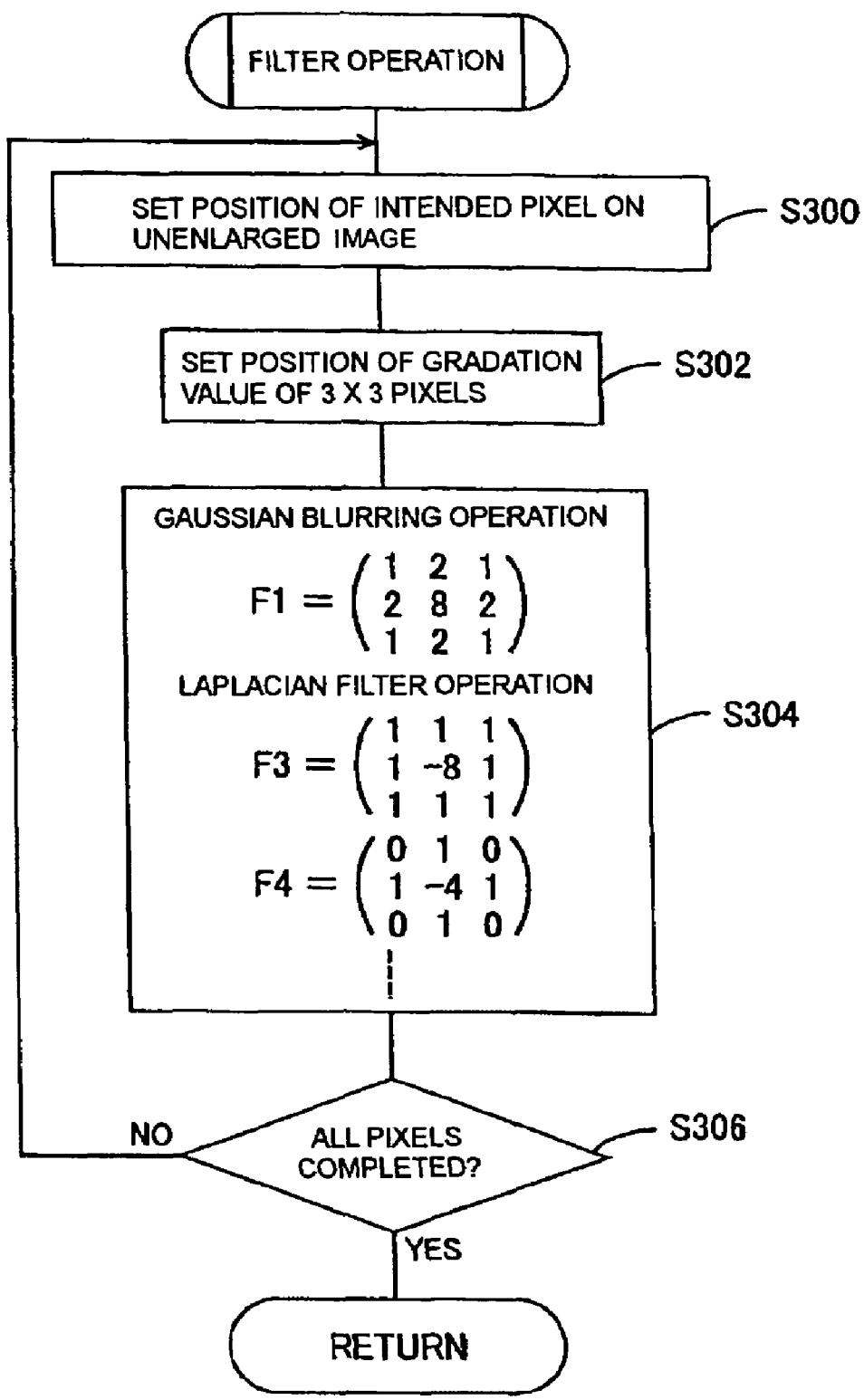
FIG. 16 is a flowchart showing filtering arithmetic processing.

The process of S206 is conducted according to a flow of FIG. 16. The position of the intended pixel is first set on the unenlarged image I1 (S300). The intended pixel N1 that has been set in S202 may be set as the intended pixel in S300 as it is. In this case, the flow is completed without conducting a judging process in S306. Then, the gradation values r, g and b of 3×3 pixels consisting of the intended pixel and pixels in the predetermined area R2 which are positioned in proximity to the intended pixel are acquired (S302). It is assumed that the gradation values of 3×3 pixels in any one of rgb are d1 to d9 in the order of upper left to upper right, middle left to middle right, and lower left to lower right. In this case, the gradation value of the intended pixel is d5, and the gradation values of 8 pixels that are positioned in proximity to the intended pixel are d1 to d4 and d6 to d9. In the case where the intended pixel is located at an end portion of the unenlarged image, the gradation values are acquired assuming that the gradation value of the pixel at the end portion of the unenlarged image is outside of the unenlarged image (folded) The same is applied to the following example.

The filtering operation is conducted by using a filter F corresponding to each of the color areas (S304). In the case where the color area is a fresh color area, the Gaussian blurring operation is conducted by using a known Gaussian blurring operation filter F1 shown in the figure. In this example, the operation filter F for conducting the filter operation has coefficients f1 to f9 corresponding to the respective 3×3 pixels for reference. The operation filter F obtains a total resulting from multiplying the respective gradation values d1 to d9 corresponding to the respective pixels by the above coefficients, and calculates a gradation value d' of the intended pixel which has been subjected to filtering operation. In fact, the gradation value d' that has been subjected to the filtering operation is obtained by multiplying the total by a predetermined coefficient (k in this example) as represented by the following expression.

$$d' = k \Sigma f i \cdot di \qquad (8)$$

In the case of a filter in which the total $\Sigma fi$ of the coefficients f1 to f9 becomes 0 as with the Laplacian filter which will be described later, k=1 is set. In the case of a filter in which the total $\Sigma fi$ of the coefficients f1 to f9 becomes 0 as with the Gaussian blurring filter F1, k=1/$\Sigma fi$ is set.

Thereafter, it is judged whether the filtering operation has been conducted on all of the pixels of the unenlarged image, or not (S306). If the conditions are not satisfied, the processing of S300 to S306 is repeated, and if the conditions are satisfied, the flow is completed.

Thereafter, the synthesizing unit U23 conducts the processing of S208 to S212. Information on the filter ratio B1 (%) obtained by multiplying a value, which results from dividing the feature quantity NC1 by the number of pixels NR1 of the predetermined area R1, by a predetermined ratio 70% in the fresh color area is stored in association with the filter synthesis setting data 14c. In the case where the color area is the fresh color area, the filter ratio B1 corresponding to the fresh color area is acquired, and the filter ratio b1 (b1(=B1/100) corresponding to the feature quantity NC1 is acquired (S208).

Then, the gradation values h1 and h2 of the intended pixel N1 before and after the filter processing is conducted are synthesized into a corrected gradation value h3 by using the above arithmetic expression (4) for each color of RGB, and the image data D3 consisting of the gradation values h3 for all of RGB is generated (S210). Then, it is judged whether the corrected gradation data has been generated with respect to all of the pixels of the unenlarged image I1, or not (S212). If the conditions are not satisfied, the processing of S202 to S212 is repeated, and if the conditions are satisfied, the flow is completed.

The above processing makes it possible to conduct the filtering process such as smoothing on a specific feature such as the fresh color. In this example, since an adaptive filtering process is conducted, it is possible to conduct appropriate processing such as smoothing or noise removal for each place of the image. In this way, since the appropriate processing is conducted on the feature area in the image, the feature area can be more excellently expressed while the image quality of portions other than the feature area is maintained. As a result, the image that has been processed can be enhanced in the quality.

(3-2) Smoothing Process (S30 in FIG. 3)

Processing of S30 is conducted according to a flow in FIG. 16. The position of the intended pixel is first set on the unenlarged image that is expressed by the corrected image data D3 (S300). Then, the gradation values r, g and b of 3×3 pixels consisting of the intended pixel and pixels in the predetermined area which are positioned in proximity to the intended pixel are acquired (S302). Thereafter, the Gaussian blurring operation is conducted by means of a known Gaussian blurring operation filter F1 shown in the figure (S304). Then, it is judged whether the Gaussian blurring operation has been conducted on all of the pixels of the unenlarged image, or not (S306). If the conditions are not satisfied, the processing of S300 to S306 is repeated, and if the conditions are satisfied, the flow is completed. As a result, the corrected image data D3 is converted into the smoothed image data D4. It is possible to generate the edge information even if the Gaussian blurring process is not conducted. However, since noises are removed by conducting the Gaussian blurring process, a precision in the edge position is improved, and the information representative of the position of the more smoothed edge can be generated.

(3-3) Edge Information Generating Process (S40 in FIG. 3)

Figure 17:
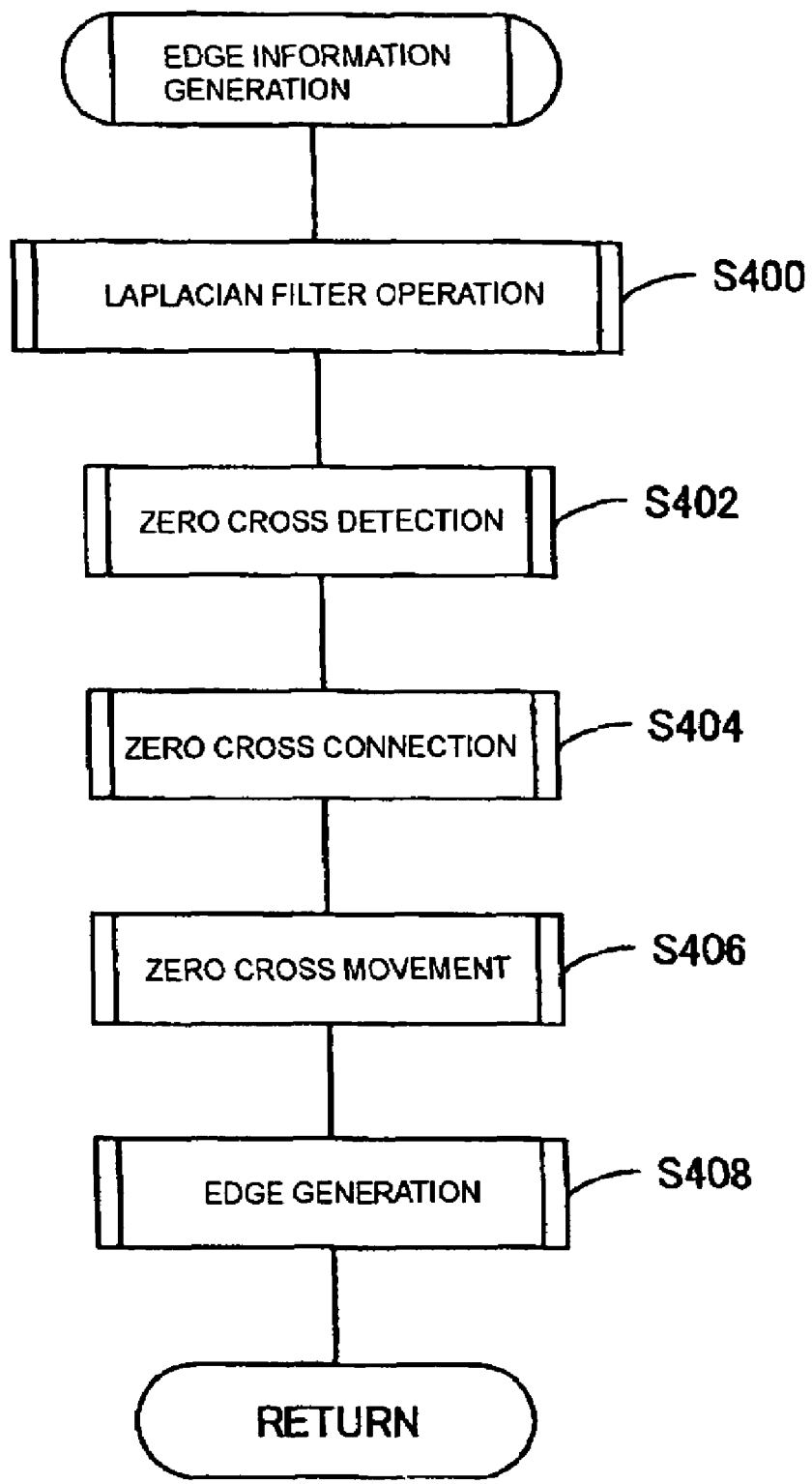
FIG. 17 is a flowchart showing an edge information generating process.

When a flow of FIG. 17 starts, a Laplacian filter operation process (S400) and a zero cross detecting process (S402) are conducted by the enlarged position acquiring unit U41, and a zero cross connecting process (S404) is conducted by a direction determining unit U42. A zero cross moving process (S406) is conducted by a position correcting unit U43 (S406), an edge generating process (S408) is conducted by an edge generating unit U44, and then the flow is completed. Hereinafter, a description will be given with reference to FIGS. 9 to 11.

(3-3-1) Laplacian Filter Operation Process (S400 in FIG. 17)

Processing of S400 is conducted according to the flow of FIG. 16. The position of the intended pixel is first set on the unenlarged image that is expressed in gradation by the smoothed image data D4 (S300). Then, the luminance values d1 to d9 of 3×3 pixels consisting of the intended pixel and pixels in the predetermined area (predetermined region) which are positioned in proximity to the intended pixel are acquired (S302). The predetermined area may be identical with the above-mentioned predetermined areas R1 and R2, or may be different from the predetermined areas R1 and R2. the luminance value Y is obtained from the gradation values r, g and b in each of RGB by using the above arithmetic expression (5).

Subsequently, the filtering operation is conducted by means of the differential filter to generate intermediate data (D5) that is expressed in gradation by dot-matrix like pixels (S304). In this embodiment, a known 8-directional Laplacian filter F3 shown in the figure is used as the differential filter. The Laplacian filter F3 can be replaced by a known 4-directional Laplacian filter F4 shown in FIG. 16, Laplacian filters having opposite signs of the positive or negative sign of the filters F3 and F4, a primary space differential filter or a non-linear differential filter. Among those filters, the use of the 8-directional Laplacian filter makes it possible to acquire the position of the edge with very high precision, and to remarkably enhance the quality of the processed image.

All of the coefficients f1 to f4 and f6 to f9 around the coefficient f5 of the filter F3 corresponding to the intended pixel are set to 1, and the centered coefficient f5 is set to −8 that results from inverting the sign of the total of the coefficients f1 to f4 and f6 to f9. That is, with the filtering operation using the filter F3, the total of differences between the luminance values of the pixels around the intended pixel and the luminance value of the intended pixel is calculated into the gradation data d' that has been subjected to the Laplacian filtering operation as represented by the following expression.

$$d' = \Sigma(di - d5) \quad (9)$$

where i=1 to 4 and 6 to 9.

Then, it is judged whether the Laplacian filtering operation has been conducted on all of the pixels of the unenlarged image that has been smoothed, or not (S306). If the conditions are not satisfied, the processing of S300 to S306 is repeated, and if the conditions are satisfied, the flow is completed. As a result, operation using the predetermined differential filter is conducted on the gradation data of the plural pixels within the predetermined region including the intended pixel, thereby making it possible to generate the intermediate data D5. Since the position of the edge is detected by conducting the Laplacian filtering operation process, information representative of the position of the edge can be acquired with a simple structure and with high precision. Also, the edge information representative of the edge area of the enlarged image can be generated with high precision.

(3-3-2) Zero Cross Detecting Process (S402 in FIG. 17)

Figure 18:
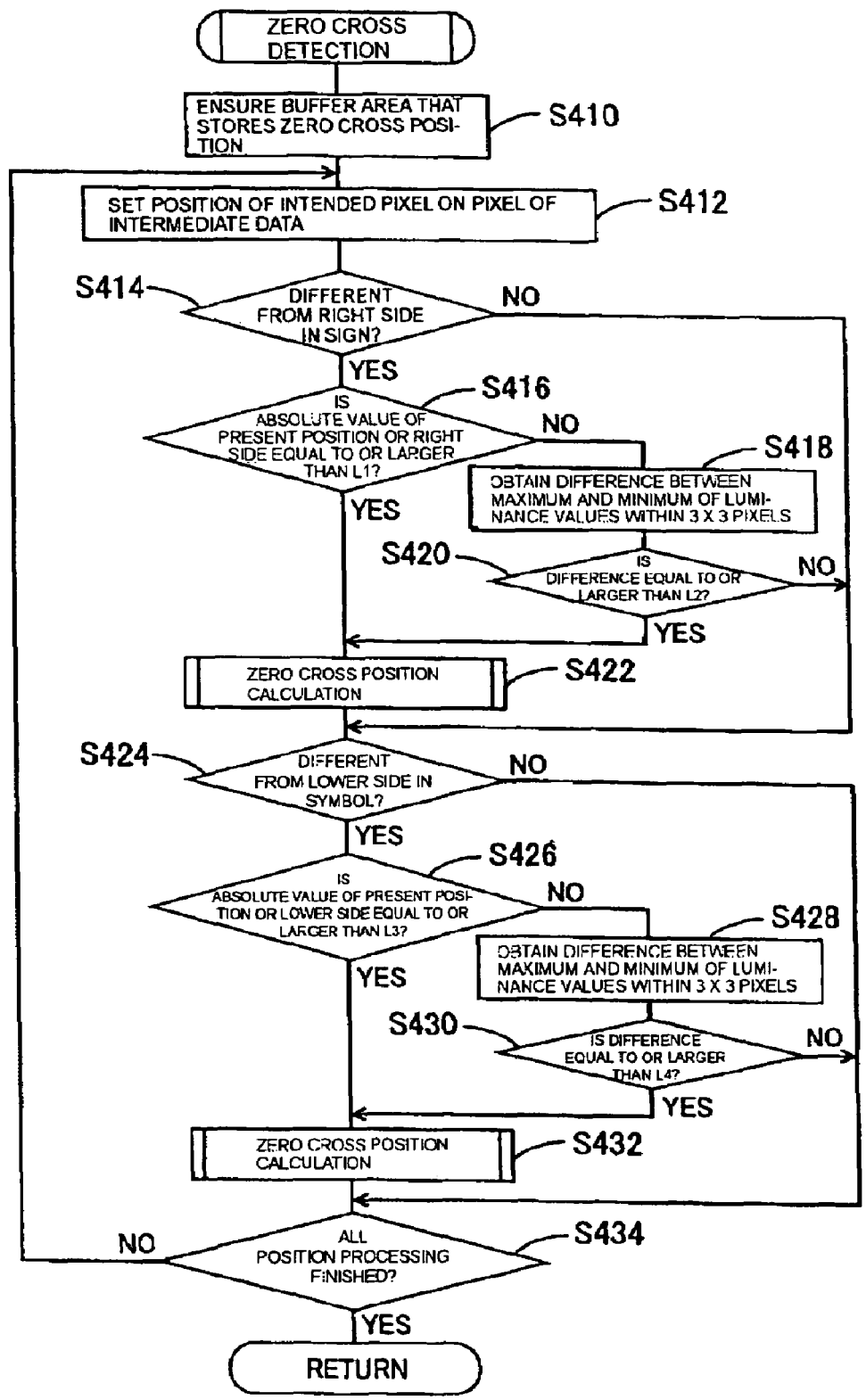
FIG. 18 is a flowchart showing a zero cross detecting process.

When processing of FIG. 18 starts, a buffer area in which the zero cross position Z is stored is ensured in a RAM (S410). Then, the position of the intended pixel is set on the dot-matrix like pixels in correspondence with the generated intermediate data D5 (S412). Then, it is judged whether the intermediate data of the intended pixel is different in symbol from the intermediate data of a pixel (right side pixel) that is at the right side (in the vicinity) of the intended pixel, or not (S414) If the symbol is not different, because zero cross hardly exists between the intended pixel and the right side pixel, the processing is advanced up to S424. If the symbol is different, in order to judge whether the zero cross position should be calculated, or not, it is judged whether at least one of the absolute value of the intermediate data of the intended pixel that is at the present position and the absolute value of the intermediate data of the right side pixel is equal to or larger (or larger than) than a predetermined threshold value L1, or not (S416). When the luminance value of the unenlarged image is 256 gradations, the gradation values of the intermediate data is also 256 gradations, and the threshold value L1 may be set to, for example, 128 classes which is a substantially intermediate value of the 256 gradations. If the conditions are satisfied, the processing is advanced to S422, and the zero cross position calculating process is conducted. The edge exists mainly when a difference in the luminance value between both of the elements is large, and the symbols of the intermediate data are different. Therefore, information representative of the position of the edge can be acquired with high precision, as a result of which information representative of the edge area of the enlarged image can be generated with high precision.

If the conditions are not satisfied, in order to judge whether the zero cross position should be further calculated, or not, there is obtained a difference between the maximum and minimum of the luminance values of 3×3 pixels within the predetermined area (predetermined region) centered on the intended pixel on the unenlarged image that has been subjected to the Gaussian blurring process (S418). Then, it is judged whether the difference thus obtained is equal to or larger than a predetermined threshold value L2 (or larger than), or not (S420). When the luminance value of the unenlarged image that has been subjected to the Gaussian blurring process is 256 gradations, the threshold value L2 may be set to, for example, 50 classes. If the conditions are satisfied, the processing is advanced to S422, and the zero cross position calculating process is conducted. There is a case in which the zero cross cannot be detected in S416 as a result of conducting the Laplacian filtering operation process because the difference in the luminance value between the intended pixel and the right side pixel is small. Even in this case, since the difference in the luminance value of 3×3 pixels centered on the intended pixel may be large, a precision in the detection of the zero cross can be improved. That is, information representative of the position of the edge can be acquired with high precision, and information representative of the edge area of the enlarged image can be generated with high precision. On the other hand, if the conditions are not satisfied, the processing is advanced to S424.

Figure 19:
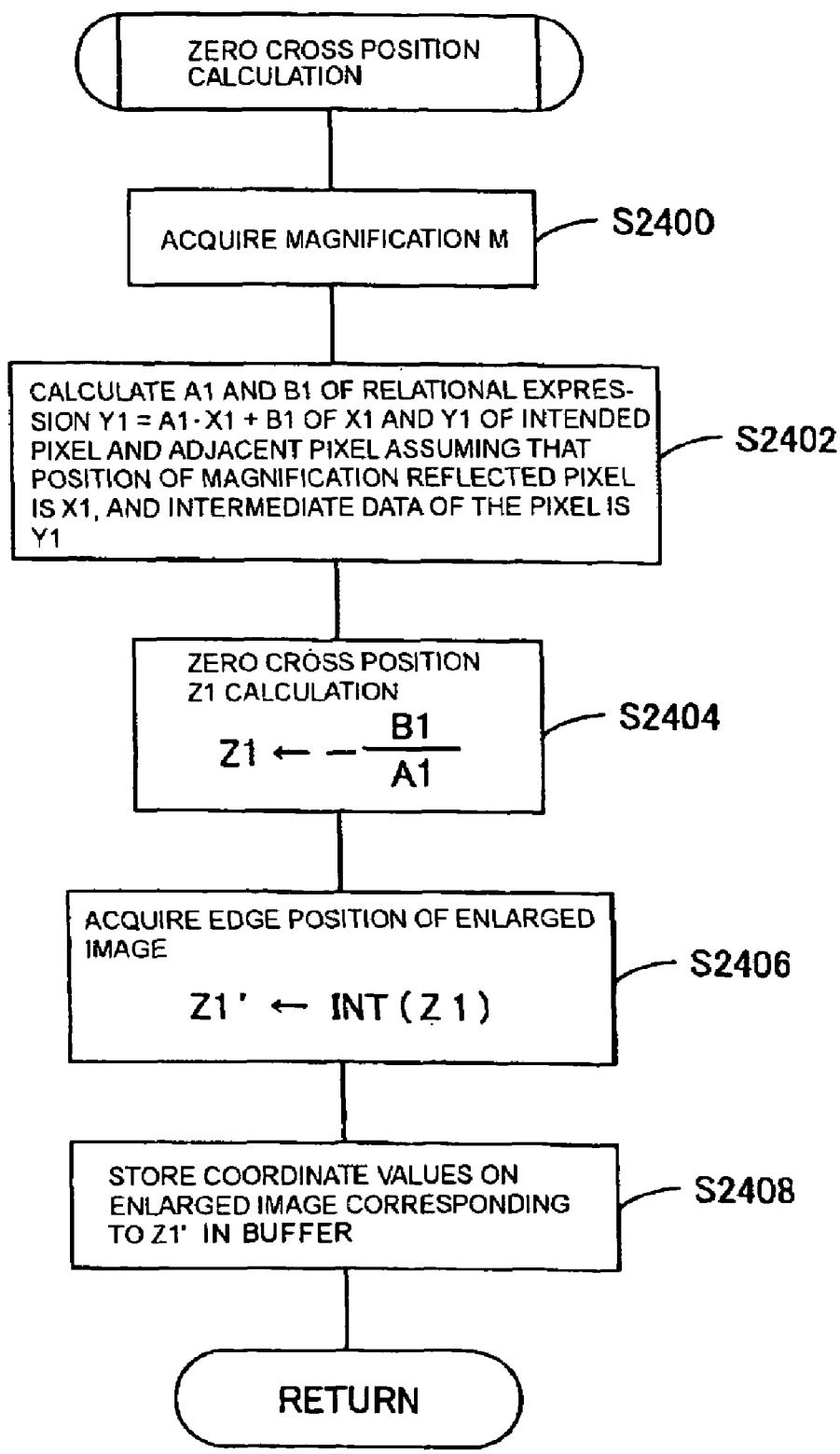
FIG. 19 is a flowchart showing a zero cross position calculating process of S422 and S432.

As shown in FIG. 19, a magnification M from the unenlarged image to the enlarged image is first acquired in the zero cross position calculating process (S2400). For example, a parameter representative of the magnification of an image may be acquired from the operation input to a resolution select section that is displayed on a display and stored in a RAM. The magnification M means that the number of pixels in the horizontal direction (x-direction) increases to M times, and the number of pixels in the vertical direction (y-direction) also increases to M times. Otherwise, it is possible that Mx and My are acquired as the magnification, the number of pixels in the horizontal direction increases to Mx times, and the number of pixels in the vertical direction increases to My times. Then, when it is assumed that the position of the pixel after enlargement is X1, and the intermediate data of the pixel is Y1, A1 and B1 of a relational expression Y1=A1·X1+B1 of X1 and Y1 of the intended pixel and the adjacent pixel (right side pixel in the case where this process is conducted in S422) are calculated (S2402). In this example, the position X1 of the pixel is x coordinate in the horizontal direction on the enlarged image in the case of obtaining the expression of a line with respect to two points of the intended pixel and the right side pixel. The position X1 is y coordinate in the vertical direction on the enlarged image in the case of obtaining the expression of a line with respect to two points of the intended pixel and the lower side pixel. When the intermediate data of the intended pixel is LP0, the intermediate data of the adjacent pixel is LP1, and the position of the intended pixel on the unenlarged image is x0, A1 and B1 can be calculated through the following expressions.

$$A1=(LP1-LP0)/M \tag{10}$$

$$B1=LP0-A1\times(x0\times M+M/2) \tag{11}$$

In addition, the zero cross position Z1 on the enlarged image is calculated through the following expression (S2404).

$$Z1=-B1/A1 \tag{12}$$

In this example, Z1 is a value having information of a fractional part and a unit smaller than the pixel of the unenlarged image. Then, since Z1 is a value obtained by multiplying the position of the pixel of the unenlarged image by the magnification M, the zero cross position Z1 is edge position information representative of the position of the edge corresponding to the position of each pixel of the unenlarged image.

Thereafter, the position Z1' of the edge of the enlarged image (a sort of the enlarged edge position information) corresponding to the position of the edge of the unenlarged image is acquired on the basis of the zero cross position Z1 (S2406). The position Z1' can be calculated from the following expression.

$$Z1'=INT(Z1) \tag{13}$$

where INT is a function that truncates the fractional part.

That is, Z1' is numeric information representative of the position of the edge of the enlarged image by the pixel unit of the enlarged image.

Figure 20:
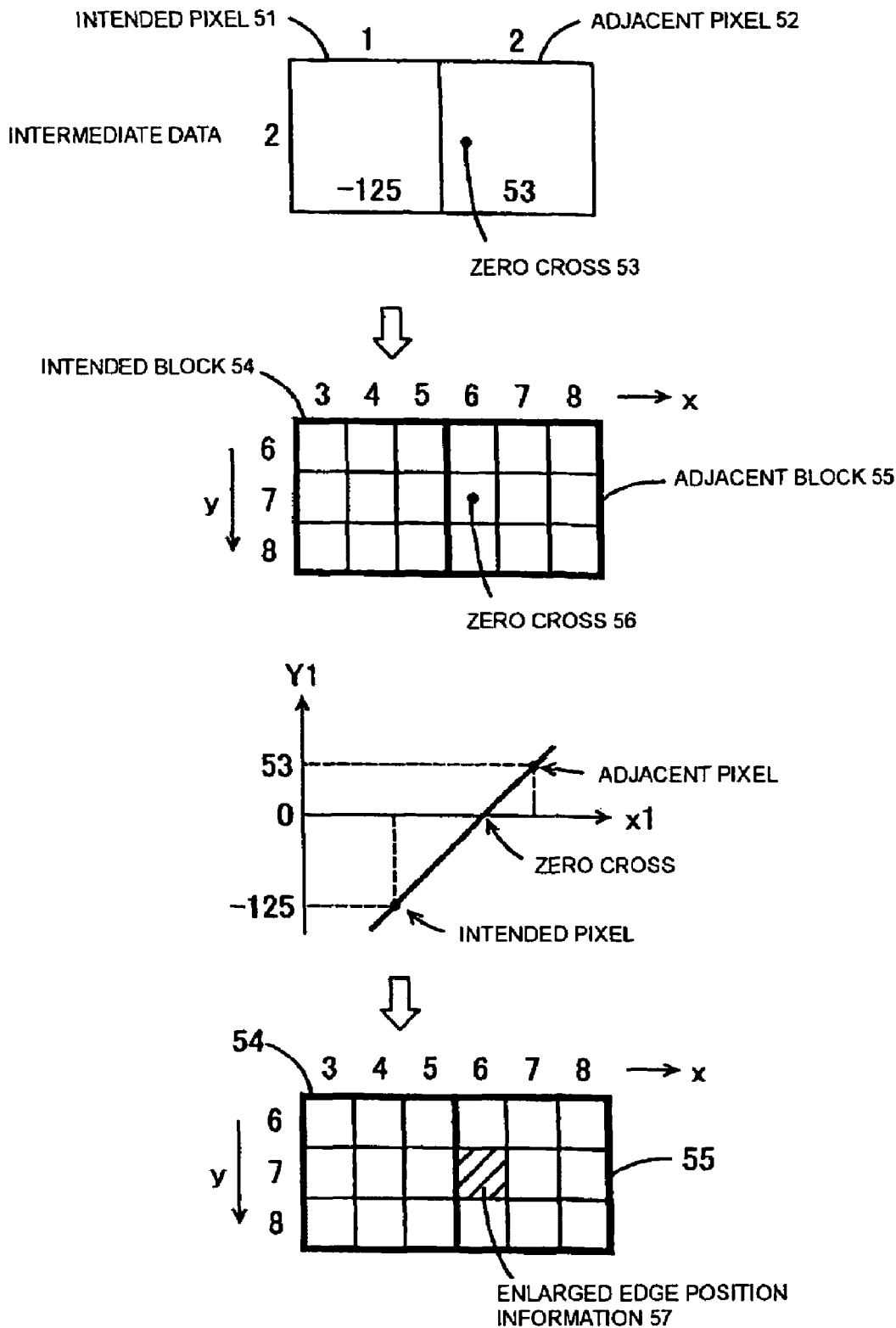
FIG. 20 is a schematic diagram showing a condition in which enlarged edge position information is acquired.

In an example of FIG. 20, an intended pixel 51 of intermediate data LP0=−125 exists at x=1 and Y=2 of the unenlarged image, and an adjacent pixel 52 of intermediate data LP1=53 exists at x=2 and Y=2 which is at a right side of the intended pixel. In this example, where the zero cross 56 exists in the blocks 54 and 55 that sectionalizes the pixels of the enlarged image in correspondence with the pixels of the unenlarged image is obtained through the above expressions (10) to (12). It is assumed that the intended block 54 and the adjacent block 55 exist in correspondence with the pixels 51 and 52 of the unenlarged image.

As shown in an X1–Y1 graph at the lower side of the middle columns, there is a line that connects the intended pixel and the adjacent pixel on an X1 (x-coordinate or y-coordinate of the pixel) –Y1 (intermediate data) plane. Then, a point (a point of Y1=0) at which the line crosses an X1 axis is the zero cross. In the above example, the zero cross position is Z1=6.6. Finally, Z1'=INT (6.6)=6 is met by using the above expression (7). Accordingly, the enlarged edge position information 57 represents the position of the pixel of x=6 and y=7 which is to the left within the adjacent block 55.

As described above, the enlarged edge position information represents the position of the pixel by the pixel unit smaller than the block of the enlarged image. Therefore, a precision in the edge position of the enlarged image is improved, and the jaggy of the edge of the enlarged image is not visible.

After processing of S2406, the coordinate values (a sort of the enlarged edge position information) of the edge on the enlarged image corresponding to the position Z1' of the edge of the enlarged image are stored in a buffer in order (S2408), and the flow is completed. The coordinate values that are stored in the buffer are a part of the connection information (the connection information D15 in FIG. 23) used in connecting the edges to each other.

Upon completion of the above zero cross position calculating process, the processing is advanced to S424 in FIG. 18, and the same processing is conducted between the intended pixel and the lower side segment.

In S424, it is judged whether the symbols of the intermediate data of the intended pixel and the intermediate data of the pixel (lower side pixel) that is positioned at the lower side of (in proximity to) the intended pixel are different from each other, or not. If the symbols are not different, the processing is advanced to S434. If the symbols are different, it is judged whether at least one of the absolute value of the intermediate data of the intended pixel that is at the present position and the absolute value of the intermediate data of the left side pixel is equal to or larger than (or larger than) a predetermined threshold value L3 (for example, 128), or not (S426). If the conditions are satisfied, the processing is advanced to S432, and the zero cross position calculating process is conducted.

If the conditions are not satisfied, there is obtained a difference between the maximum and minimum of the luminance values of 3×3 pixels centered on the intended pixel on the unenlarged image that has been subjected to the Gaussian blurring process (S428). Then, it is judged whether the difference thus obtained is equal to or larger than a predetermined threshold value L4 (for example, 50), or not (S430). If the conditions are satisfied, the processing is advanced to S432, and the zero cross position calculating process is conducted. On the other hand, if the conditions are not satisfied, the processing is advanced to S434.

Then, the zero cross position calculating process is conducted in S432, and it is judged whether the zero cross detecting process has been conducted on all of the pixels of the unenlarged image that has been subjected to the Gaussian blurring process, or not (S434). If the conditions are not satisfied, the processing of S412 to S434 is repeated, and if the conditions are satisfied, the flow is completed. As a result, while the intended pixel on the dot-matrix like pixels corresponding to the intermediate data D5 is sequentially moved, a position at which the intermediate data is set to a predetermined value 0 is determined by using the intermediate data of the plural pixels within the predetermined area including the intended pixel, and the position of the edge which makes the determined position correspond to the position of the respective pixels I2u can be acquired. In this way, the edge detection can be performed by raster scanning, and the position of the edge can be obtained with high precision by a unit smaller than the pixel of the unenlarged image.

Because the order of setting the position of the intended pixel is from a pixel on upper left to a pixel on lower right, most of the edges whose coordinate values are stored in the buffer in order are in proximity to each other.

Figure 21:
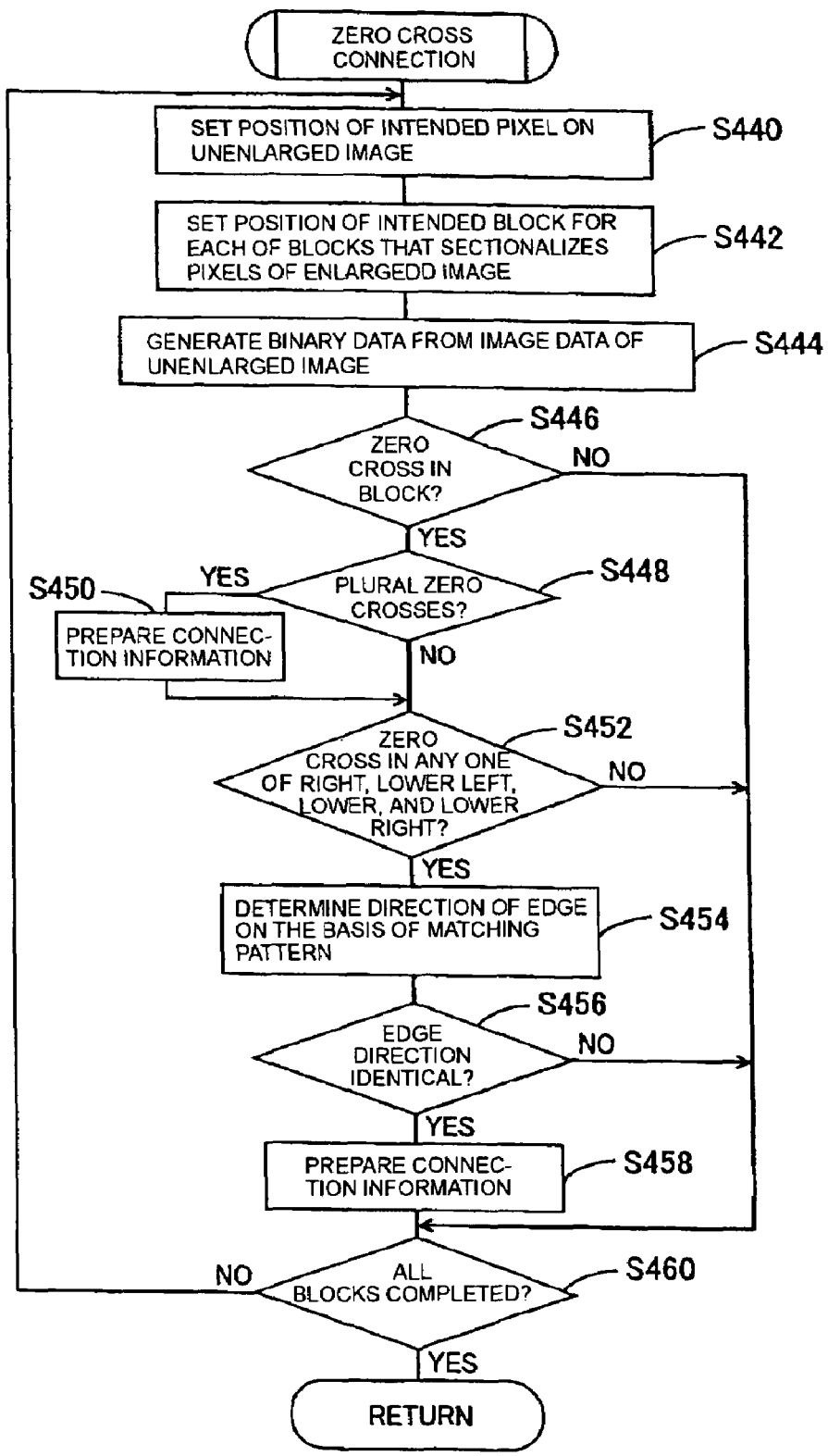
FIG. 21 is a flowchart showing a zero cross connecting process.

(3-3-3) Zero Cross Connecting Process (S404 in FIG. 17):

When the processing of FIG. 21 starts, the position of the intended pixel is set on the unenlarged image that has been smoothed (S440). Then, the position of the intended pixel corresponding to the position of the intended pixel is set for each block of 3×3 pixels within the predetermined area (predetermined region) that sectionalizes the pixels of the enlarged image (S442).

Figure 22:
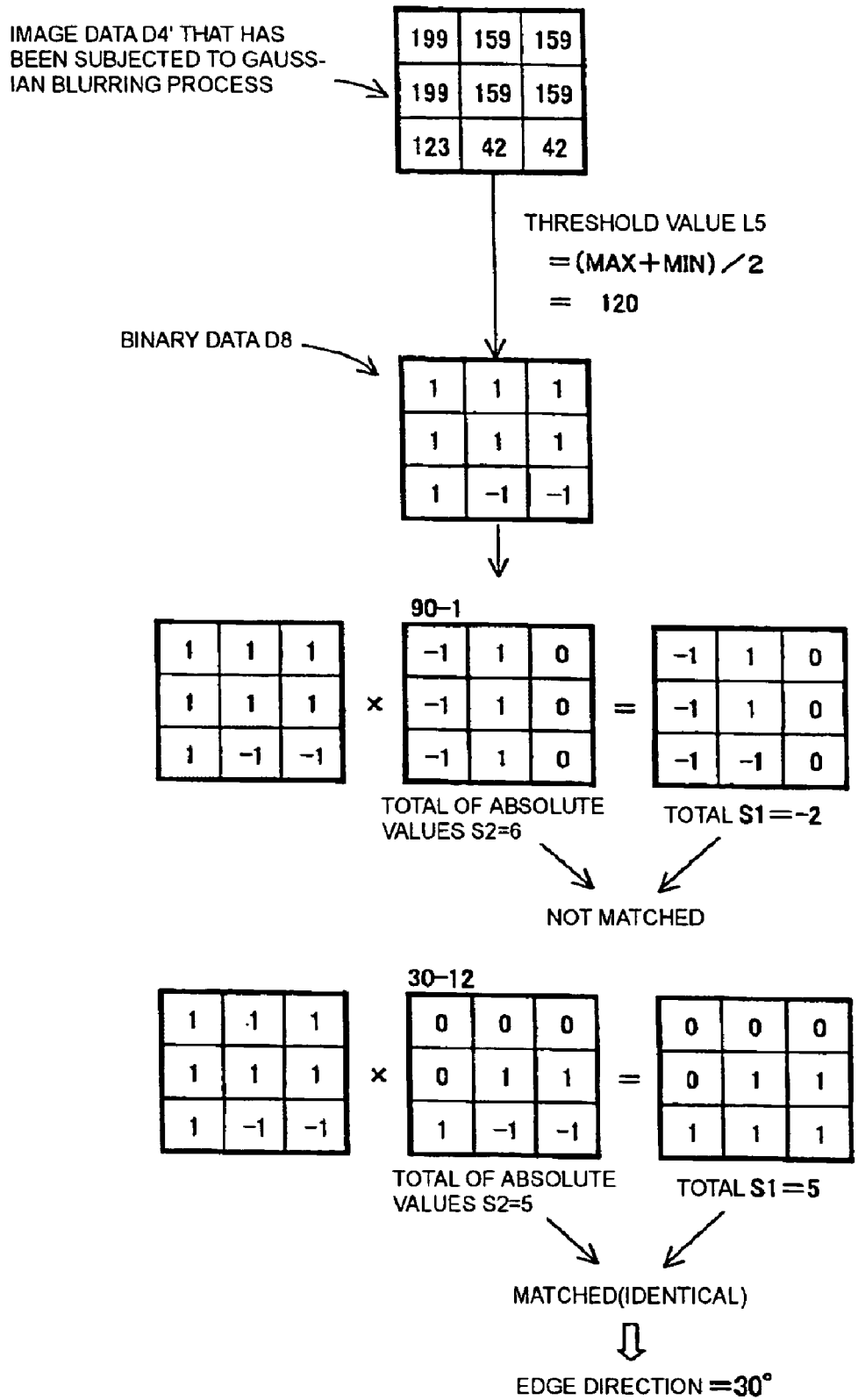
FIG. 22 is a diagram showing a condition in which binary data is generated to conduct a pattern matching process.

In addition, as shown in FIG. 22, the luminance values (image data D4') of 3×3 pixels (corresponding to 3×3 blocks of the enlarged image) within the predetermined area (predetermined region) centered on the intended pixel is binarized to generate binary data D8 corresponding to the respective pixels of the unenlarged image (S444). The luminance values are obtained according to the gradation values r, g and b of the respective RGB which make up the smoothed image data D4 through the above arithmetic expression (5). In the case where the intended pixel is at an end of the unenlarged image, the binary data is generated provided that the luminance value of the pixel at the end of the unenlarged image is outside of the unenlarged image. In this embodiment, the average value of the maximum and minimum of the luminance values of the 3×3 pixels is set as a threshold value L5. Then, when the luminance values of the respective pixels are equal to or larger than (or larger than) the threshold value L5, the binary data is set to 1. On the other hand, when the luminance values of the respective pixels are smaller than (or equal to or smaller than) the threshold value L5, the binary data is set to −1.

Thereafter, it is judged whether zero cross which is the pixel unit of the enlarged image, that is, the edge exists within the intended block of the enlarged image I2, or not (S446). When no edge exists within the intended block (the coordinate values of the edge on the corresponding enlarged image are not stored in the buffer), the processing is advanced to S460. When the edge exists within the intended block, it is judged whether a plurality of edges exist within the intended block, or not (S448). When the plurality of edges exist, the connection information representative of connecting the edges to each other is prepared and sequentially stored (S450), and the processing is advance to S452. On the other hand, when only one edge exists, the processing is instantly advanced to S452.

Figure 23:
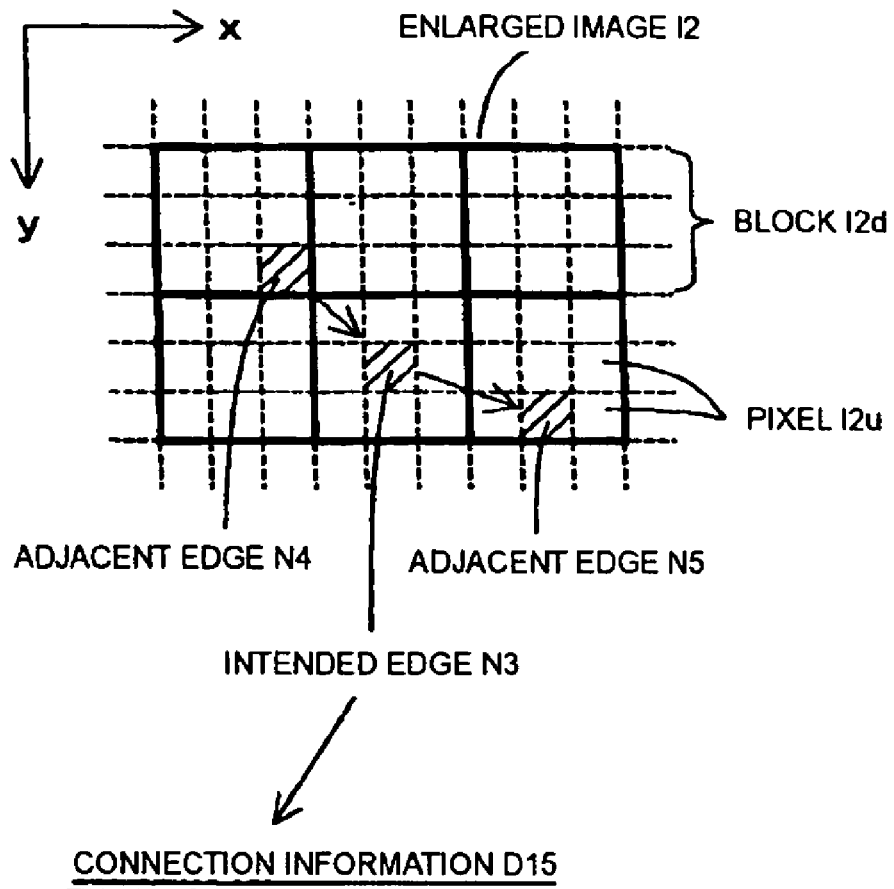
FIG. 23 is a schematic diagram showing the structure of connection information.

As shown in FIG. 23, there is stored, in the connection information D15, the position (x, y coordinate values) of the edge for each of the edges, as well as the relative position of the connecting adjacent edge and the position of the block 12d on the basis of the edge, and the relative position and the position of the block 12d of the connected adjacent edge. In an example of the figure, when the coordinates on the x, y plane is (x, y), and the relative coordinates is represented by (Δx, Δy), the relative position of the connecting adjacent edge N4 on the basis of the intended edge N3 is (−2, −2), and the position of the relative block is (−1, −1). The relative position of the connected adjacent edge N5 is (+3, +1), and the position of the relative block is (+1, 0). In the case where a plurality of connecting or connected adjacent edges are disposed, the relative positions and the positions of the block in the respective adjacent edges are stored. Accordingly, in S450, a reference edge is sequentially set among a plurality of edges that exist within the intended block, and the relative positions and the positions of the blocks may be set as the connection information with the remaining edges within the intended block as the connecting or connected edges on the basis of the reference edge.

When being viewed from the reference edge that is going to prepare the connection information, whether another edge different from the reference edge should be a connecting edge or a connected edge is decided as follows: For example, when the edge exists on the upper left (Δx<0 and Δy<0), upper (Δx=0 and Δy<0), upper right (Δx>0 and Δy<0), and left (Δx<0 and Δy=0), the edge may be a connecting edge. On the other hand, when the edge exists on the right (Δx>0 and Δy=0), lower left (Δx<0 and Δy>0), lower (Δx=0 and Δy>0), and lower right (Δx>0 and Δy>0), the edge may be a connected edge. The same is applied to the following example.

In S452, it is judged whether the zero cross exists in any one of a block at a right side of the intended block, a block at lower left thereof, a block at a lower side thereof, and a block at lower right thereof, or not. If the conditions are satisfied, the processing is advanced to S454. If the conditions are not satisfied, the processing is advance to S460. Since the setting order of the intended block is repeated from the left toward the right and downward from upper, the adjacent blocks are not the intended block, and there is the significance of judging the zero cross exists, or not. In this embodiment, in the case where the intended block is at an end of the enlarged image, and the adjacent block is out of the enlarged image, no zero cross exists in the adjacent block. It is needless to say that the edge in the block at an end of the enlarged image may be outside of the unenlarged image.

In S454, the direction of the edge is determined according to binary data D8 and predetermined plural matching patterns 14d (FIG. 11), and information representative of the direction of the edge is acquired.

Whether the binary data matches (is identical) with the matching pattern, or not, is judged as follows: That is, there is calculated the total $S1=\Sigma fi \cdot di$ of products of binary data of the respective pixels of 3×3, and the respective element values of the matching patterns of 3×3. The binary data of 3×3 pixels are d1 to d9 in the stated order of upper left to upper right, middle left to middle right, and lower left to lower right. The respective element values of the matching patterns of 3×3 are f1 to f9 in the stated order of upper left to upper right, middle left to middle right, lower left to lower right. Then, the above matching is judged according to whether the total S1 being equal to the total $S2=\Sigma |fi|$ of the absolute values of the respective element values of the matching pattern, or not. The binary data of the intended pixel is d5, and the element value of the matching pattern corresponding to the intended pixel is f5. If S1=S2, the inclination of the edge of the unenlarged image matches with the matching pattern, and information representative of the direction of the edge corresponding to the matched matching pattern is acquired.

In an example of FIG. 22, when the total S2 of the binary data D8 and the 90-degrees matching pattern of "90-1" in FIG. 11 is calculated, the total S2 becomes −2. Since the total S2 of the absolute values of the respective elements in the pattern of "90-1" is 6, the binary data D6 does not match (is not identical) with the pattern of "90-1". On the other hand, when the total S1 of the binary data D8 and the 30-degrees pattern of "30-12" is calculated, the total S1 becomes 5. Since the total S2 of the absolute values of the respective elements is 5, the binary data D8 matches with the pattern of "30-12". In this case, the direction of the edge is determined as 30 degrees. In this manner, the edges of the enlarged image can be surely connected to each other with a simple structure using the matching pattern, and a process of forming the edges of the enlarged image with high precision and with a thin line can be surely conducted at a high speed. A direction of reducing a difference between two pixel values (luminance value difference, RGB value difference, respective color value difference, etc.) may be determined as the direction of the edge. The direction of the edge may be determined considering the direction or intensity of the edge of the adjacent pixel, or the direction of the edge may be determined introducing the concept of a vector although the processing becomes complicated. The direction of the edge may be determined by combination of those methods.

When the direction of the edge is determined, it is judged whether an inclination of a line that connects the edge within the intended block and the edge within the adjacent block is identical with the direction of the edge that is determined by using the matching pattern, or not (S456). For example, a tolerance of the direction of the edge including an angle of the pattern is provided with respect to the respective matching patterns, and the above judgment is made according to whether the direction of the line that connects both of the zero crosses to each other falling within the tolerance, or not. In this example, when it is assumed that the position of the edge within the intended block on the x, y coordinate plane on the enlarged image is (x1, y1), and the position of the edge within the adjacent block is (x2, y2), an inclination G of the line that passes through the positions of both the edges can be calculated from the following expression.

$$G=(y2-y1)/(x2-x1) \quad (14)$$

Then, a lower limit G1 and an upper limit G2 of the tolerance of the inclination G of the line in each of the matching patterns are provided, it may be judged that the inclination of the line is identical with the direction of the edge of the corresponding matching pattern when $G1 \leq G \leq G2$ is satisfied.

If the conditions are satisfied, the above-mentioned connection information is prepared, and sequentially stored (S458), and the processing is advanced to S460. If the conditions are not satisfied, the conditions are instantly advanced to S460. In S460, it is judged whether the zero cross connecting process is conducted on all of the blocks, or not. If the conditions are not satisfied, the processing of S440 to S460 is repeated, and if the conditions are satisfied, the flow is completed.

As described above, while the intended pixel is sequentially moved on the unenlarged image, the gradation data of the plural pixels within the predetermined area including the intended pixel is binarized into binary data. Then, the direction of the edge can be determined according to the binary data and a plurality of predetermined matching patterns corresponding to the directions of the edge.

Figure 24:
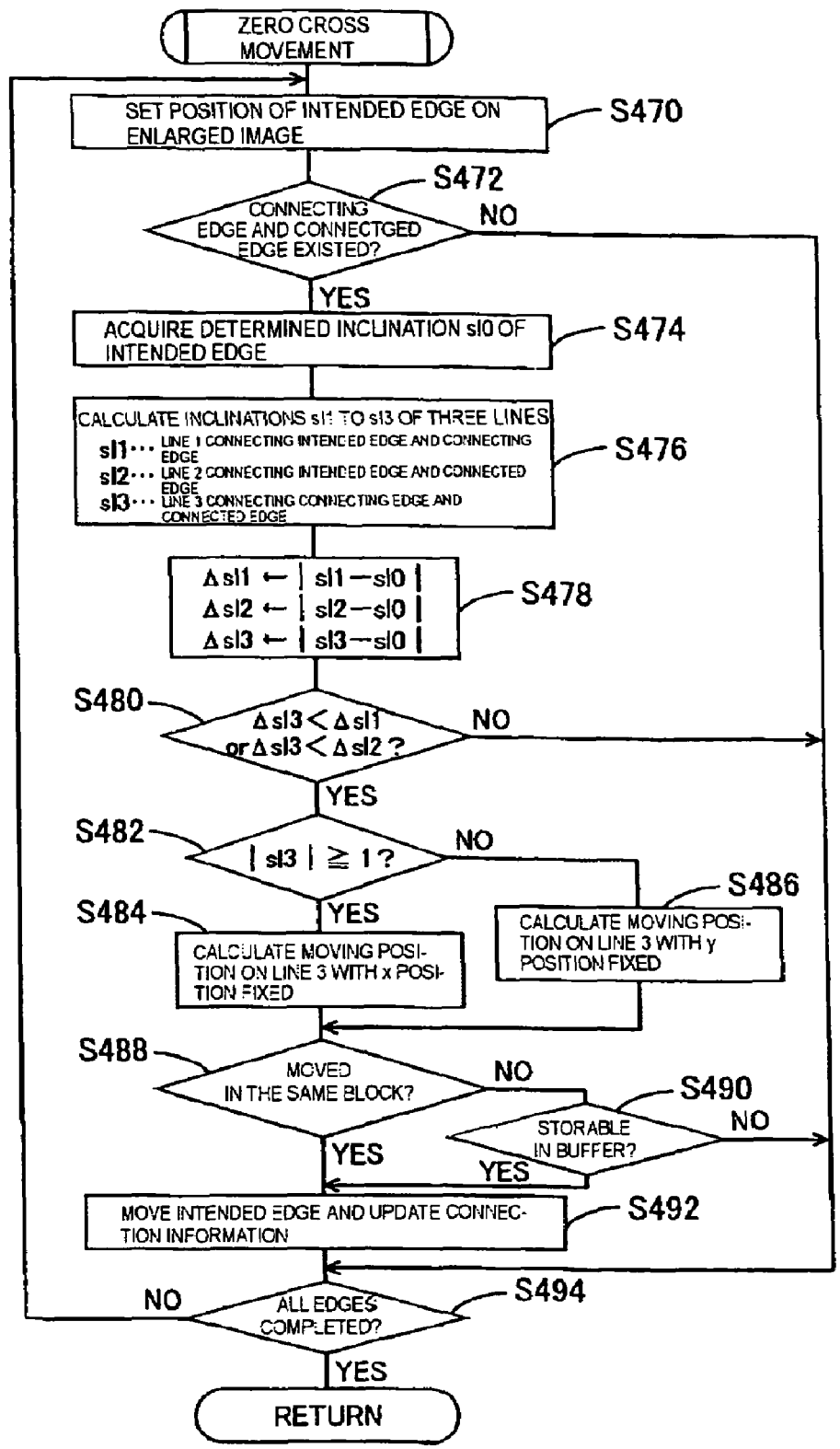
FIG. 24 is a flowchart showing a zero cross moving process.

(3-3-4) Zero Cross Moving Process (S406 in FIG. 17):

When the processing of FIG. 24 starts, the position of the intended pixel which is the pixel unit of the enlarged image is set on the unenlarged image (S470). Since the connection information of each edge is stored in order in the connection information D15, for example, edge Nos. are associated with the respective edges, and a value of a pointer in association with the edge No. is updated, thereby making it possible to set the position (Xi, Yi) of the intended edge. Then, it is judged whether both of the connecting edge and the connected edge exist in the intended edge, or not (S472). The judging process can be performed by judging whether both of the position of the connecting edge corresponding to the intended edge and the position of the block, and the position of the connected edge and the position of the block are stored in the connection information D15, or not. In the case where at least one of the connecting edge and the connected edge does not exist, since the intended edge is an end point or an isolated point, the processing is advanced to S494.

If the conditions are satisfied, an inclination sl0 of the intended edge is acquired from the direction of the edge which is determined by using the matching patterns in S454 (S474). Then, a relative position ($\Delta X1$, $\Delta Y1$) of the connecting adjacent edge N4 of the intended edge N3 and a position ($\Delta X2$, $\Delta Y2$) of the connected adjacent edge N5 are acquired from the connection information D15 on the enlarged image I2. Then, an inclination sl1 of a line 1, an inclination sl2 of a line 2, and an inclination sl3 of a line 3 are calculated (S476). The line 1 connects the position of the intended edge N3 and the position of the connecting adjacent edge N4 of the edge N3. The line 2 connects the position of the intended edge N3 and the position of the connected adjacent edge N5 of the edge N3. The line 3 connects the positions of the adjacent edges N4 and N5 to each other.

In this case, $$\text{when } \Delta X1 \neq 0, \, sl1=\Delta Y1/\Delta X1, \text{ and when } \Delta X1=0, \\ sl1=\text{infinite} \quad (15)$$

$$\text{when } \Delta X2 \neq 0, \, sl2=\Delta Y2/\Delta X2, \text{ and when } \Delta X2=0, \\ sl2=\text{infinite} \quad (16)$$

when $\Delta X2 \neq \Delta X1$, $sl3=(\Delta Y2-\Delta Y1)/(\Delta X2-\Delta X1)$ when $\Delta X2=\Delta X1$, $sl3$=infinite (17)

In addition, differences between sl1 to sl3 and sl0 are calculated (S478). In this example, $$\Delta sl1=|sl1-sl0| \quad (18)$$

$$\Delta sl2=|sl2-sl0| \quad (19)$$

$$\Delta sl3=|sl3-sl0| \quad (20)$$

Then, it is judged whether $\Delta sl3<\Delta sl1$ or $\Delta sl3<\Delta sl2$ is satisfied, or not (S480). When the inclination sl3 of the line that connects the adjacent edges to each other is closer to the inclination sl0 of the intended edge than sl1, or the conditions that the inclination sl3 is closer to the inclination sl0 of the intended edge than sl1 is satisfied, the processing is advanced to S482. If the conditions are not satisfied, the processing is advanced to S494.

In S482, it is judged whether the absolute value of the inclination s13 of the line that connects the adjacent edges to each other is equal to or larger than 1. If the conditions are satisfied, an x position is fixed, and a moving position (Xi, Yi') on the line 3 is calculated (S484). If the conditions are not satisfied, a y position is fixed, and a moving position (Xi', Yi) on the line 3 is calculated (S486). In an example of FIG. 10, because of sl3=3/5<1, the intended edge of the position (Xi, Yi) that has not yet been moved fixes the y position Yi. The line that connects the adjacent lines to each other is represented by the following expression.

$$Y=sl3\times[x-(Xi+\Delta X1)]+(Yi+\Delta Y1)$$

Therefore, the following expression is satisfied.

$$Xi'=(Xi+\Delta X1)-\Delta Y1/sl3$$

In the connection information D15 shown in FIG. 23, the position of the edge i is corrected to (Xi+1, Yi), the position of the connecting edge is corrected to (−3, −2), and the position of the connected edge is corrected to (+2, +1).

Thereafter, it is judged whether the intended edge is moved in the same block, or not (S488). When the intended edge is moved in the same block, the processing is advanced to S492. When the intended edge is moved out of the same block, it is judged whether information is storable in the buffer, or not (S490). When the information is storable in the buffer, the processing is advanced to S492, and when the information is not storable in the buffer, the processing is advanced to S494. In S492, the intended edge is moved, and the contents of the connection information D15 are updated. Thereafter, it is judged whether the zero cross moving process is conducted on all of the edges, or not (S494). If the conditions are not satisfied, the processing of S470 to S494 is repeated, and if the conditions are satisfied, the flow is completed.

As described above, when the direction of the line that connects the positions of two edges adjacent to the intended edge to each other is closer to the determined direction of the intended edge than the directions that connects the position of the intended edge and the positions of the adjacent edges on the enlarged image, the position of the intended edge can be corrected to the position that brings the intended edge closer to the line that connects the positions of the adjacent edges to each other.

Figure 25:
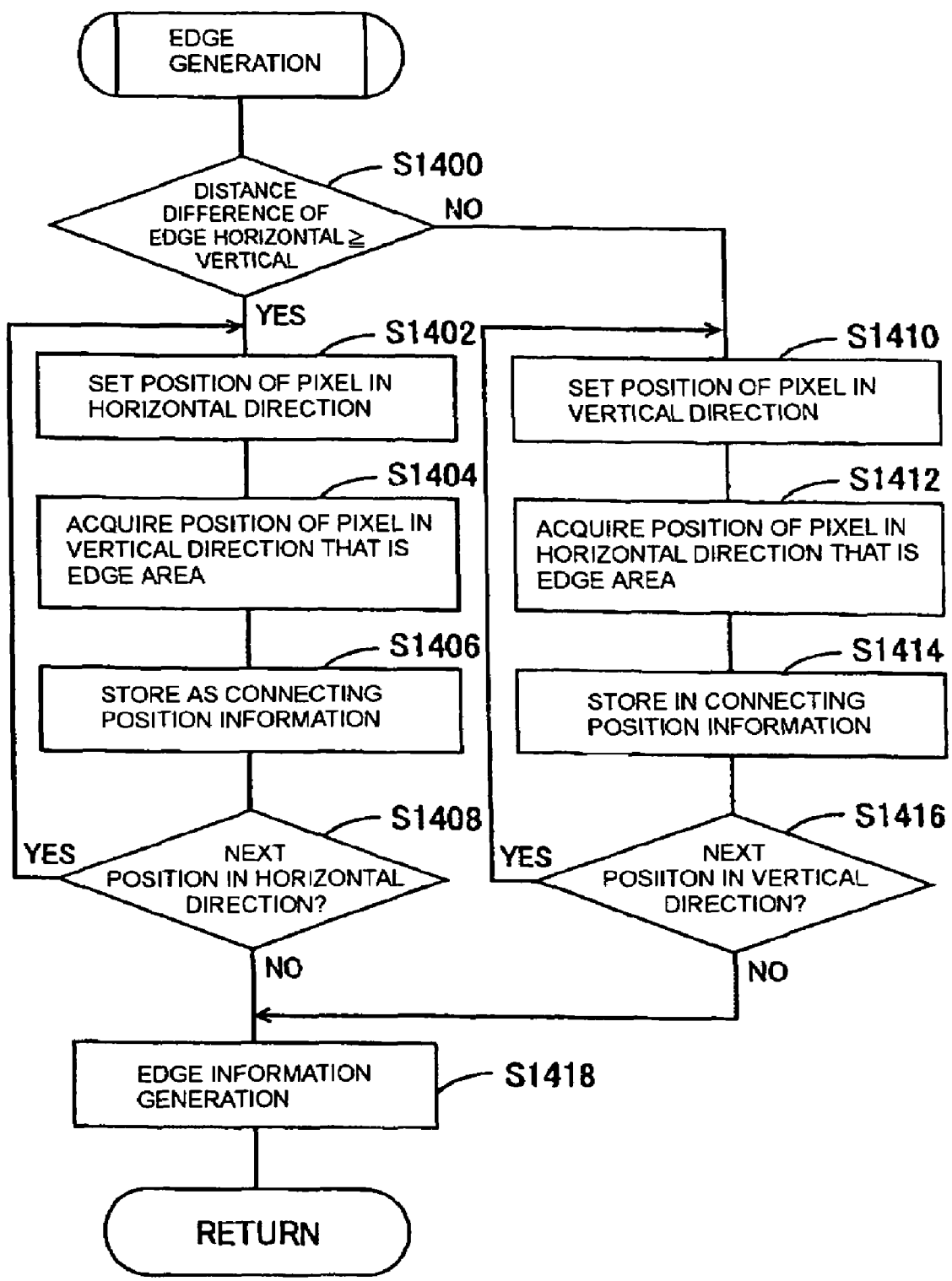
FIG. 25 is a flowchart showing an edge generation process.

(3-3-5) Edge Generating Process (S408 in FIG. 17):

when the processing of FIG. 25 starts, it is first judged whether a distance difference between two pixels that are an edge on the enlarged image in the horizontal direction (x direction) is equal to or larger than (or larger than) a distance difference in the vertical direction (y direction), nor not (S1400). If the conditions are satisfied, the processing is advanced to S1402, and if the conditions are not satisfied, the processing is advanced to S1410.

In S1402, the position of the pixel in the horizontal direction is set on the enlarged image. Then, the position of the pixel in the vertical direction which is the edge area of the enlarged image is acquired at the set position in the horizontal direction (S1404). The acquired position of the pixel (specifically, coordinate values) is stored in the buffer as the connecting position information D10 representative of the position of the pixel which is the edge area (S1406). Then, it is judged whether the next position of the pixel in the horizontal direction exists, or not (s1408). If the conditions are satisfied, while the position of the pixel in the horizontal direction is sequentially moved by the pixel unit, the processing of S1402 to S1408 is repeated, and if the conditions are not satisfied, the processing is advanced to S1418.

On the other hand, in S1410, the position of the pixel in the horizontal direction is set on the enlarged image. Then, the position of the pixel in the horizontal direction which is the edge area of the enlarged image is acquired at the set position in the vertical direction (S1412) Then, the acquired coordinate values of the pixel are stored in the buffer as the connecting position information D10 (S1414). Thereafter, it is judged whether the next position of the pixel in the vertical direction exists, or not (S1416). If the conditions are satisfied, while the position of the pixel in the vertical direction is sequentially moved by the pixel unit, the processing of S1410 to S1416 is repeated, and if the conditions are not satisfied, the processing is advanced to S1418.

In S1418, the edge information D11 representative of the edge area of the enlarged image is generated together with the connecting position information D10, and the flow is completed. In this way, the edges of the enlarged image can be surely connected to each other with a simple structure. Also, the edge area is set for each of the pixel units between the adjacent edges of the enlarged image. As a result, it is possible to surely form the edge of the enlarged image with high precision and with a thin line.

Through the above processing, since the enlarged edge image is prepared not depending on the pattern matching, the processing is adaptive to an arbitrary magnification. Also, in the case where the edge is sharpened, since the enlarged edge image can be obtained with a thin line, the number of edge processing is small. Then, the position of the intended edge is corrected so that the direction of the line that connects the position of the intended edge and the position of the adjacent edge is brought closer to the determined direction of the intended edge. As a result, the edge position is highly precise, and the edge of the enlarged image is formed with high precision and with a thin line, thereby making it possible to facilitate the processing such as sharpening.

Figure 26:
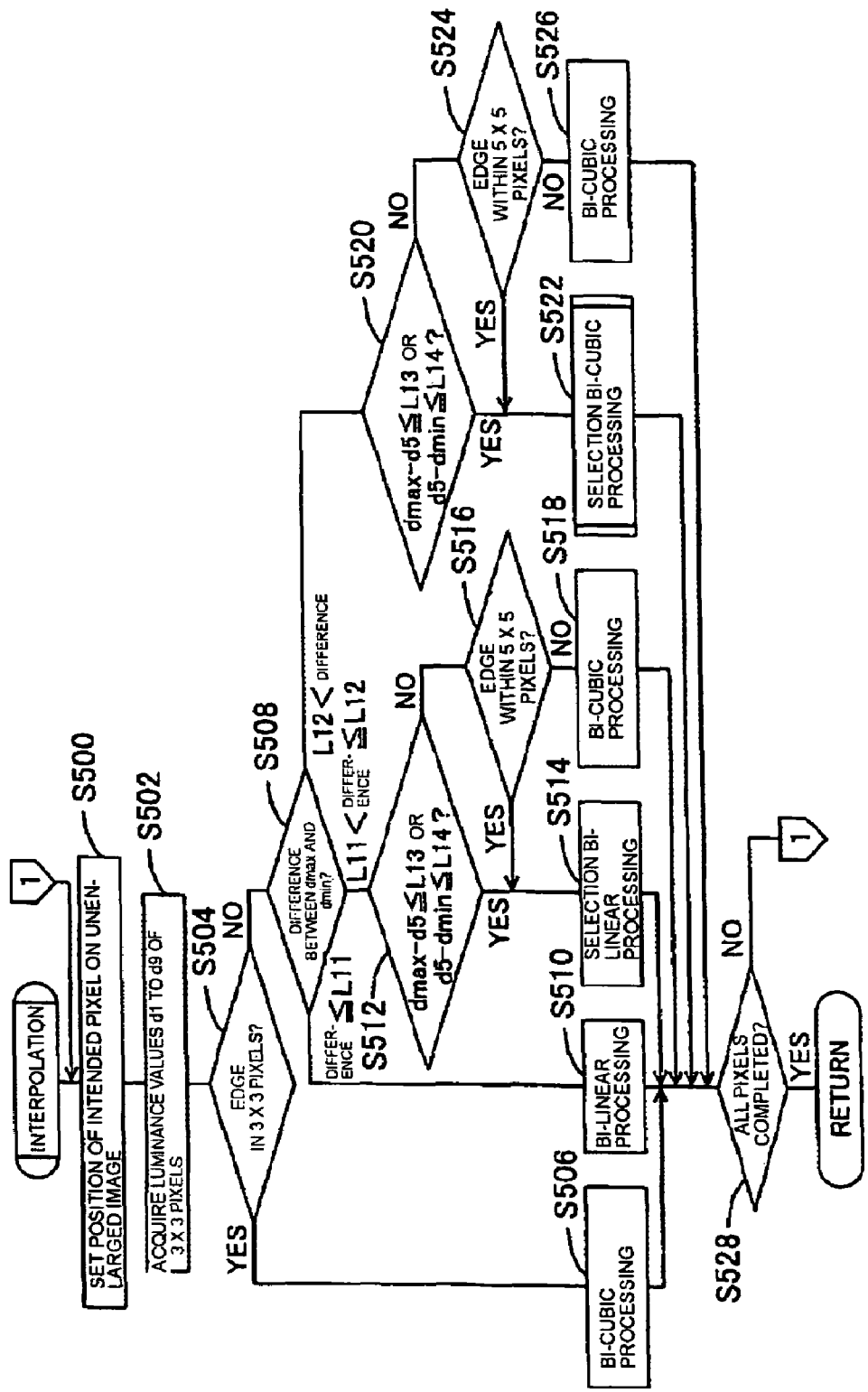
FIG. 26 is a flowchart showing an interpolating process.

(3-4) Interpolating Process (S50 in FIG. 3):

When the processing of FIG. 26 starts, a buffer area that stores the gradation data of the enlarged image that has been interpolated therein is ensured in the RAM, and the position of the intended pixel is then set on the unenlarged image which has been smoothed (may not been smoothed) (S500). Then, the luminance values d1 to d9 of 3×3 pixels (corresponding to 3×3 blocks of the enlarged image) within the predetermined area (predetermined region) centered on the intended pixel on the unenlarged image are acquired (S502). The luminance values are obtained according to the gradation values r, g and b of the respective RGB through the above arithmetic expression (5). Then, it is judged whether the zero cross which is a unit smaller than the unenlarged image, that is, the edge exists within the 3×3 pixels, or not (S504). When the edge exists within the 3×3 pixels (the coordinate values of the edge on the corresponding enlarged image are not stored in the buffer), it is judged that the gradation data may be generated by interpolating through the bi-cubic method. Then, the bi-cubic process is conducted (S506), and the processing is advanced to S528. The interpolating process using the bi-cubic method is effective in enhancement of the sharpness among the interpolating process. Since the interpolating process is conducted on the edge portion through the bi-cubic method, the sharpness can be maintained.

When no edge area exists within the 3×3 pixels, the maximum value dmax and the minimum value dmin are acquired from the luminance values d1 to d9, and a difference between the maximum value dmax and the minimum value dmin (the degree of difference of the image data) is obtained. Then, the processing is branched according to the difference thus obtained, and the present interpolating process is switched to a different sort of interpolating process (S508). That is, predetermined threshold values L11 and L12 (0<L11<L12<255, for example, L11=20, L12=150) are prepared in advance. When the obtained difference is equal to or smaller than (or smaller than) L11, the bi-linear process for interpolating through the bi-linear method is executed (S510), and the processing is advanced to S528. When the obtained difference is equal to or larger than (or larger than) L11 and equal to or smaller than (or smaller than) L12, the processing is advanced to S512, and the selection bi-linear process or the bi-cubic process is executed. When the obtained difference is equal to or larger than (or larger than) L12, the processing is advanced to S520, and the selection bi-linear process or the bi-cubic process is executed. Since the appropriate interpolating process can be conducted according to the gradation data of the pixel that is in proximity to the intended block, the interpolated enlarged image can be enhanced in the quality while the sharpness of the edge portion is maintained. In this example, since the number of reference pixels increases to 4 and 16 in the order of the bi-linear method and the bi-cubic method, the number of pixels referring to the gradation data increases more as the difference between the maximum and the minimum of the luminance values with respect to the 3×3 pixels centered on the intended pixel on the unenlarged image becomes larger. As the difference degree of the luminance values is larger, the interpolating process must be conducted with higher precision. As the difference degree of the luminance values becomes larger, the number of pixels referred to in the interpolating process increases more, and the interpolating process is conducted with high precision. On the other hand, as the difference degree of the luminance values becomes smaller, the number of pixels referred to in the interpolating process decreases more, and the interpolating process is conducted at high speed. Accordingly, the interpolating process is conducted with high efficiency and with high precision, thereby making it possible to obtain the enlarged image with high quality.

The difference degree of image data can be a value based on the combination of the second largest value with the second smallest value, or a value of combination of those values with an intermediate value, other than a value based on the combination of the maximum value with the minimum value.

In S512, it is judged whether the luminance value d5 of the intended pixel is close to the maximum value dmax or the minimum value dmin, or not. If yes, the selection bi-linear process is conducted (S514), and the processing is then advanced to S528. If no, the processing is then advanced to S516.

The judging process can be executed by checking whether dmax−d5 is equal to or smaller than (or smaller than) L13, or d5−dmin is equal to or smaller than (or smaller than) L14, or not, under the conditions where the predetermined threshold values L13 and L14(0<L13<128, 0<L14<128) are prepared. When the luminance value of the intended pixel is close to the maximum value dmax, the interpolating process is conducted by the selection bi-linear process except for at least the minimum value dmin to obtain the sharpness of the image with an improvement in the image quality. When the luminance value of the intended pixel is close to the minimum value dmin, the interpolating process is conducted by the selection bi-linear process except for at least the maximum value dmax to obtain the sharpness of the image with an improvement in the image quality.

In S516, it is judged whether the edge exists in the 5×5 pixels within the predetermined area (predetermined region) centered on the intended pixel on the unenlarged image that has been smoothed, or not. When the edge exists in the 5×5 pixels, the selection bi-linear process is conducted (S514), and the processing is advanced to S528. As a result, since the interpolating process is so conducted as not to straddle the area of the edge around the edge, the sharpness around the edge is maintained even after the interpolating process, and a natural image quality is obtained. If the conditions are not satisfied, it is judged that the gradation data may be generated by the interpolating process using the bi-cubic method. Then, the bi-cubic process is conducted (S518), and the processing is advanced to S528.

Similarly, in S520, it is judged whether the luminance value d5 of the intended pixel is close to the maximum value dmax or the minimum value dmin, or not. If yes, the selection bi-cubic process is conducted (S522), and the processing is then advanced to S528. If no, the processing is then advanced to S524.

The judging process can be executed by checking whether dmax−d5 is equal to or smaller than (or smaller than) L13, or d5−dmin is equal to or smaller than (or smaller than) L14, or not. When the luminance value of the intended pixel is close to the maximum value dmax, the interpolating process is conducted by the selection bi-cubic process except for at least the minimum value dmin to obtain the sharpness of the image with an improvement in the image quality. When the luminance value of the intended pixel is close to the minimum value dmin, the interpolating process is conducted by the selection bi-cubic process except for at least the maximum value dmax to obtain the sharpness of the image with an improvement in the image quality.

In S524, it is judged whether the edge exists in the 5×5 pixels within the predetermined area (predetermined region) centered on the intended pixel on the unenlarged image that has been smoothed, or not. When the edge exists in the 5×5 pixels, the selection bi-cubic process is conducted (S522), and the processing is advanced to S528. As a result, since the interpolating process is so conducted as not to straddle the area of the edge around the edge, the sharpness around the edge is maintained even after the interpolating process, and a natural image quality is obtained. If the conditions are not satisfied, it is judged that the gradation data may be generated by the interpolating process using the bi-cubic method. Then, the bi-cubic process is conducted (S526), and the processing is advanced to S528.

Figure 27:
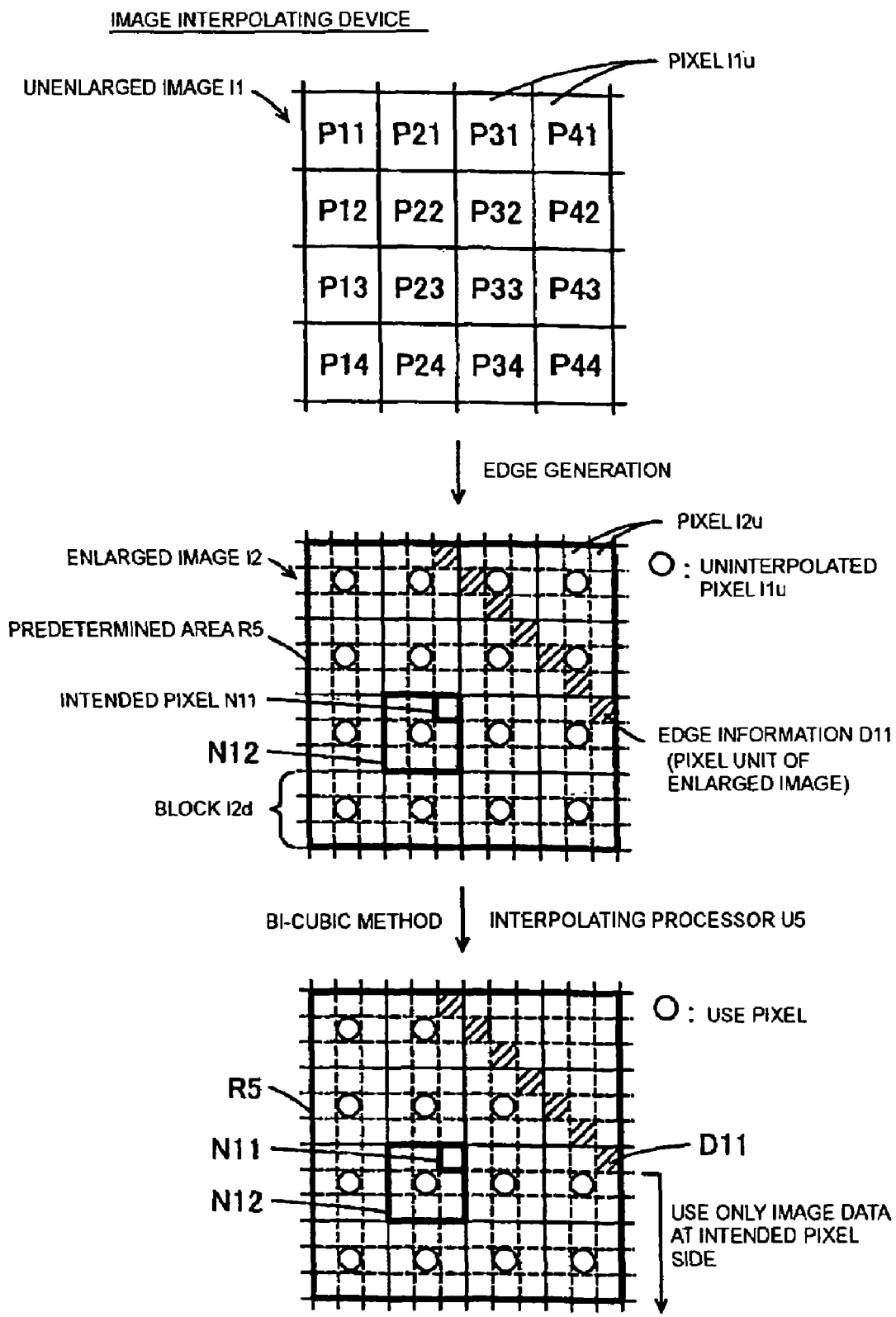
FIG. 27 is a schematic diagram showing a selection bi-cubic process.

FIG. 27 is a schematic diagram showing the selection bi-cubic process. The interpolating unit U5 conducts the interpolating process with reference to the image data of the plural pixels within a predetermine area R5 in the unenlarged image I1 that has not yet been interpolated which is positioned in proximity to the intended pixel N11 while sequentially moving the intended pixel N11 that generates the gradation data on the interpolated enlarged image I2. In the case where the interpolating process is conducted through the bi-cubic method, the image data of 4×4 pixels of the unenlarged image which are positioned in proximity to the intended pixel is referred to. In the figure, for convenience, the 4×4 pixels are called "P11 to P44". In conducting the interpolating process, it is judged on the basis the image data D4 of the unenlarged image that has been smoothed (or has not yet been smoothed) whether the edge area of the image crosses the plural pixels P11 to P44 within the predetermined area R5, or not. If yes, the interpolating process is conducted by using only the image data of the pixel that is at the intended pixel side from the edge area.

Figure 28:
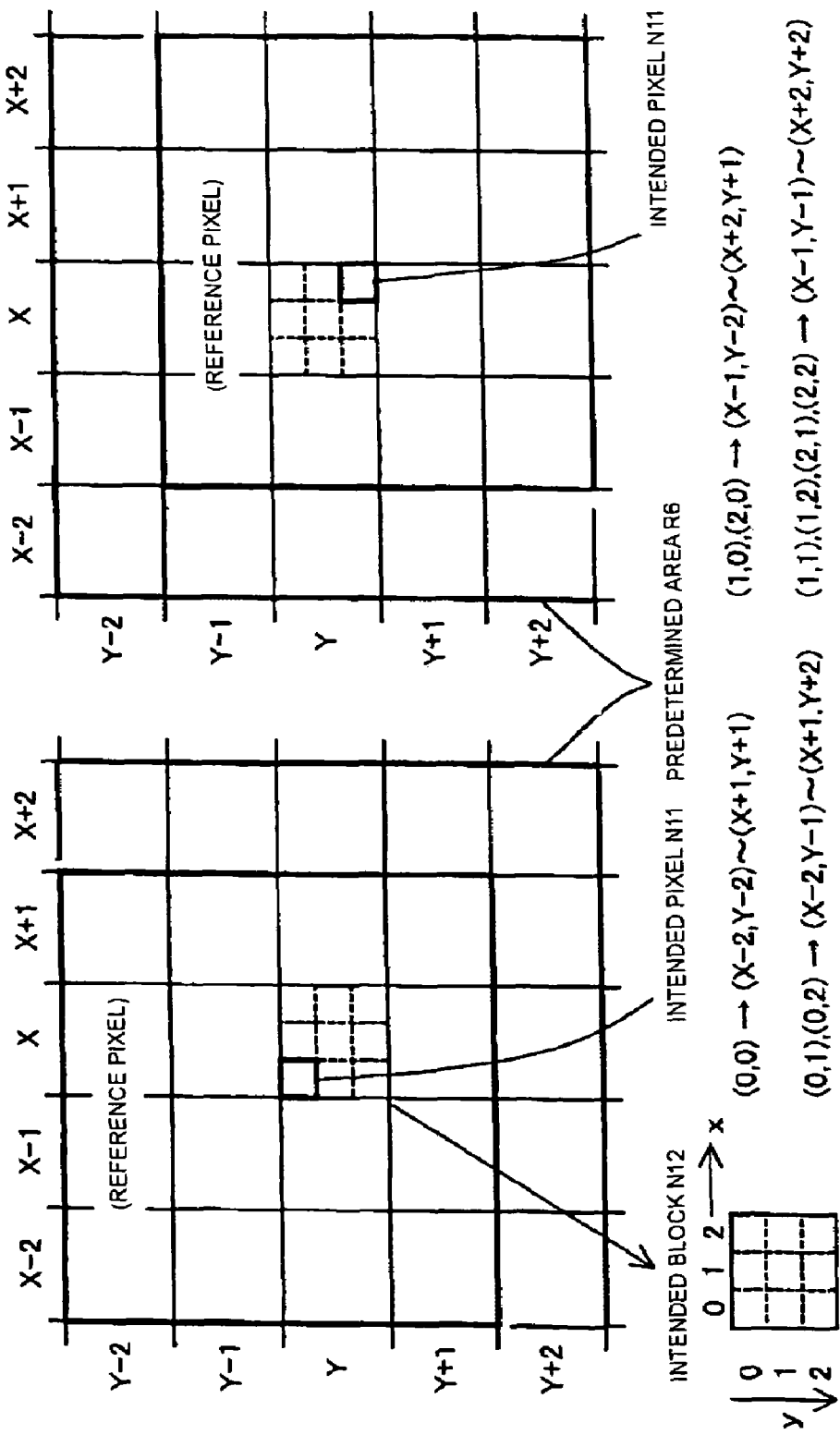
FIG. 28 is a diagram showing a condition in which a reference pixel is determined in the selection bi-cubic process.

As shown in FIG. 28, when it is assumed that a position of a corresponding pixel in the unenlarged image which corresponds to the intended block N12 is (X,Y), the position of the intended pixel N11 within the intended block N12 is (x, y), the magnification of the image is M, and s=M/2 (truncate a fractional part), if M=3, then x=0~2, y=0~2 and s=1. Accordingly, the positions of 16 reference pixels are determined as follows:

When x<s and y<s, that is, the intended pixel is (0,0), (X-2, Y-2)~(X+1, Y+1)
When x≧s and y<s, that is, the intended pixels are (1,0) and (2,0),
then, (X-1, Y-2)~(X+2, Y+1)
When x<s and y>s, that is, the intended pixels are (0,1) and (0,2),
then, (X-2, Y-1)~(X+1, Y+2)
When x≧s and y≧s, that is, the intended pixels are (1,1), (1,2), (2,1) and (2,2),
then, (X-1, Y-1)~(X+2, Y+2)

In this manner, the reference pixels in the appropriate area are set according to the positions of the pixels within the intended block. In this example, the 5×5 pixels centered on the corresponding pixel are plural pixels within a predetermined area R6 in the unenlarged image that has not yet been interpolated and may be set as the reference pixels in generating the gradation data of the pixels within the intended block.

When the gradation values of the reference pixels P11 to P44 for each of RGB (luminance values Y are also acceptable) are represented by $P_{11}$~$P_{44}$, the gradation value E that has been interpolated can be calculated by the following expression (21), $$E = \sum_{i=1}^{4}\sum_{j=1}^{4}\{P_{ij} \times c(X+dX) \times c(Y+dY)\} \quad (21)$$

[Formula 1]

where c(x) is a function expressed as follows:
When $0 \leq |x| < 1$,
then $c(x)=(x-1)(x^2-x-1)$
When $1 \leq |x| < 2$,
then $c(x)=-(x-1)(x-2)^2$
When $|x| \geq 2$,
then $c(x)=0$ Incidentally, distance coefficients dx and dy by the bi-cubic method are expressed as follows:
When x<s and y<s,
then dx=(x+M-s)/M, dy=(y+M-s)/M
When x≧s and y<s,
then dx=(x-s)/M, dy=(y+M-s)/M
When x<s and y≧s,
then dx=(x+M-s)/M, dy=(y-s)/M
When x≧s and y≧s,
then dx=(x-s)/M, dy=(y-s)/M When the reference pixel is out of an end of the unenlarged image, the gradation values are calculated assuming that pixels on the end of the unenlarged image are continuous toward the outside. The gradation value E that has been interpolated may be calculated by using the gradation value that has not yet been smoothed.

Figure 29:
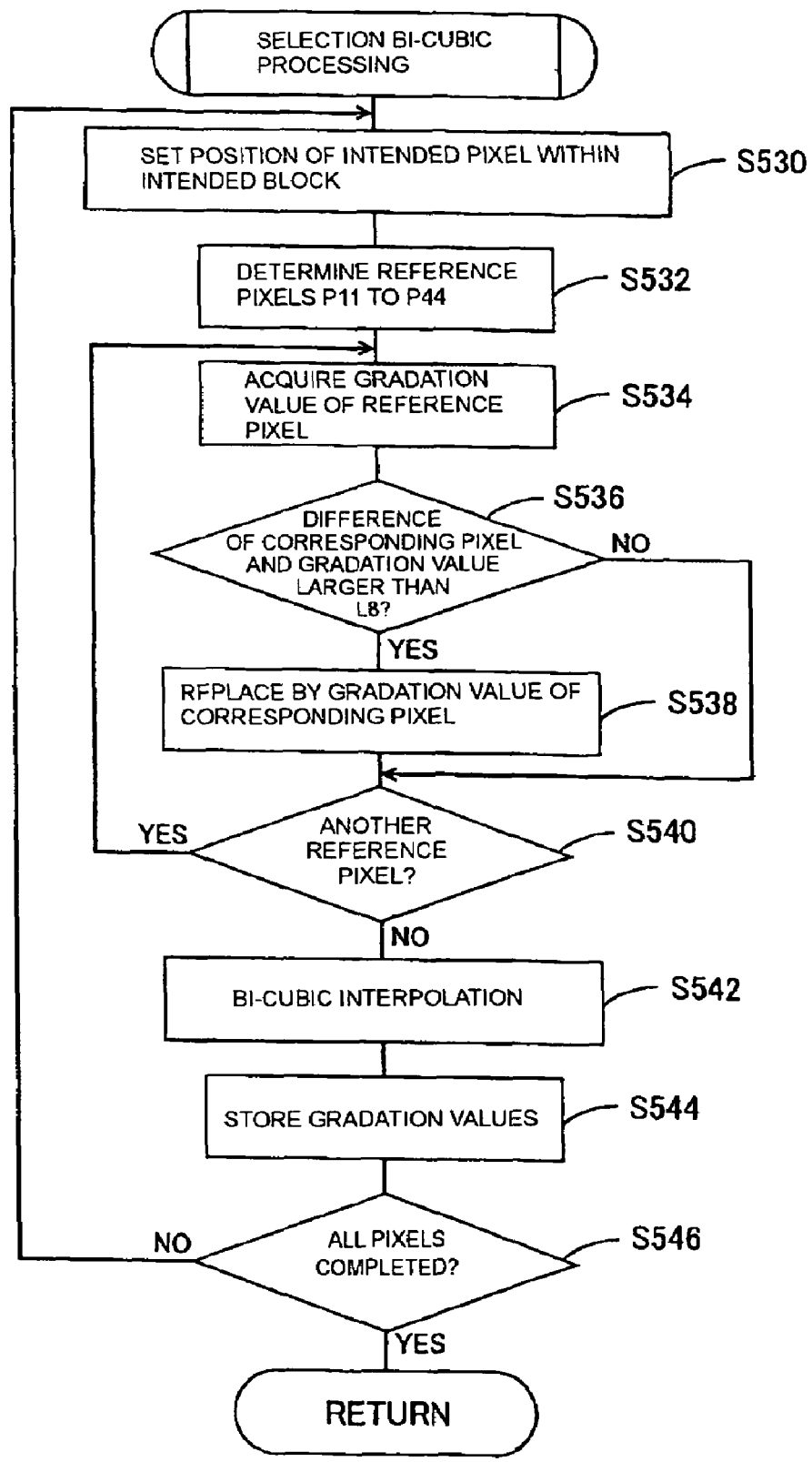
FIG. 29 is a flowchart showing the selection bi-cubic process.

When the selection bi-cubic process shown in FIG. 29 starts, the position (x,y) of the intended pixel N11 within the intended block N12 is set in the order of (0,0), (0,1) . . . (2,2) (S530). Then, the 4×4 reference pixels P11 to P44 within the predetermined area R5 in the unenlarged image I1 which are positioned in proximity to the intended pixel N11 are determined (S532). In addition, the gradation values P' in the unenlarged image are sequentially acquired with respect to the determined plural reference pixels P11 to P44, respectively. When the image data is RGB data, the gradation value for each of RGB is acquired. Then, it is judged whether differences between the acquired gradation values P' and the gradation values P0 of the pixels corresponding to the intended block N12 are larger than (or equal to or larger than) the predetermined threshold value L8, or not, that is, whether |P'-P0|>L8 is satisfied, or not (S536). When the gradation values are 256 gradations, L8 may be set to, for example, 50 classes.

When the difference in the gradation value is larger than L8 (out of the predetermined range), the gradation value of the reference pixel Pij is replaced by the gradation value P0 of the corresponding pixel as the gradation value $P_{ij}$ that is assigned to the above arithmetic expression (21) of the interpolating process (S538). When the difference in the gradation value is equal to or lower than L8 (within the predetermined range), the gradation value of the reference pixel Pij is set as the gradation value $P_{ij}$ that is assigned to the above arithmetic expression (21) at it is without replacing the gradation value. Then, the processing is advanced to S540. Since the gradation value of the pixel which is large in the difference from the gradation value of the corresponding pixel is not used, it is judged on the basis of the image data of the unenlarged image whether the edge area of the image crosses the plural pixels within the predetermined area which are positioned in proximity to the intended pixel, or not, in S540. Then, if yes, the interpolating process is conducted by using only the image data of the pixel that is at the intended pixel side from the edge area in S538.

In S540, it is judged whether another reference pixel that does not conduct the above judging process exists, or not. If the conditions are satisfied, the processing of S534 to S540 is repeated. On the other hand, if the conditions are not satisfied, the processing is advanced to S542.

In S542, the bi-cubic interpolating process for calculating the interpolated gradation value E is conducted by using the gradation value $P_{ij}$ of the reference pixel whose gradation value is rewritten through the above arithmetic expression (21). After the interpolating process has been conducted, the calculated gradation value E is stored in the buffer (S544). In this manner, the known interpolating process can be employed with a simple structure where the gradation value is rewritten, and the interpolating process can be readily conducted by using only the image data of the pixel whose difference in the gradation value from the corresponding pixel in the enlarged image corresponding to the intended block is within the predetermined range.

Thereafter, it is judged whether the interpolating process is conducted on all of the pixels within the intended blocks, or not (S546). If the conditions are not satisfied, the processing of S530 to S546 is repeated, and if the conditions are satisfied, the flow is completed.

That is, the interpolating process is conducted with reference to the gradation data of the plural pixels within the predetermined area which are positioned in proximity to the intended pixel that generates the gradation data on the interpolated image. In this situation, the interpolating process is conducted by using only the image data of the pixel whose difference in the image data from the corresponding pixel on the uninterpolated image corresponding to the intended pixel among the plural pixels within the predetermined area is within the predetermined range.

Through the above processing, since the image data of the pixel which is large in the difference from the image data of the corresponding pixel corresponding to the intended block is not used in the interpolating process, the interpolating process is conducted by using only the image data of the pixel that is substantially at the intended pixel side from the edge area. That is, since the edge portion is not smoothed, the image quality can be improved while the sharpness of the edge portion is maintained even after the interpolating process. Also, even if the processing such as sharpening is conducted on the edge block, no color difference appears between the edge block and the non-edge block, and the image quality can be improved in view of this point. The same is applied to the selection bi-linear process based on the bi-linear method.

In S528 of FIG. 26, it is judged whether the gradation data corresponding to the respective pixels of the enlarged image is generated with respect to all of the pixels of the enlarged image, or not. If the conditions are not satisfied, the processing of S500 to S528 is repeated, and if the conditions are satisfied, the flow is completed.

Figure 30:
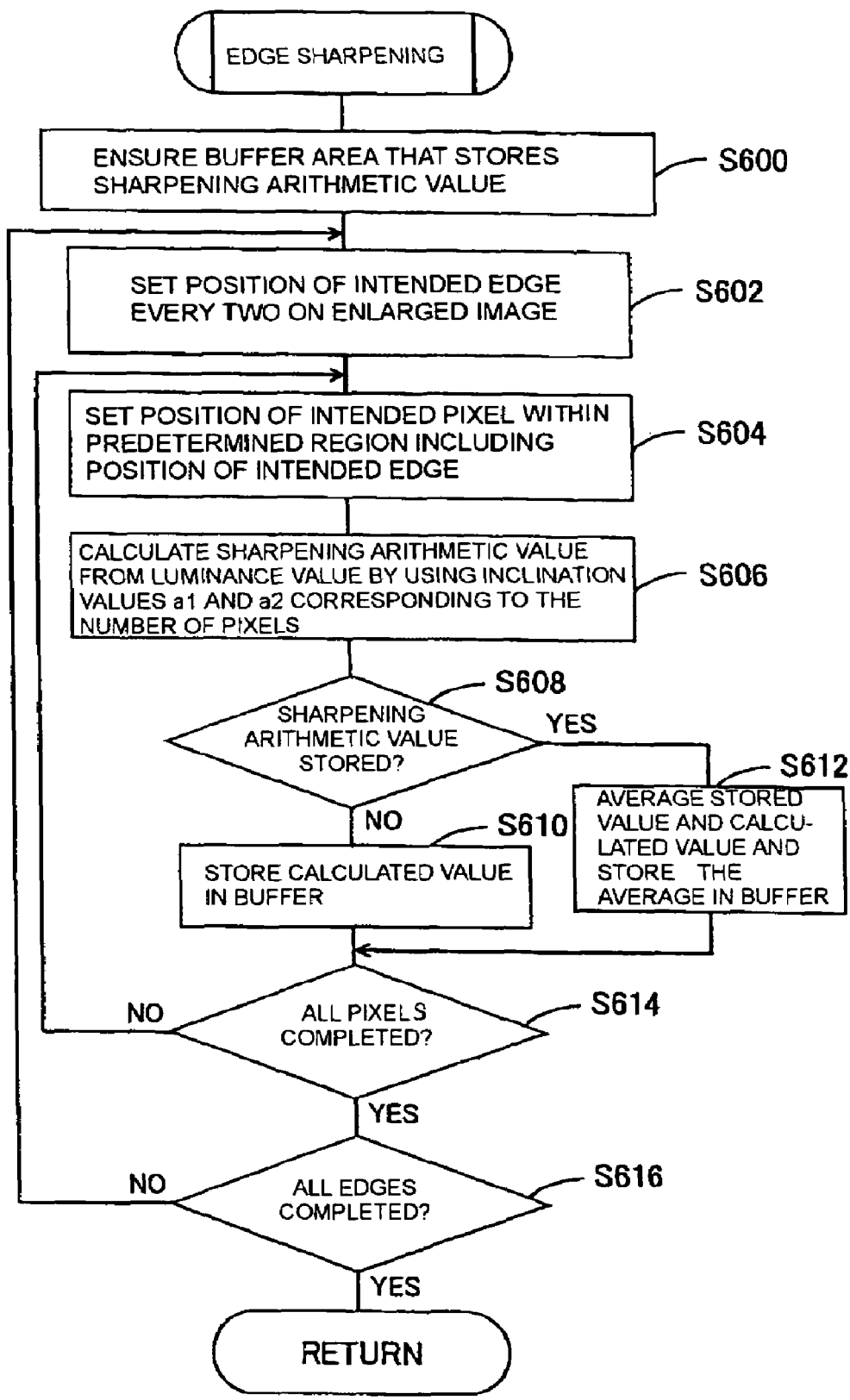
FIG. 30 is a flowchart showing an edge sharpening process.

(3-5) Edge Sharpening Process (S60 in FIG. 3):

When the processing of FIG. 30 starts, a buffer area that stores the image data D13 that has been subjected to the sharpening operation therein is ensured in the RAM (S600). Hereinafter, a description will be given with reference to FIGS. 12 and 13. Then, the positions of the intended edge N7 which is the pixel unit of the enlarged image are set every two on the enlarged image I3 that is expressed by the interpolated image data D12 (S602). Since the connection information for each of the edges is stored in order in the connection information D15, edge Nos. are associated with the respective edges, and the value of a pointer is updated so that the value of the pointer which is associated with the edge No. becomes even or odd. Therefore, the position (Xi, Yi) of the intended edge can be set. As a result, when the position of the intended edge is sequentially set among the acquired positions of the edges, the position of the intended edge is set except for the position of the edge which is adjacent to an edge that was already at the position of the intended edge. Since most of the edges whose coordinate values are stored in order in the buffer are in proximity to each other, there is substantially no difference in the results of the sharpening process even if such a process is conducted. Accordingly, the processing speed of the sharpening process can be improved while the high quality of the processed image is maintained.

In addition, the position of the intended pixel is set within the predetermined area R4 including the intended edge N7 (S604). In this example, the inclination values a1 and a2 corresponding to the number of pixels Nxy of the unenlarged image are acquired from the operation setting data 14a by the set value determining unit U1. Then, the sharpening operation value g2 is calculated according to the luminance value g1 of the intended pixel by using the inclination values a1 and a2 (S606). That is, the inclination values a1, a2, the minimum min, the maximum max and the average ave of the luminance values Y of the plural elements within the predetermined area R4, and the luminance value g1 of the intended pixel are assigned to the above arithmetic expression (6), to calculate g2. In this example, since the inclination values a1 and a2 become gradually larger as the number of pixels Nxy is larger, the degree of sharpness to the uninterpolated image becomes gradually larger as the number of pixels Nxy increases more. Since the edge portion of the interpolated image is more appropriately sharpened, the quality of the processed image can be further improved.

Then, it is judged whether the sharpening operation value corresponding to the intended pixel has been already stored in the buffer, or not (S608). If the conditions are satisfied, the sharpening operation value g2 that is newly calculated this time is stored in the buffer in association with the position of the intended pixel (S610), and if the conditions are not satisfied, the sharpening operation value that has already been stored and the sharpening operation value g2 that is newly calculated this time are averaged (arithmetic average), and the average value is stored in the buffer in association with the position of the intended pixel (S612). Even if there is a pixel whose sharpening operation value is doubly calculated, it is unnecessary to conduct complicated processing. Therefore, the processing speed of the sharpening process can be improved while the high quality of the processed image is maintained.

Thereafter, it is judged whether a process of storing the sharpening operation value of all the pixels within the predetermined area R4 in the buffer is conducted, or not (S614). If the conditions are not satisfied, the processing of S604 to S614 is repeated. If the conditions are satisfied, it is judged whether the edge sharpening process is conducted on all of the edged, or not (S616). If the conditions are not satisfied, the processing of S602 to S616 is repeated. If the conditions are satisfied, the flow is completed. Then, the image data consisting of the sharpening operation value for each of the pixels makes up the image data D13 that has been subjected to the sharpening operation.

In this manner, the image data can be sharpened at the degree corresponding to the number of pixels of the uninterpolated image, and the processed image can be further improved.

Figure 31:
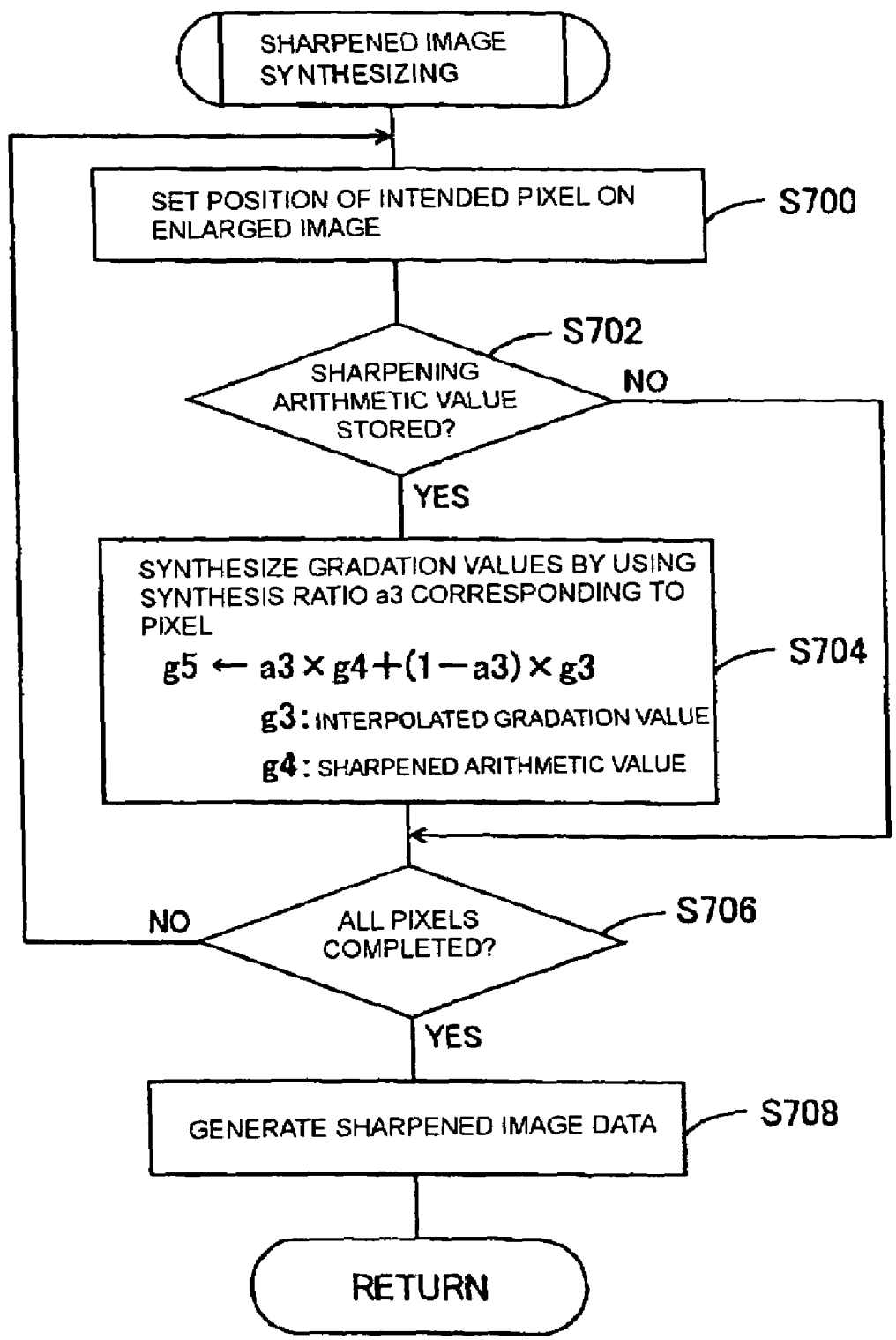
FIG. 31 is a flowchart showing a sharpening image synthesizing process.

(3-6) Sharpened Image Synthesizing Process (S70 in FIG. 3):

When the processing of FIG. 31 starts, the position of the intended pixel is set on the unenlarged image (S700). Hereinafter, a description will be given with reference to FIG. 14. Then, it is judged whether the sharpening operation value corresponding to the intended pixel is stored in the buffer, or not (S702), and the processing of S704 is conducted only when the conditions are satisfied.

In this example, the synthesis ratio A3 (%) corresponding to the number of pixels Nxy of the unenlarged image is acquired from the operation setting data 14a by the set value determining unit U1. In S704, the synthesis ratio a3 (=A3/100) is acquired from the synthesis ratio A3, and the gradation value g5 that has been synthesized (sharpened) is calculated from the gradation value g3 that has been interpolated (before the sharpening operation) and the sharpening operation value (the gradation value after the sharpening operation) g4 on the intended pixel by using the synthesis ratio a3. That is, the synthesis ratio a3 and the gradation values g3 and g4 before and after the sharpening operation are assigned to the above arithmetic expression (7) to calculate g5. In this example, since the synthesis ratio a3 becomes gradually larger as the number of pixels Nxy is larger, the degree of sharpness to the uninterpolated image becomes gradually larger as the number of pixels Nxy increases more. As a result, since the edge portion of the interpolated image is more appropriately sharpened, the quality of the processed image can be further improved.

Thereafter, it is judged whether a process of synthesizing the gradation values is conducted on all of the pixels, or not (S706), and if the conditions are not satisfied, the processing of S700 to S706 is repeated. If the conditions are satisfied, the sharpened image data D14 consisting of the gradation value for each of the pixels is generated, for example, for each of RGB, from the sharpened gradation value g5 for each of the pixels (S708), and the flow is completed.

In this manner, the image data can be sharpened at the degree corresponding to the number of pixels of the uninterpolated image. The enlarged image of the original image and the image obtained by sharpening the enlarged image are blended, thereby making it possible to obtain a natural enlarged and sharpened image with less failure, and to enlarge the image low in the resolution with high grade while the sharpness is maintained. Accordingly, the image that has been processed can be further improved.

(4) Conclusion

The edge generation device, the image processor and the peripheral device according to the present invention can be variously constituted. For example, a printer may be integrated with a computer. The above flow is executed in a computer main body, but may be partially or totally executed by a printer or an exclusive image output device. A large number of pixels that make up the image data may be variously constituted other than the dot matrix configuration where the pixels are put in rows. For example, image data may be constituted from dot-matrix like pixels that are put in honeycomb where hexagons are arranged in close relation.

As was described above, according to the present invention, the quality of the image that has been processed can be improved according to various embodiments.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An edge generation method that generates edge information which expresses an area of an edge of an enlarged image resulting from enlarging an unenlarged image on the basis of image data that represents the unenlarged image with gradation data of each pixel, the method comprising:

acquiring a position of an edge in correspondence with a position of each pixel of the enlarged image on the basis of the image data;

determining a direction of an intended edge according to the gradation data of plural pixels within a predetermined region including a position of the intended edge which determines the direction among the gradation data of each pixel on the enlarged image;

correcting the position of the intended edge to a position that brings a direction connecting a position of the intended edge and a position of an edge that is in proximity to the intended edge closer to the determined direction of the intended edge in the enlarged image; and generating the edge information representative of the area of the edge of the enlarged image in correspondence with the position of each pixel of the enlarged image.

2. The edge generation method according to claim 1, wherein acquiring a position of an edge in correspondence with a position of each pixel of the enlarged image on the basis of the image data, comprises:

generating intermediate data that is expressed in gradation in correspondence with each pixel of the unenlarged image by conducting calculation on the gradation data of the plural pixels within the predetermined region including an intended pixel by means of a predetermined differential filter while sequentially moving the intended pixel on the unenlarged image;

determining a position at which the intermediate data is set to a predetermined value by using the intermediate data of the plural pixels within the predetermined region including the intended pixel while sequentially moving the intended pixel on the plural pixels that correspond to the intermediate data; and acquiring the position of the edge that makes the determined position correspond to the position of each pixel of the enlarged image.

3. The edge generation method according to claim 1, wherein determining a direction of an intended edge comprises:

binarizing the gradation data of the plural pixels within the predetermined region including the intended pixel to generate binary data while sequentially moving the intended pixel on the unenlarged image; and determining the direction of the edge according to the binary data and a plurality of predetermined matching patterns that correspond to the direction of the edge.

4. The edge generation method according to claim 1, wherein correcting the position of the intended edge comprises:

where a direction connecting positions of two edges that are in proximity to the intended edge to each other are closer to the determined direction of the intended edge than the direction that connects the position of the intended edge and the position of the edge that is in proximity to the intended edge on the enlarged image, correcting the position of the intended edge to the position that brings the direction connecting the position of the intended edge and the position of the edge that is in proximity to the intended edge closer to the determined direction of the intended edge.

5. The edge generation method according to claim 1, wherein correcting the position of the intended edge comprises:

where a direction connecting positions of two edges that are in proximity to the intended edge to each other are closer to the determined direction of the intended edge than the direction that connects the position of the intended edge and the position of the edge that is in proximity to the intended edge on the enlarged image, correcting the position of the intended edge to the position that brings the intended edge closer to the line that connects the positions of the two edges to each other.

6. The edge generation method according to 1, wherein the position of the edge of the enlarged image is set as a pixel unit of the enlarged image, and wherein generating the edge information comprises: connecting the adjacent edges of the enlarged image to each other to generate the edge information representative of the area of the edge of the enlarged image by using the corrected position of the edge which is the pixel unit of the enlarged image.

7. An edge generation device that generates edge information which expresses an area of an edge of an enlarged image resulting from enlarging an unenlarged image on the basis of image data that represents the unenlarged image with gradation data of each pixel, the device comprising:

an enlarged position acquiring processor that acquires a position of an edge in correspondence with a position of each pixel of the enlarged image on the basis of the image data;

a direction determining processor that determines a direction of an intended edge according to the gradation data of plural pixels within a predetermined region including a position of the intended edge which determines the direction among the gradation data of each pixel on the enlarged image;

a position correcting processor that can correct the position of the intended edge to a position that brings a direction connecting a position of the intended edge and a position of an edge that is in proximity to the intended edge closer to the determined direction of the intended edge in the enlarged image; and an edge generating processor that generates the edge information representative of the area of the edge of the enlarged image in correspondence with the position of each pixel of the enlarged image.

* * * * *